(12) United States Patent
Smolyar

(10) Patent No.: US 10,819,881 B1
(45) Date of Patent: Oct. 27, 2020

(54) SYSTEM AND METHOD FOR ENCRYPTION/DECRYPTION OF 2-D AND 3-D ARBITRARY IMAGES

(71) Applicant: Igor Vladimir Smolyar, Charlestown, WV (US)

(72) Inventor: Igor Vladimir Smolyar, Charlestown, WV (US)

(*) Notice: Subject to any disclaimer, the term of this patent is extended or adjusted under 35 U.S.C. 154(b) by 144 days.

(21) Appl. No.: 16/050,188

(22) Filed: Jul. 31, 2018

Related U.S. Application Data

(63) Continuation-in-part of application No. 14/971,544, filed on Dec. 16, 2015, now abandoned.
(Continued)

(51) Int. Cl.
   *G06K 9/00* (2006.01)
   *H04N 1/44* (2006.01)
   (Continued)

(52) U.S. Cl.
   CPC ............ *H04N 1/4486* (2013.01); *G06F 7/58* (2013.01); *G06F 17/10* (2013.01); *G06K 9/00* (2013.01);
   (Continued)

(58) Field of Classification Search
   CPC ..................... G06T 15/04; G06T 17/20; G06T 2207/20192; G06T 11/206; G06T 11/001;
   (Continued)

(56) References Cited

U.S. PATENT DOCUMENTS

| | | |
|---|---|---|
| 4,373,393 A | 2/1983 | Heikkenen |
| 6,829,355 B2 | 12/2004 | Lilly |

(Continued)

FOREIGN PATENT DOCUMENTS

GB 2202119 A 9/1988

OTHER PUBLICATIONS

Smolyar et al., Quantification of layered patterns with structural anisotropy: a comparison of biological and geological systems, Mar. 2016 [retrieved Mar. 16, 2020], Heliyon, vol. 2, Issue 3,pp. 1-42. Retrieved: https://www.sciencedirect.com/science/article/pii/S240584401530400X (Year: 2016).*

(Continued)

*Primary Examiner* — Andrew M Moyer
*Assistant Examiner* — Dennis Rosario
(74) *Attorney, Agent, or Firm* — Rosenberg, Klein & Lee

(57) ABSTRACT

An image encryption/decryption system performs quantification and reconstruction of 2-D and 3-D layered and arbitrary grayscale or binary images in raster or vector format and supports their secure transmission between a Sender and a Receiver. Quantification parameters of the images include Indices of Intrinsic Anisotropy of size ($IIA_{size}$) and structure ($IIA_{str}$), which reflect the image anisotropy with high sensitivity. The $IIA_{STR}$ and $IIA_{SIZE}$ are used as hash values in authentication of a transmitted image. The system assures that the same set of transects which was used by the Sender in the image encryption will be used only by an authorized Receiver for decryption of the image. Using the Quantification parameters ($IIA_{str}$ and $IIA_{size}$), the present technique pinpoints the differences in structure and size in time series images, computes the localization of the differences between images of different categories and presented in different formats, and is capable of performing reconstruction of original 2-D and 3-D images from their N-partite graphs G (N) and F(M,N) table. The subject system and method may be used for fully automated quantification of dimensions and structure of 2-D and 3-D lesions with fuzzy margins in a precise and highly efficient manner.

20 Claims, 50 Drawing Sheets

Related U.S. Application Data

(60) Provisional application No. 62/132,022, filed on Mar. 12, 2015.

(51) Int. Cl.

| | |
|---|---|
| *H04L 9/32* | (2006.01) |
| *G06T 11/00* | (2006.01) |
| *G06T 7/00* | (2017.01) |
| *G06F 7/58* | (2006.01) |
| *G06F 17/10* | (2006.01) |
| *G06T 3/60* | (2006.01) |
| *G06T 5/50* | (2006.01) |

(52) U.S. Cl.
CPC .................. *G06T 3/60* (2013.01); *G06T 5/50* (2013.01); *G06T 7/0012* (2013.01); *G06T 11/003* (2013.01); *H04L 9/3236* (2013.01)

(58) Field of Classification Search
CPC ............ G06T 7/0016; G01V 2210/626; G06K 9/00422; G06K 17/0016; G06K 9/00; G06K 9/00771; G06K 9/46; G06K 9/4604; G06K 9/6202; G06K 9/6215
See application file for complete search history.

(56) References Cited

U.S. PATENT DOCUMENTS

| | | | |
|---|---|---|---|
| 8,755,578 | B1 | 6/2014 | Smolyar |
| 9,566,038 | B2 | 2/2017 | Zebaze et al. |
| 2010/0067804 | A1 | 3/2010 | Okochi |
| 2011/0115787 | A1 | 5/2011 | Kadlec |

OTHER PUBLICATIONS

P. L. Guth. "Drainage basin morphometry: a global snapshot from the shuttle radar topography mission." Hydrol. Earth Syst. Sci., vol. 15 (2011), pp. 2091-2099. doi: 10.5194/hess-15-2091-2011.
B. Lehner, et al. "New global hydrography derived from spaceborne elevation data." Eos Trans. AGU, vol. 89, No. 10 (Mar. 4, 1998), pp. 93-94. doi: 10.1029/2008EO100001.
J. A. Slater, et al. "Global assessment of the new ASTER Global Digital Elevation Model." Photogrammetric Engineering & Remote Sensing, vol. 77, No. 4 (Apr. 2011), pp. 335-349. doi: 10.14358/PERS.77.4.335.
A. S. McEwen, et al. "Mars Reconnaissance Orbiter's High Resolution Imaging Science Experiment (HiRISE)." J. Geophys. Res., vol. 112, EO5S02 (2007). doi: 10.1029/2005JE002605.
J. Rea & R. Knight. "Geostatistical analysis of ground-penetrating radar data: A means of describing spatial variation in the subsurface." Water Resour. Res., vol. 34, No. 3 (Mar. 1998), pp. 329-339. doi: 10.1029/97WR03070.
R. K. Hayward, et al., "2007 Mars Global Digital Dune Database: MC2-MC29: U.S. Geological Survey Open File Report 2007-1158." Full database contents at http://pubs.usgs.gov/of/2007/1158/.
J. M. Casselman. "Age and growth assessment of fish from their calcified structures—techniques and tools." In: NOAA Technical Report NMFS 8. Proceedings of the International Workshop on Age Determination of Oceanic Pelagic Fishes: Tunas, Billfishes, and Sharks (eds. E.D. Prince & L.M. Pulos, Dec. 1983), pp. 1-17.
"Sockeye salmon (*Oncorhynchus nerka*) population biology and future management." Proceedings of the International Sockeye Salmon Symposium—Sockeye '85, Nanaimo, British Columbia (Nov. 19-22, 1985). Canadian Special Publication of Fisheries and Aquatic Sciences 96 (eds H.D. Smith, L. Margolis, & C.C. Wood, 1987), pp. 327-334.
K. D. Friedland, et al. "Linkage between ocean climate, post-smolt growth, and survival of Atlantic salmon (*Salmo salar* L.) in the North Sea area." ICES J. Mar. Sci., vol. 57, No. 2 (Apr. 2000), pp. 419-429. doi: 10.1006/msc.1999.0639.

I. V. Smolyar & T. G. Bromage, "Discrete model of fish scale incremental pattern: a formalization of the 2D anisotropic structure." ICES J. Mar. Sci., vol. 61, No. 6 (Sep. 2004), pp. 992-1003. doi: 10.1016/j.icesjms.2004.07.013.
P.F.A. Alkemade. "Propulsion of ripples on glass by ion bombardment." Phys. Rev. Lett., vol. 96, No. 107602 (Mar. 2006). doi: 10.1103/PhysRevLett.96.107602.
B. Morales-Nin, et al. "Approaches to otolith age determination: image signal treatment and age attribution." Sci. Mar., vol. 62, No. 3 (1998), pp. 247-256. doi: 10.3989/scimar.1998.62n3247.
E. Jansma, et al. "TRiDaS 1.1: The tree-ring data standard." Dendrochronologia, vol. 28, No. 2 (2010), pp. 99-130. doi: 10.1016/j.dendro.2009.06.009.
P. M. Cooley & W. G. Franzin. "Image analysis of walleye (*Stizostedion vitreum vitreum*) opercula for age and growth studies." Can. Tech. Rep. Fish. Aquat. Sci. 2055 (1995). doi: 10.13140/RG.2.1.1804.1201.
"WinDENDRO 2005: An Image Analysis System for Tree-Rings Analysis." www.reagentinstruments.com.
W. S. Conner, et al. "Design of a computer vision based tree ring dating system." 1998 IEEE Southwest Symposium on Image Analysis and Interpretation (Apr. 1998). doi: 10.1109/IAI.1998.666895.
C. M. Jones. "Development and application of the otolith increment technique." In: Otolith Microstructure Examination and Analysis, Can Spec. Publ. Fish. Aquat. Sci. 117 (eds. D. K. Stevenson & S. E. Campana, 1992), pp. 1-11.
M. N. Cerda, et al. "Robust tree-ring detection." PSIVT 2007, LNCS 4872 (2007), pp. 575-585. doi: 10.1007/978-3-540-77129-6_50.
G. Von Arx, & H. Dietz, "A tool for the analysis of annual root rings in perennial forbs." Media Cybernetics Applications Note, formerly at http://www.mediacy.com/index.aspx?page=AH_RootRing.
L. Choimaa, et al. "Videobild basiertes Baumjahresring-Analyse System." 2005 Virtuelle Instrumente in der Praxis: Messtechnik, Automatisierung, Begleitband zum Kongress (Apr. 2005), pp. 68-75. ISBN: 3-7785-2947-1.
H. Laggoune, et al. "Tree-ring analysis." Canadian Conference on Electrical and Computer Engineering (Jun. 2005), pp. 1574-1577. doi: 10.1109/CCECE.2005.1557282.
E. Nagy & M. Nagy. "Image processing as a possibility of automatic quality control." Annals of the Faculty of Engineering Hunedoara, vol. 2, No. 1 (2004), pp. 171-176.
E. Aynekulu, et al. "The applicability of GIS in dendrochronology." 2018.
S. T. Szedlmayer, et al. "Automated enumeration by computer digitization of age-0 weakfish *Cynoscion regalis* scale circuli." Fishery Bulletin, vol. 89, No. 2 (1991), pp. 337-340.
G. Sapiro, et al. "Implementing continuous-scale morphology via curve evolution." Pattern Recognition, vol. 26, No. 9 (Sep. 1993), pp. 1363-1372. doi: 10.1016/0031-3203(93)90142-J.
C. A. Silva Ribeiro, et al. "Relationship between image analysis graphite shape factors, mechanical properties and thermal analysis solidification behaviour of compact cast irons." Proceedings of 8th International Symposium on Science and Processing of Cast Iron (Oct. 2006), pp. 169-174.
H. M. Al-Najjar. "Digital image encryption algorithm based on multi-dimensional chaotic system and pixels location." Int. J. Comp. Theory & Eng., vol. 4, No. 3 (Jun. 2012), pp. 354-357. doi: 10.7763/IJCTE.2012.V4.482.
K. Agung, et al. "Image encryption based on pixel bit modification." J. Phys.: Conf. Series, vol. 1008 (2018) 012016 doi; 10.1088/1742-6596/1008/1/012016.
J. Roerdink & A. Meijster. "The watershed transform: definitions, algorithms and parallelization strategies." Fundamenta Informaticae, vol. 41 (2001), pp. 187-228. doi: 10.3233/FI-2000-411207.
L. Weng & B. Preneel. "A secure perceptual hash algorithm for image content authentication." Proceedings of the 12th IFIP TC 6/TC 11 international conference on Communications and Multimedia Security (Oct. 2011), pp. 108-121. doi: 10.1007/978-3-642-24712-5_9.
C. Winter, et al. "Fast indexing strategies for robust image hashes." Digital Investigation, vol. 11, supp. 1 (2014), pp. S27-S35. doi: 10.1016/j.diin.2014.03.004.

(56) References Cited

OTHER PUBLICATIONS

K. W. Eliceiri, et al. "Biological imaging software tools." Nat, Methods, vol. 9, No. 7 (Oct. 2012), pp. 697-710. doi: 10.1038/nmeth.2084.

F. Rubin. "One-time pad cryptography." Cryptologia, vol. 20, No. 4 (Oct. 1996), pp. 359-364. doi: 10.1080/0161-119691885040.

P. Rogaway & T. Shrimpton. "Cryptographic hash-function basics: Definitions, implications, and separations for preimage resistance, second-preimage resistance, and collision resistance." In: Fast Software Encryption (eds. B. K. Roy, W. Meier), pp. 371-388. doi: 10.1007/978-3-540-25937-4_24.

* cited by examiner

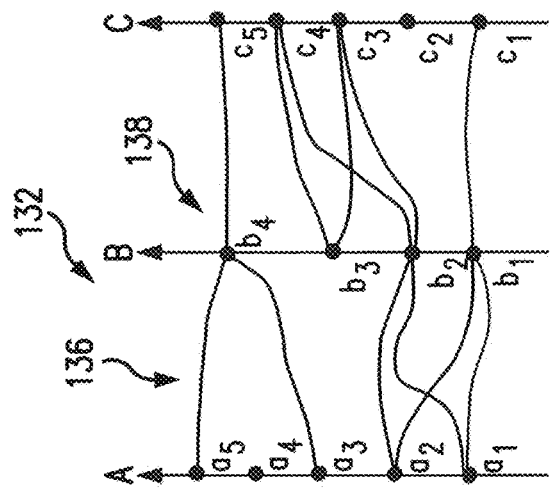
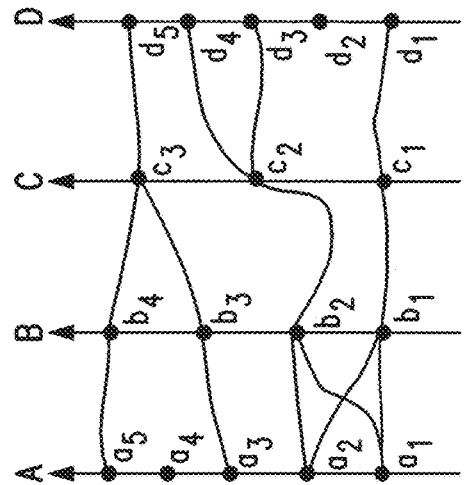
FIG. 9A
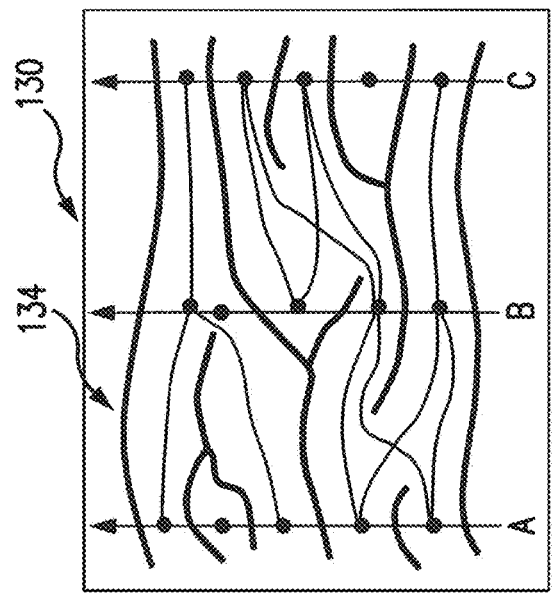
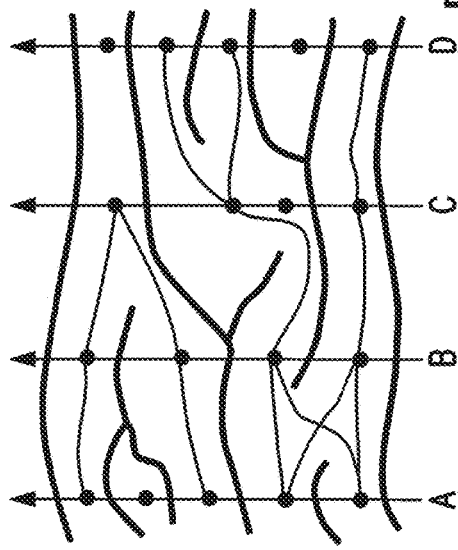
FIG. 9B

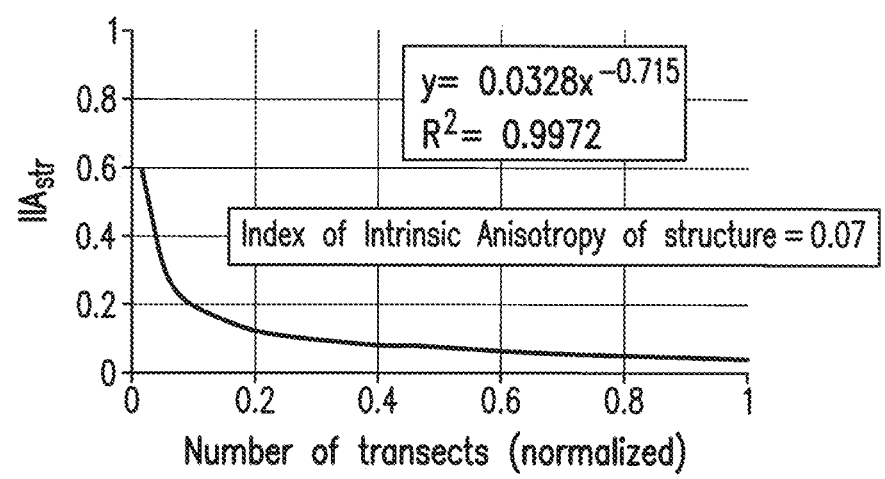
FIG. 10A

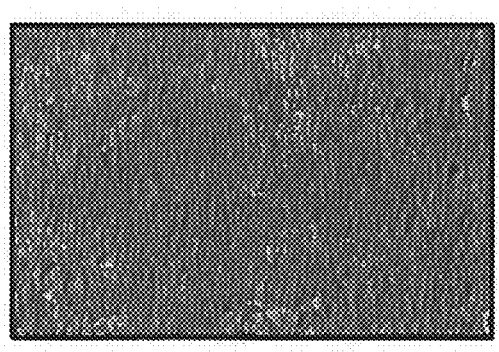
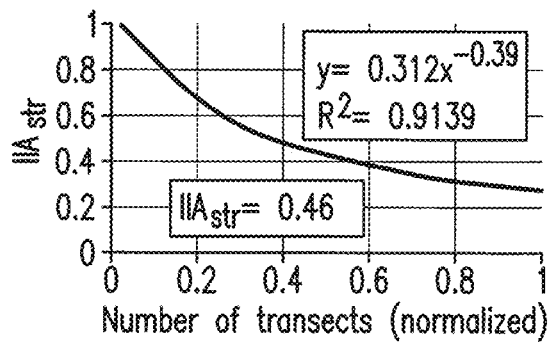
FIG. 10B
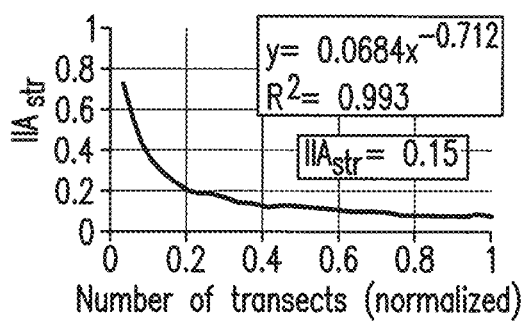
FIG. 10C
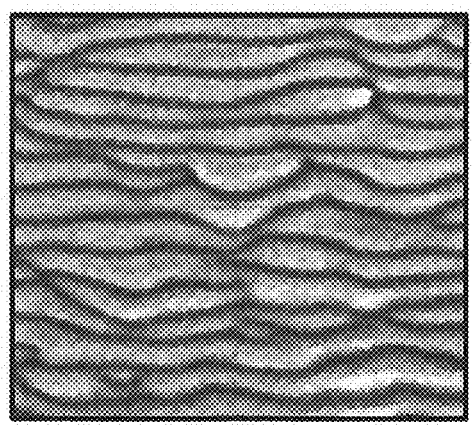
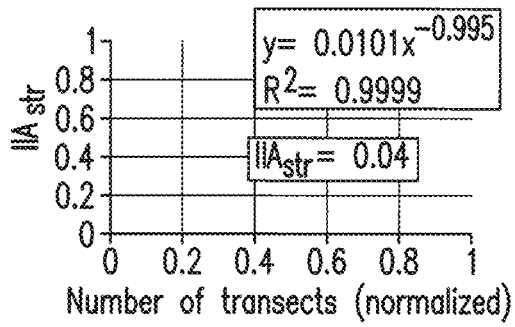
FIG. 10D

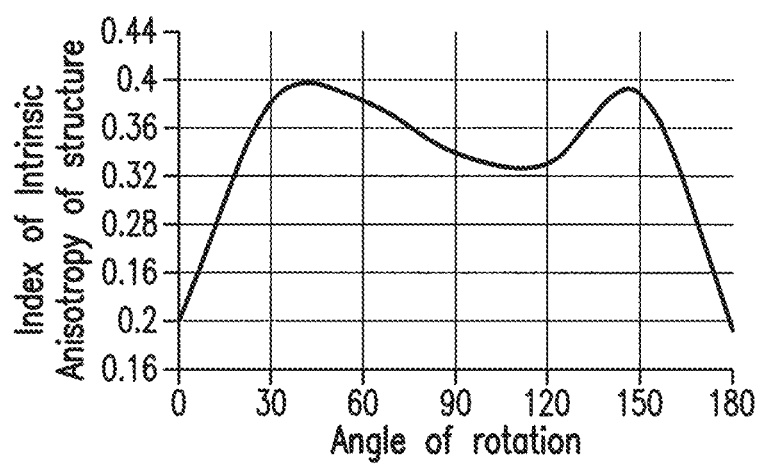
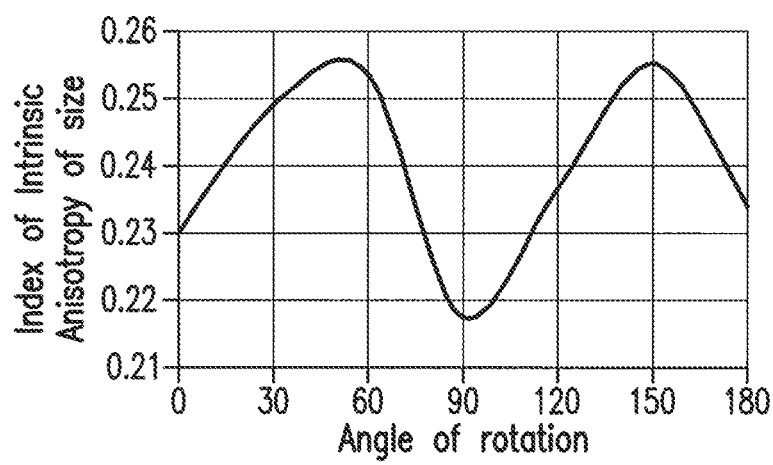
Index of Complexity of image Anisotropic structure=0.319
Index of Complexity of Image Anisotropic size=0.290
FIG. 12B

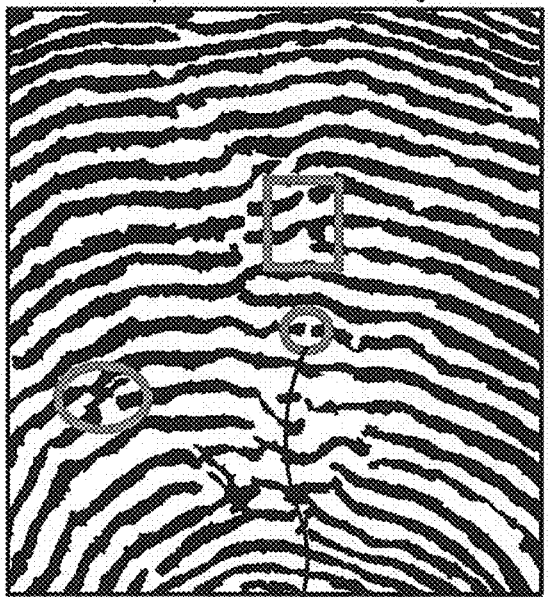
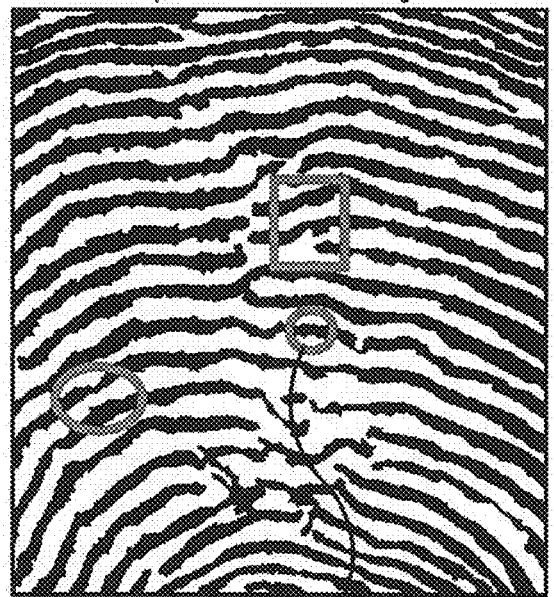
FIG. 13A
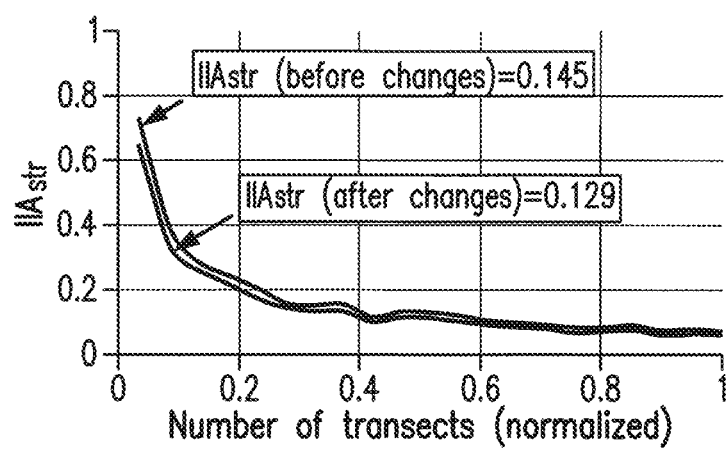
FIG. 13B

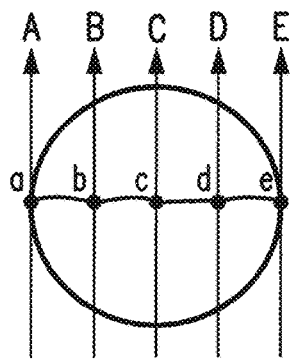
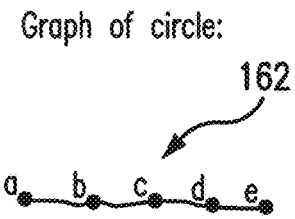
FIG. 15A
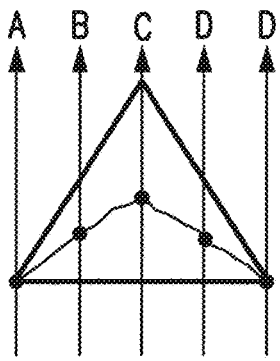
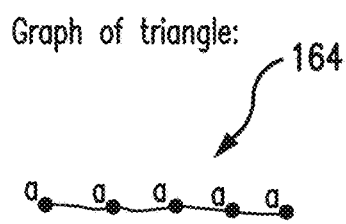
FIG. 15B
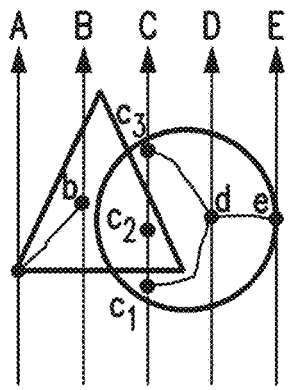
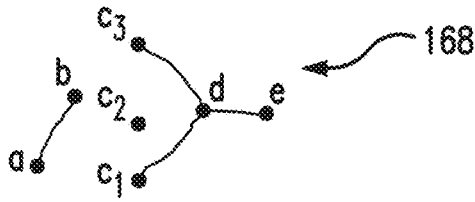
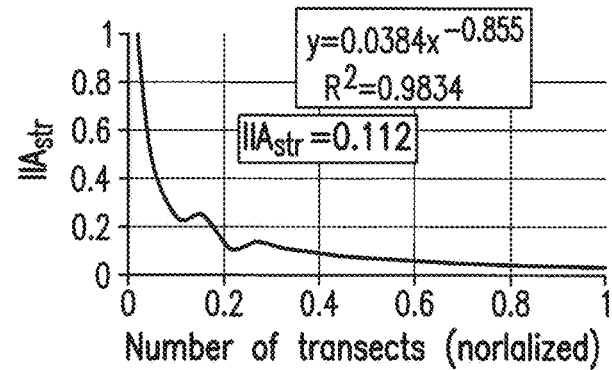
FIG. 15C FIG. 26E — Original image FIG. 26F — Image after reconstruction

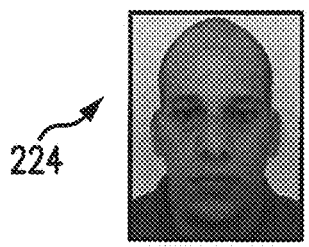
FIG. 27A
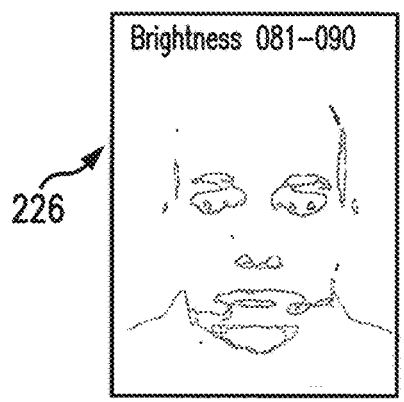
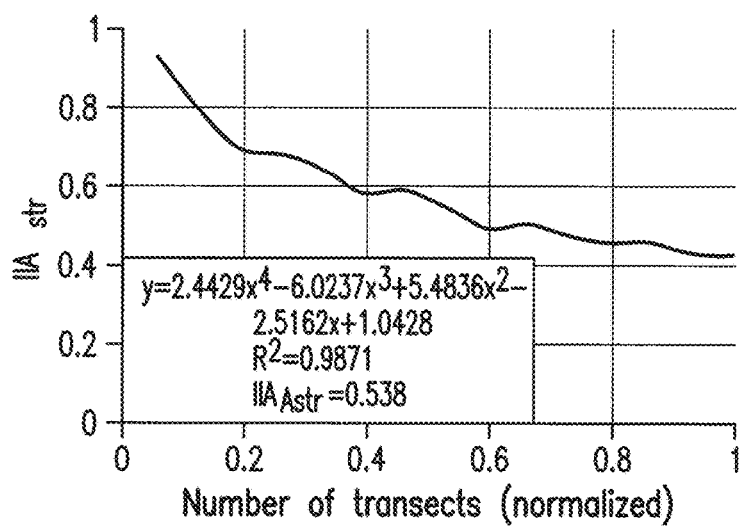
FIG. 27B
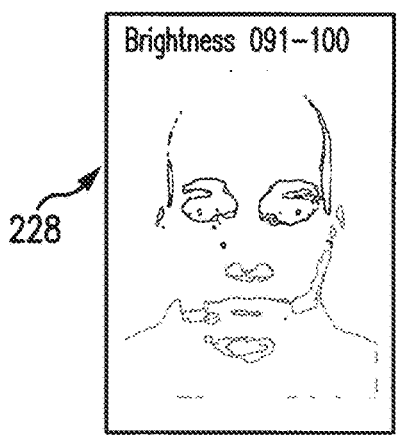
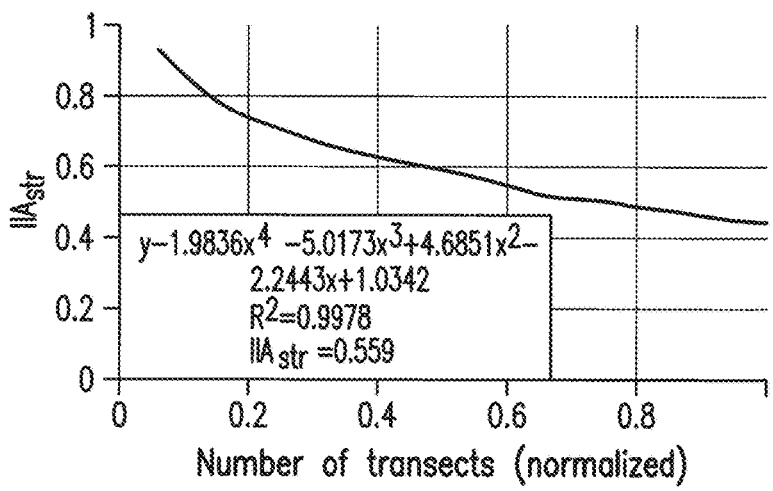
FIG. 27C

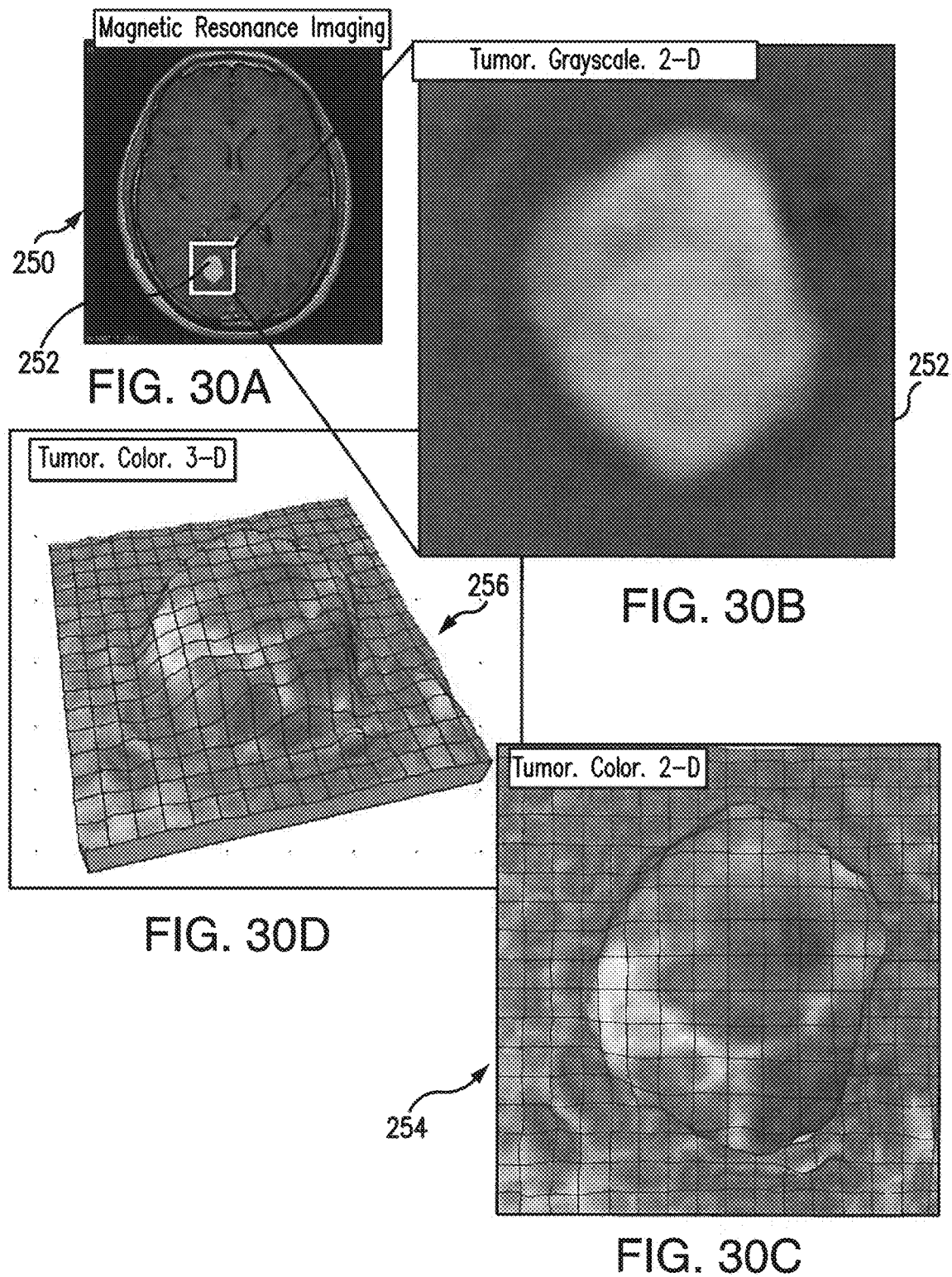

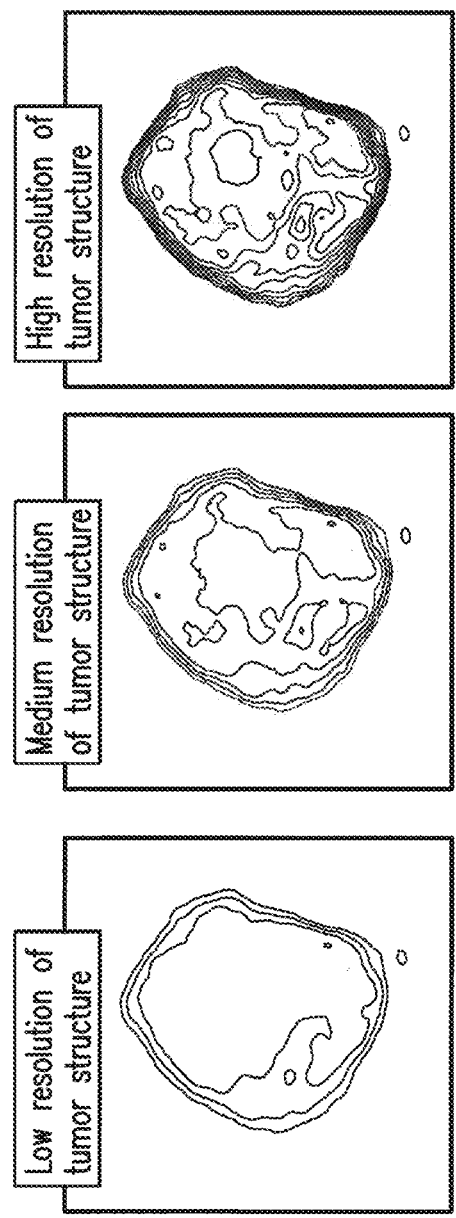

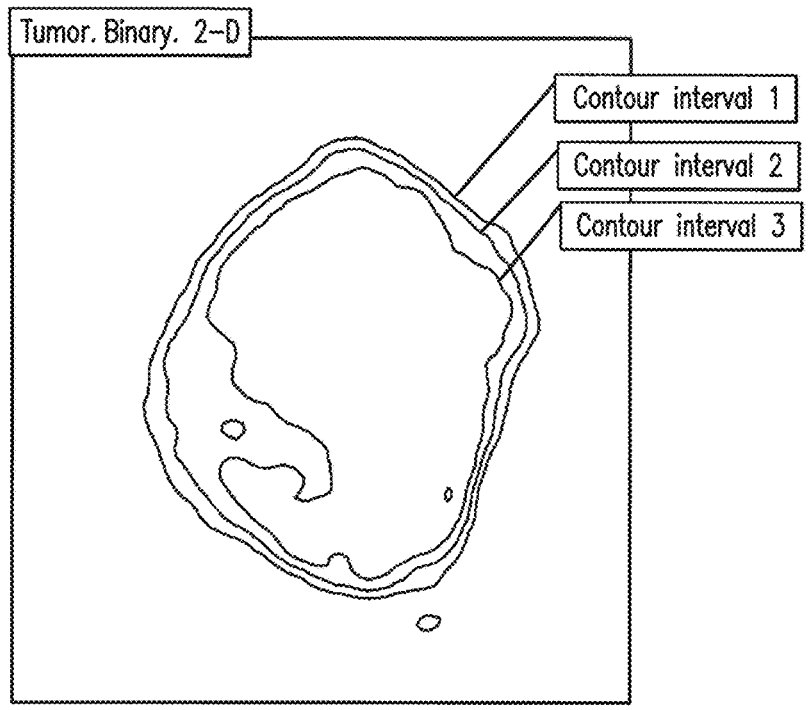
FIG. 32A
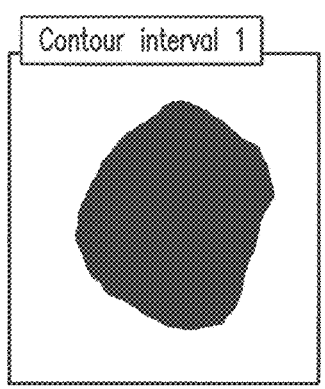 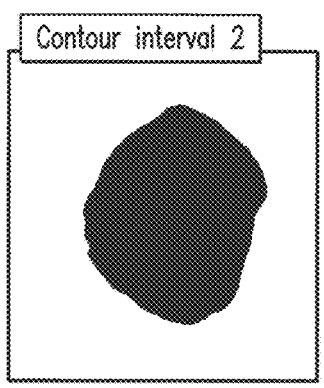 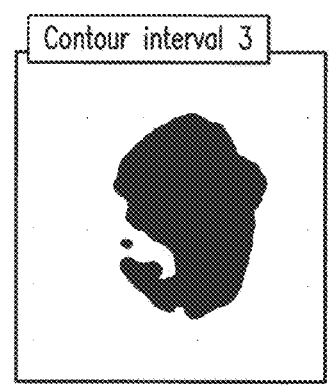
FIG. 32B　　　　FIG. 32C　　　　FIG. 32D

SYSTEM AND METHOD FOR ENCRYPTION/DECRYPTION OF 2-D AND 3-D ARBITRARY IMAGES

REFERENCE TO RELATED APPLICATION

The present Utility patent application is a Continuation-in-Part (CIP) of the Utility patent application Ser. No. 14/971,544, filed on 16 Dec. 2015, currently pending, which is based on the Provisional Application Ser. No. 62/132,022 filed on 12 Mar. 2015.

INCORPORATION BY REFERENCE

U.S. Pat. No. 8,755,578 and U.S. patent application Ser. No. 14/971,544, currently pending, are hereby incorporated by reference.

FIELD OF THE INVENTION

The present invention relates to image encryption/decryption; and more in particular to encryption/decryption of 2-D and 3-D arbitrary images.

More in particular, the present invention is directed to an arbitrary image encryption/decryption for a secure transmission of encrypted arbitrary 2-D and 3-D images between a sender party and a receiver party, where the sender and receiver parties are equipped with an image processing capabilities, and the authentication of the transmitted encrypted image is warranted by the image processing technique using a one-time secret key available only for and shared between a sender and an authorized receiver.

The present invention also relates to a highly secure image transmission between a sender party and a receiver party where at the sender party, an arbitrary image is parameterized (quantified) using a corresponding set of transects randomly selected specifically for application to the image in question, and subsequently reconstructed, and where the sender computes hash values of the reconstructed image. The sender transmits the one-time secret key corresponding to specific set of transects to the receiver along with the parameters of the encrypted image so that the receiver can reconstruct the image based on the received one-time secret key and the image parameters (using the same system of transects as was used at the sender's site), and calculates the hash values for the image reconstructed by the receiver). The hash values of the reconstructed images computed at the sender and the receiver are compared, and the image reconstructed by the receiver is authenticated when the hash values received at the receiver and computed by the receiver match each other. If the hash values correspondence (match) is not found, a request is sent by the receiver to the sender for resending the image encrypted with another set of transects used in the image parameterization at the sender.

The present invention also addresses the principles of computer-based analysis and parameterization of 2-D and 3-D arbitrary images, and more in particular, a noiseless automatic parameterization of high-resolution images acquired in numerous fields of human activities and natural phenomena, such as, for example, but not limited to, medical images, material science images, geoscience images, images of patterns resulting from processes found in biological systems and in the formation processes of geological objects, as well as images of patterns formed on different categories of surfaces and in nano-, micro-, and millimeter-scale structures fabrication, etc.

The present invention is also directed to the system and method for an arbitrary image encryption/decryption which uses a set of transects $T_1, \ldots, T_N$ as the tool to convert a binary image into image describing parameters, such as $G(N)$ and $F(M,N)$, as well as to solve the reverse problem, which is reconstruction of the binary image in the pixel format from the parameters $G(N)$ and $F(M,N)$ with a high level of accuracy, where both the sender and the receiver are provided with a randomly generated number which defines a respective transects set (which is an individual set of transects referred to herein also as a secret key SK-A) to be used in the process of encryption/decryption, which allows only an intended receiver to reconstruct the encrypted image.

Furthermore, the present invention is directed to an image encryption/decryption system used in the secure transmission of arbitrary images between a sender and a receiver which uses a computer system installed at both the sender party and the receiver party, where the computer system is equipped with a pre-programmed Read Only Memory (ROM), which is an independent hardware unit physically mounted on the motherboard of the computer for performing all cryptographic operations (including the operation of applying a specified set of transect $T_1, \ldots, T_N$ to convert the binary image into the image parameters $G(N)$ and $F(M,N)$, reconstruction of the original image from the parameters $G(N)$ and $F(M, N)$, and calculation of the Index of Intrinsic Anisotropy of Structure ($IIA_{STR}$) and Index of Intrinsic Anisotropy of Size ($IIA_{SIZE}$) for the reconstructed image at the sender site. The indices $IIA_{STR}$ and $IIA_{SIZE}$ are used in the current system as hash values for verifying the integrity of the image related encryption information transmitted through transmission channels.

The present invention is also directed to an image encryption/decryption system for secure transmission of 2-D and 3-D arbitrary images which uses a true Random Number Generator (RNG) which is a hardware unit that generates random numbers and which is installed into the computer memory via an expansion card. The RNG in the present system is used to generate random numbers which are used to choose respective sets of transects $T_1, \ldots, T_n$, for both the sender and the receiver to use for encryption/decryption purposes.

The present invention is also directed to an image encryption/decryption system and method for secure transmission of 2-D and 3-D arbitrary images between a sender and a receiver, each of which is equipped with a removable external USB memory block which contains a database-of-transects, and which provides that both the sender and receiver use the same set of transect in order to increase security of the encryption/decryption process.

Moreover, the present invention relates to a pattern processing system which is configured for quantification of a structure of arbitrary images of various sizes and origin, for identification of structural changes in time series images, and for identification of changes in an image structure over a period of time, as well as for noise reduction in binary and grayscale images parametrization process.

In addition, the present invention relates to secure transmission of multi-dimensional (2-D and 3-D) arbitrary images based on their computer analysis, and to processing (with a sufficiently reduced noise level) of patterns with structural anisotropy to develop multipurpose databases of 2-D and 3-D arbitrary grayscale images, such as, for example, biomedical images (X-rays, MRI) of hard tissues and bones, satellite images of terrestrial and extraterrestrial dunes fields, as well as handwritten and printed texts and numeric data, images of the surface of planets, images of fingerprints, images of fish scales, images of man-made nano-, micro-, and millimeter scale objects, seismic images of the subsurface of the Earth, which may be usable for fingerprints comparison, studies of patterns formation in nature, quantification of changes in structure over time-series of images, as well as for quantification, comparing and reconstruction of the size and structure of multi-dimensional arbitrary grayscale time-series images, and many other areas of applications.

DESCRIPTION OF THE RELATED ART

Quantification of an image size and structure, also known as image parametrization, is one of key elements for solving broad spectrum of scientific and technological problems and may play a tremendous role in encryption/decryption of images for transmission between a sender party and a receiver party. Image parametrization has attracted a high level of interest and attention in scientific and engineering communities in view of development of new technologies for acquiring high resolution images in various areas of science, human activities, and nature phenomena, including medicine, materials science, geosciences, and many others.

Image in pixel format (jpg, bmp, png and many other) typically is the starting point of an image encrypting/decrypting method. A pixel is the smallest element of an image that contains the characteristics found in the image and can be isolated. For this reason, a pixel may be an object of an image encryption/decryption.

Each pixel is characterized by two parameters. First parameter represents the color of the pixel which varies from 0 to 255 for grayscale images. Zero value is associated with black color, while the value of 255 is associated with white color. Values between 0 and 255 represent different shades of gray. Second parameter of a pixel represents the position of a pixel on a 2-D image, i.e., X and Y coordinate of a pixel on the 2-D plane.

Methods for a pixel of an image cryptography may be divided into two categories: (a) pixel replacement methods (based on changing a pixel value), and (b) pixel scrambling method (based on changing a pixel coordinate), as for example, described in Hazem Mohammed Al-Najjar, "Digital Image Encryption Algorithm Based on Multi-Dimensional Chaotic System and Pixels Location", International Journal of Computer Theory and Engineering, Volume 4, Issue 3, pp. 354-357, June 2012; and Kiswara Agung, et al., "Image Encryption Based on Pixel Bit Modification," IOP Conf. Series: Journal of Physics: Conf. Series 1008 (2018) 012016.

However, the pixel replacement and scrambling for image cryptography are extremely time-consuming and require a tremendous amount of data processing. A somewhat more economic and efficient method would be desirable in the area of image quantification.

Incremental patterns (such as, for example, layered, lamellar, ripples, bands patterns) are broadly distributed in nature. Structure of incremental patterns is an important characteristic of various living and non-living systems. For instance, growth processes in biological systems and formation of layered geological objects on the Earth, Mars, and other planets, give rise to a rich variety of incremental patterns. The study of the patterns' sizes and structures provide valuable information about both the mechanisms of patterns formation, as well as various aspects of their functions.

There is a striking similarity between growth layers of various biological systems, the configuration of layered geological objects, and nano- (as well as micro- and millimeter scale) ripples found in nanotechnology and semiconductor devices fabrication contrary to their differences in size and physical nature.

Incremental patterns are a primary source of information about the duration and amplitude of periodic phenomena, as well as about other natural events occurring during a period of formation. The information about cyclicity of events, interactions between environmental and/or physiological cycles, perturbations, etc., are all inherently contained within incremental biological and geological patterns.

Incremental patterns include incremental bands, i.e., they are layered. The width of each layer is a reflection of a growth rate of biological objects. The layer analysis also is an important source of information for study of layered geological formations on Earth and other planets. Access to the images of the incremental patterns (Hayward, R. K., et al., 2007, Mars Global Digital Dune Database: MC2-MC29: U.S. Geological Survey Open File Report 2007-1158) greatly facilitates the layered pattern formations study.

The analysis of incremental patterns, with respect to the recognition of history of pattern formation includes two basic steps. In the first step, an incremental pattern is quantified, i.e., a plot of "Growth Rate vs. Time" is constructed. In the second step, features are extracted from this plot and various processing methods are applied to analyze the growth rate formed in the incremental patterns in order to recognize events in history of the pattern formation.

One of the approaches (for example, presented in I. Smolyar, et al., "Discrete model of fish scale incremental pattern: a formalization of the 2D anisotropic structure," ICES J. of Mar. Sc. 2004, Vol. 61, pp. 992-1003) for the quantification of the growth rate of incremental patterns contemplates drawing n transects $R_1, \ldots, R_j, \ldots, R_n$ over the incremental bands in directions perpendicular to their propagating front, and vertexes $a_{i,j}$ are found, each of which is the point of intersection of an incremental band $a_i$ with a transect $R_j$. This method for an arbitrary image encryption/decryption substantially differs from pixel replacement and scrambling methods, since the object of encryption/decryption is not a pixel, but an image structure describing parameter (N-partite graph) G(N) and an image size describing parameter F(M, N) of arbitrary images.

A growth rate is assumed to be proportional to an incremental band width. An incremental width $w(a_{i,j})$ is the width of the incremental band (IB) $a_i$ at the transect $R_j$. Along every transect applied to the incremental pattern, temporal points associated with each increment permit the documentation of the growth rate at time points $T_i, T_{i+1}, T_{i+2}, \ldots$.

The F(M,N) is a table F(M,N) containing the incremental width $w(a_{i,j})$ of each incremental band $a_i$ respective the transect $R_j$, is built wherein the $w(a_{i,j})$ is a measure of a growth rate at a time point $T_i$ along the transect $R_j$.

If the structure is isotropic, then the same number of incremental bands m cross each transect $R_j$, and there is an exact correspondence between $a_{i,j}$ found at the transect $R_j$, and $a_{i,j+1}$ found at the transect $R_{j+1}$, where, i=1, ..., m, and j=1, ..., n. However, the incremental patterns in question are commonly of an anisotropic nature.

Quantification of a highly anisotropic structure is complex due to having a minimal isotropy (i.e., it is the most anisotropic), and thus has a low relative structural integrity. In this case, all areas (segments) of the incremental pattern are used to quantify the growth rate of the overall incremental pattern.

The result of the quantification of the growth rate of an incremental pattern with structural anisotropy may be presented as a set of 2-D plots (for each segment of the overall structure) rendering, when combined together, a pseudo 3-D chart. This pseudo 3-D chart represents the results for an arbitrarily chosen structural solution of anisotropic incremental bands.

A model of the pattern under study is built which is the function of the N-partite graph G(N) which represents an incremental pattern structure, and the Table F(M,N). In terms of the graph G(N), the description of the structure of incremental bands is needed to solve several problems. First of all, a set of paths in G(N) is to be found which connects vertices of classes $A_1, \ldots, A_n$, which would include all vertices of G(N) that satisfy the properties of IBs. This problem is typical in graph theory, and a wide range of methods have been developed for their solution, for example, in F. Harrary, "Graph Theory", Addison-Wesley Publishing Co. Inc., Mass, 1969, 300 p.

The description of the structure of patterns in terms of a Boolean function has been introduced for the comparison of different versions of incremental band structures.

Generally, a greater number N of transects $R_j$ sufficient for the description of the size and structure of incremental bands, provides for a greater amount of incremental pattern details which may be taken into consideration, and thus the greater the value of Q may be attained. At least an "N" number of transects are used to construct the model of an incremental pattern and calculate the index of structural anisotropy.

The above approach of analyzing of incremental patterns with structural anisotropy has a number of disadvantages. The main disadvantage is the lack of a detailed step-by-step methodology for converting an initial incremental pattern into a 2-D model.

Another disadvantage of the prior approaches follows from the assumption that an initial incremental pattern contains no noise, while in reality, incremental patterns contain at least some level of noise. With respect to the incremental patterns, the notion of noise means that an incremental band $A_i$ is not exactly a growth line and the width of the incremental band $A_i$ is not exactly the measure of the growth rate of an incremental pattern at a given moment in time $T_i$. The level of noise, associated with the initial incremental pattern, has to be reduced in order to ensure that the variability of the growth rate of an incremental pattern and the index of structural anisotropy represent actual features of a system under study and not artifacts.

An additional disadvantage of the currently known approaches for the parameterization of incremental patterns follows from the assumption that each transect $R_j$ is a straight line perpendicular to each incremental band $A_i$. In practice, for many categories of incremental patterns, it is impossible to draw a straight line from the beginning of an incremental pattern in an outward direction which would cross each incremental band $A_i$ perpendicular to the forming front. Due to this, the results of measurements of the width of an incremental band along $R_j$ contain uncontrolled errors. Moreover, due to numerous osteons in mammal bones it is impossible to draw an even continuous $R_j$ transect from the beginning of incremental pattern outward crossing all incremental bands.

A further disadvantage of the prior approaches is due to the fact that each individual 2-D chart which describes a 2-D growth of an incremental pattern is noisy.

The problem of quantification and analyzing images of various categories is an important area of current research especially in geo-, biomedical and materials sciences. There are a number of developments in the area of images quantification.

In addition, methods have been developed in image processing art to extract useful information (features) about a state of an object of study which relate to methods of mathematical morphology, for example, G. Sapiro, et al., "Implementing Continuous-Scale Morphology Via Curve Evolution Pattern Recognition", Volume 26, Issue 9, September 1993, pp. 1363-1372, and numerous other publications.

All these methods are used for image formalization, i.e. to represent an image under study in terms of a set of structural features. Unfortunately, the anisotropy of an image has not been used in these methods as a structural characteristic of an object under study. For example, H. Li, et al. in "Relationship Between Image Analysis Graphite Shape Factors and Mechanical Properties and Thermal and Thermal Analysis Solidification Behavior of Compact Cast Irons," In Proceeding of International Symposium on Science and Processing of Cast Iron, Beijing, China 2006, pp. 169-174, considered the anisotropy merely as physical/mechanical characteristic of an object of study but not as a structural characteristic of the object.

An advancement over the prior methods for image formalization has been presented by the applicant I. Smolyar by introducing an Index of Structural Anisotropy (ISA) of 2-D binary incremental patterns, as presented in U.S. Pat. No. 8,755,578 (further referred to as '578 Patent) in a context of the quantification of the variability of thickness and area of incremental bands across a 2-D plane.

The computer-based system described in the '578 Patent is adapted for fully automated quantification of 2-D incremental patterns with structural anisotropy by imaging micro- and macro-incremental patterns with structural anisotropy, and processing the images of the incremental patterns converted into a digital (binary) format in order to effectively and noiselessly quantify a variability of the width and area of incremental bands across 2-D plane of the incremental patterns under study.

The technique presented in '578 Patent is based on converting of an incremental pattern under study into a 2-D model with sufficiently decreased noise level which may facilitate in the effective and adequate parameterization of various categories of 2-D incremental patterns with structural anisotropy found in biological, geological, nanotechnology, and other objects.

Index of Structural Anisotropy (ISA) of 2-D binary incremental patterns, which was introduced in '578 Patent in the context of the quantification of the variability of incremental bands thickness and area across a 2-D plane permitted the building of plots of "Incremental band width vs. Incremental band number (Time)" and "Incremental band area vs. Incremental band number" for images under study. In the images analysis, the ISA serves as a measure of fuzziness of the quantification of variability of a size of incremental bands across a 2-D plane due to the anisotropy of the pattern under study. Thus, the ISA covers the contextual features of incremental patterns and provides a tool for comparison of the charts "Incremental band width vs. Incremental band number (Time)" and "Incremental band area vs. Incremental band number" which are plotted for the images analysis.

In the system presented in the '578 Patent, a parameterized model of incremental patterns (IP) is obtained through the process which begins with acquiring an initial binary image, which may be in the form of a black and white incremental pattern in pixel format. The pixel format image is transformed into ASCII, preferably, the CSV format, for further processing. Black pixels in the CSV format have value of "1". Black pixels form fronts of the incremental pattern. White pixels have no values, i.e., cells associated with white pixels are empty.

The initial IP image (in its CSV representation) is first filtered in order to remove lines not associated with processes of the pattern formation. Subsequently, plotting transects extending from initial points to corresponding outer margins in pseudo-perpendicular direction are plotted to the growth lines found in the IP. A binary incremental pattern with gray transects, both in a raster (pixel) format and CSV format, is sequentially produced from the initial image. All gray pixels (corresponding to the transects) have identical values greater than 1 and less than 255.

Further, the layered black and white pattern are transformed into an n-partite graph G(n) by applying segmentation and labeling procedures: first, within each pair of neighboring transects resulting in the set of bi-partite graph $G_1(2), G_2(2), \ldots, G_{n-1}(2)$, where bi-partite graph $G_j(2)$ and $G_{j+1}(2)$ are situated between neighboring transects $R_j$, $R_{j+1}$ and $R_{j+1}$, $R_{j+2}$ respectively. Second, neighboring bi-partite graphs $G_1(2), G_2(2), \ldots, G_{n-1}(2)$ are merged into an n-partite graph G(n), based on the common vertex along transects $R_{j+1}$ situated between each pair of neighboring bi-partite graph. The G(n) describes the anisotropic structure of the 2-D incremental pattern under study.

Subsequently, the width of layers (bands) is calculated along the transects, an area of layers (bands) between two neighboring transects is calculated based on the equal distance (in pixels) between all pairs of neighboring transects, a structure of the incremental bands is calculated by using the G(N) graph, and a 2-D model of the IP under study is constructed based on the calculated width and area of incremental bands (IBs), and the G(N) graph.

During calculation of the IBs' widths, an angle between the incremental bands crossing a corresponding transect, is calculated, and, if it deviates from 90°, the width is adjusted.

Subsequently, a width and an area of layers (bands) across the 2-D plane are calculated for a different level of noise, and the width and the area of bands across the 2-D plane is time-averaged in order to reduce the noise level.

An index of an adequacy of the model and an index of structural anisotropy of the layered incremental pattern under study are further calculated. The index of IP anisotropy is calculated as a combination of the index of anisotropy of the IB size, area, and index of anisotropy of the IP structure.

A large noise reduction is attained in the system presented in '578 Patent through (a) the filtering of the IP, in its CSV format, for removal of the lines not associated with growth (or other formation mechanisms) of the IP, and (b) through noise reduction in the charts "Width of IB vs. IB number" and "Area of IB vs. IB number", which is attained through averaging different versions of IB structure (for different levels of noise), and removing IBs with a length less than a threshold which is set up in a manner permitting attaining the index of model adequacy of 0.9 or higher.

The results of calculations are output in several formats, including "Incremental bandwidth vs. Time", "Incremental band area vs. Time", Index of Adequacy, as well as Index of Anisotropy of the incremental pattern under study. If the real time of the layers formation is unknown, then the axis "T (time)" in the output graphs is substituted with the axis "Incremental band number", or "Time in relative units".

Being definitely an advancement over all known methods of images parametrization, the model of an incremental pattern presented in '578 Patent however provides a tool for comparison of different versions of a structure of incremental bands only within one object of study. The technique presented in the '578 Patent is deficient in ability to compare the structures of different patterns for different objects under study. Thus, a comparison of structures of different patterns (for different objects) remains an unresolved problem within the frame of the approach presented in '578 Patent.

It is therefore desirable to extend the approach taken in '578 Patent to provide the quantification of 2-D and 3-D arbitrary grayscale and binary images permitting the comparison of structures of different objects, and reconstruction of the anisotropic structures.

Disadvantageously, the Prior Developments
  do not use the concept that a 2-D arbitrary image consists of anisotropic and isotropic layers of different length;
  do not use layered isotropic image as the reference image for measurement anisotropy of size and structure and do not provide tools to reconstruct original image;
  do not provide tools for the reconstruction of original image from the set of it structural features;
  do not use the vector format to reduce noise in an image and reduce/increase the image size without image distortion;
  do not use the concept of the weight arithmetic mean to measure the area and volume of 2-D and 3-D lesions which have fuzzy margins; and
  do not use the concept of a structure of 2-D and 3-D lesions to quantify its changes over a period of time.

It thus would be highly desirable to extend the principles of the technology presented in the '578 Patent to attain noiseless quantification of 2-D and 3-D images, and reconstruction of size and structure of multi-dimensional arbitrary grayscale images for different objects, as well as time-series images, in an efficient and fully automated manner and free of disadvantages of prior art systems.

It would also be highly desirable to provide an image encryption/decryption system using advantages of the noiseless quantification of 2-D and 3-D images beyond the principles presented in '578 Patent and advanced for secure transmission of images between a sender and a receiver.

SUMMARY OF THE INVENTION

It is therefore an object of the present invention to provide an encryption/decryption system which may be used in secure transmission of binary images between a sender and a receiver which includes a pre-programmed Read Only Memory (ROM) hardware unit which is physically mounted on the motherboard of the computer at both the sender's and receiver's sides of the transmission channel for performing the subject cryptographic operations.

It is another object of the present system to encode an image through the application of a specific set of transects $T_1, \ldots T_N$ to the image in order
  (a) to convert a binary image into the N-partite graph G(N) and the table F(M,N) at the sender's side,
  (b) to reconstruct, at the sender's side, an original image from the G(N) and F(M,N) of the initial binary image, and to calculate Index of Intrinsic Anisotropy of Structure and Index of Intrinsic Anisotropy of Size of the reconstructed image, and to use the indexes of anisotropy of structure and of size of the reconstructed image as hash values to verify the integrity of the encrypted image sent from the sender to the receiver; and (c) to compute, at the receiver side, the reconstructed image based on the encrypted image representation sent from the sender;

(d) to compute Indices of Intrinsic Anisotropy of the Receiver's reconstructed image, and (e) to authenticate the received image if the Indices of Intrinsic Anisotropy calculated by the sender and receiver match each other.

It is a further object of the present invention to provide a system for encryption/decryption of images using a specific array of coordinates (also referred to as a set of transects) available only for sender/receiver. The subject system uses an image parameterization technique to represent an arbitrary image in terms of the N-partite graph G(N) and the size Table F(M,N) which utilizes a specific set of transects for converting the binary images into G(N) and F(M,N), and which is capable of constructing binary images in the pixel format from G(N) and F(M,N) with an unprecedented level of accuracy.

It is an additional object of the present invention to provide an image encryption/decryption system and method for secure image transmission, where a sender and a receiver are equipped with the image processing/parameterization/reconstruction hardware and a database-of-transects, and where a mechanism is provided for aligning the sender and receiver's usage of the same set of transcripts for parameterization/encryption and decryption of the image.

It is also an object of the present invention to provide a secure transmission system with encryption/decryption of arbitrary 2-D and 3-D images which uses a random number generator (RNG) which may be commercially available from various vendors, for generation of random numbers indicating a specific set of transects to be used by both the sender and the receiver for encryption/decryption of a respective message. Being sent from the sender to receiver, a one-time secret key SK-A identification number which corresponds to such a set of the transects, permits the receiver to use the same set of transects used by the sender to parameterize/encrypt the binary image in question. This information is shared only between the sender and an authorized receiver, and is not available to an extraneous party. Thus, an unauthorized receiver cannot decrypt the encrypted message.

It is still an object of the present invention to provide an image encryption/decryption system and method which uses an image parametrization technique for characterization of the anisotropy of an arbitrary image under study with respect to an isotropic (ideal) layered prototype which serves as a reference image for measurement of an anisotropy of a size and a structure of the image under study.

It is a further object of the present invention to provide an image transmission system which is configured for calculation of a measure of structural anisotropy and anisotropy of size represented in terms of Indices of Intrinsic Anisotropy of structure ($IIA_{str}$) and size ($IIA_{size}$) for multi-dimensional (2-D and 3-D) arbitrary images, and pinpointing the differences in structure and in size in images, as well as computing differences localization, based on the parameters $IIA_{str}$ and $IIA_{size}$.

It is another object of the present invention to provide a method and system for secure image transmission equipped with hardware supporting the processing of 2-D and 3-D images, layered and arbitrary, binary, grayscale, in raster (pixel) and vector format, and capable of parameterization of the images, and comparing of the parameterization parameters ($IIA_{str}$, $IIA_{size}$) of images in order to authenticate the images and to detect differences or similarities between the processed images.

It is still an object of the present invention to provide a technique for fully automated parameterization of the grayscale 2-D and 3-D medical images (MRIs), for example, to provide precise measurements size and structure of 3-D lesions.

It is another object of the present invention to provide a technique for reconstruction of an original (multi-dimensional) layered image from a set of its structural features described in terms of its N-partite graph G(N), and/or Boolean function, and a table $F_{(M,N)}$, and to use the parameters ($IIA_{size}$) and ($IIA_{str}$) to estimate the adequacy of the model of a layered or arbitrary image (ImageModel={G(N), $T_{M,N}$}) to the actual structure and size of the original image.

The subject method for an arbitrary image encryption/decryption substantially differs from pixel replacement and scrambling methods, since the object of encryption/decryption is not a pixel, but an image structure describing parameter (N-partite graph) G(N) and an image size describing parameter F(M,N) of arbitrary images. Basis for the present method for encryption/decryption is the novel concept that any binary arbitrary image consists of anisotropic and isotropic layers of different length. This new concept allows to use the shape of transects $T_1, \ldots T_N$ as a one-time use secret key (SK-A) to substantially increase security of images transmission.

In one aspect, the present invention addresses a system for encryption/decryption of arbitrary 2-D and 3-D images. The subject system operates in cooperation with an imaging system which acquires images of objects under study.

The present system differs radically from existing image encryption/decryption systems and hash parameters usage. Specifically, the present system is based on the concept expressed by the following equation:

Index of Intrinsic Isotropystr+Index of Intrinsic Anisotropystr=1

From this Equation, it follows that the structure of any binary arbitrary image in the pixel format (BIPF) includes both the isotropic and anisotropic layered components of different length. A specific coordinate system (set of transects) $T_1, \ldots, T_N$ is used to convert the BIPF into G(N) and F(M, N) which describe the structure and size of the BIPF, respectively. Various coordinate systems could be used to construct/reconstruct G(N) and F(M, N). The present system and method uniquely distinguish from the existing approaches in cryptography at least by using an array of coordinate systems (set of transects) which is available for a sender and an authorized receiver only. Each coordinate system serves as one-time secret key and is used for computation of the encoded image representation and for calculation of hash values.

The subject coordinate system is the set of transects $T_1, \ldots, T_N$. If transects $T_1, \ldots, T_N$ are parallel lines of identical length extending without breaks and confluences and at identical distance between any two nearby transects $T_j$ and $T_{j+1}$, then the transects represent an isotropic coordinate system. In this case, the anisotropy indices IIAstr and IIAsize serve as measures of deviation of the image BIPF from a layered object with isotropy of structure and size and can serve as structural characteristics of any arbitrary BIPF. When using anisotropic transects, the computations of indices of anisotropy of images should take into consideration also anisotropic configuration of the transects.

One of the key features of G(N) and F(M,N) with respect to the subject image encryption/decryption process is that the BIPF can be reconstructed from G(N) and F(M,N) if the coordinate system used for conversion of BIPF into G(N) and F(M,N) is available for reconstruction. The graph G(N) is the numeric table describing connectivity of points situated along nearby transects $T_J$ and $T_{J+1}$, j=1, N−1. The graph G(N) contains only an Y coordinate of the first point on each transect $T_1, \ldots, T_N$. Without both X and Y coordinate of graph points, it is impossible to reconstruct BIPF. The coordinate system, i.e., $T_1, \ldots T_N$, and the F(M,N) comprising distance between points along each of the transects, allow to define X and Y coordinates of each graph point. Image parameters G(N) and F(M,N) would serve no purpose without $T_1, \ldots T_N$.

If only the Sender and the authorized Receiver use the same coordinate system, then only the Sender and the authorized Receiver can reconstruct the image. The problem of image reconstruction becomes much more complicated or even impossible for an unauthorized receiver if the coordinate system used for construction of the G(N) and F(M, N) has a complicated anisotropic layered structure (for example, as shown in FIG. 3D). Various anisotropic coordinate systems can be constructed and used for the image encryption/decryption. In the subject system, coordinate systems form a database which is available only for the sender and the authorized receiver. Each coordinate system is used for the image encryption/decryption as a one-time secret key shared between the Sender and the authorized Receiver.

Parameters IIAstr and IIAsize serve as hash characteristics of the BIPF. Hash functions are supposed to be sensitive even to minor changes of the BIPF. The IIAstr and IIAsize are extremely sensitive to minor changes in the image, and thus can be used as hash values. This unique approach in the subject system and method is radically different from other hash values methodologies used in encryption/decryption of messages (for example, G. Lilly, U.S. Pat. No. 6,829,355) and of images (C. Winter et al., "Fast indexing strategies for robust image hashes", Digital Investigation, 2014, 11(2014) 527-535; and L. Weng, et al., "A Secure Perceptual Hash Algorithm for Image Content Authentication", In: De Decker B., Lapon J., Naessens V., Uhl A. (eds) Communications and Multimedia Security. CMS, 2011, Lecture Notes in Computer Science, vol. 7025. Springer, Berlin, Heidelberg.). Unlike in the conventional approaches, the subject system calculates the hash parameters IIAstr and IIAsize not for separate pixels, but for the entire image. Also, unlike in the conventional image encryption/decryption, the IIAstr and IIAsize are the characteristics of an arbitrary BIPF computed with respect to another very complicated image, namely, the anisotropic coordinate system $T_1, \ldots, T_N$.

The present system is designed with a first computing sub-system operatively coupled to the imaging system to receive therefrom at least one image of the object under study (also referred to herein as the image under study), wherein the first computing sub-system includes:

a first motherboard, a first Central Processor Unit (CPU), and a pre-programmed first Read Only Memory (ROM) unit residing on the first motherboard and operatively coupled to the first CPU, and configured for executing cryptographic routines in the subject system.

The first computing sub-system further includes a Random Number Generator (RNG) operatively coupled to the first CPU and the first ROM unit, and a first database-of-transects operatively coupled to the first CPU, the RNG, and the first ROM unit. The first database-of-transects includes a binary images of numerous sets of transects.

The subject system further includes a second computing sub-system operatively coupled to the first computing sub-system over a communication channel and built with a second motherboard and a second CPU. The second computing sub-system includes:

a pre-programmed second ROM unit residing on the second motherboard and operatively coupled to the second CPU, and a second database-of-transects operatively coupled to the second CPU and the second ROM unit. The second database-of-transects contains a plurality of sets of transects, and is substantially identical to the first database-of-transects. Both databases-of transects can be dynamically changes in synchronism one with another.

The first ROM unit in the first computing sub-system includes:

a first computing unit configured for application of a respective set of transects from the first database-of-transects to the image of the object under study. The set of transects is selected from the first database-of-transects in accordance with a random number $RN_K$ generated for the image of the object under study by the RNG. The first computing unit computes an N-partite graph $G(N)\_RN_K$ describing an anisotropic structure of the image and a table $F(M,N)\_RN_K$ which includes coordinates of points of intersections of the transects N transecting the image with features (layers) M therein and describing an anisotropic size of the image.

A first reconstruction unit is operatively coupled to the first computing unit and is configured for reconstruction of the image in question based on the G(N) and F(M,N) computed in the first computing unit. The first reconstruction unit produces a first reconstructed image $R_{CS}BIPF\_RN_K$ for the image under study, for example, the Binary Image in Pixel Format (BIPF).

A second computing unit is operatively coupled to the first reconstruction unit and is configured to compute the N-partite graph $R_{CS}G(N)\_RN_K$ and the $R_{CS}F(M,N)\_RN_K$ and a first group of has values for the first reconstructed image $R_{CS}BIPF\_RN_K$. The first group of hash values is representative by a first group of anisotropy parameters of the first reconstructed image $R_{CS}BIPF\_RN_K$. The first group of anisotropy parameters includes an Index of Anisotropy of the Structure ($IIA_{str}$) and an Index of Anisotropy of Size ($IIA_{size}$) of the first reconstructed image $R_{CS}BIPF\_RN_K$ produced by first reconstruction unit.

An output device is configured to form a representation of the encoded image in question. The encrypted image is represented by the $R_{CS}G(N)\_RN_K$, $R_{CS}F(M,N)\_RN_K$ of the first reconstructed image $R_{CS}BIPF\_RN_K$, a secret code $SK\text{-}A\_RN_K$ determined by the randomly generated respective set of transects corresponding to the number $RN_K$, and the $IIA_{STR}$ and $IIA_{SIZE}$ of the first reconstructed image $R_{CS}BIPF\_RN_K$. The encrypted image representation is transmitted to the second computing sub-system over the communication channel.

The second ROM unit of the second computing sub-system includes at least a second reconstruction unit operatively coupled to the output device of the first computing sub-system. The second reconstruction unit is configured to retrieve the respective set transects from the second database-of-transects in accordance with the secret code $SK\text{-}A\_RN_K$ received thereat from the first computing sub-system, and to produce a second reconstructed image based on the $R_{CS}G(N)\_RN_K$, $R_{CS}F(M,N)\_RN_K$, and SK-A_$RN_K$ received from the first computing sub-system.

A third computing unit is operatively coupled to the second reconstruction unit and is configured for computing a second group of hash values for the second reconstructed image. The second group of hash values for the second reconstructed image are represented by a second group of anisotropy parameters comprising $IIA_{STR}$ and $IIA_{SIZE}$ of the second reconstructed image.

A fourth computing unit is operatively coupled to the third computing unit and the output device of the first computing sub-system. The fourth computing unit is configured for comparison of the first and second groups of hash values computed for the first and second reconstructed images, respectively. The second computing sub-system authenticates the second reconstructed image if the match between the first and second groups of hash values is determined.

The second computing sub-system is further configured to request the first computing sub-system to send the encrypted information computed for another randomly generated number if the first group of hash values differs from the second group of hash values.

The imaging system is operatively coupled to an input of the first computing sub-system and is configured for acquiring at least one image under study, which may be a 2-D binary layered image in the pixel format, 2-D or 3-D grayscale arbitrary image in the pixel format, 2-D or 3-D binary layered or arbitrary image in the vector format, and their combinations.

The subject system further includes a first image parameterization system residing on the first motherboard in operative coupling with the first CPU and the first ROM unit. The first image parameterization system includes the first computing unit and the first reconstruction unit. The second computing sub-system may include a second image parameterization system configured with the second reconstruction unit.

The first image parameterization system further includes an image slicing unit configured for applying a slicing procedure to the image under study if the image under study is a 3-D image, resulting in a set of 2-D slice images of the 3-D image under study, and to output a 2-D image including 2-D image under study or each of 2-D slice images of their set.

The second computing unit preferably includes a rotation unit configured to apply to the 2-D image a routine of rotation of the 2-D image for a number of rotational angles $\varphi_0, \varphi_1, \ldots, \varphi_i$, $i=0, 1, \ldots, q$, to compute the first $IIA_{size}$ (2-D image) for each rotation angle $\varphi_i$ of the number q thereof to construct a sequence of $IIA_{size}(\varphi_0)$, $IIA_{size}(\varphi_1), \ldots, IIA_{str}(\varphi_q)$, and to compute a first Index of Complexity of Image Anisotropic size ($CI_{size}$) as:

$$CI_{size}=(1/q)*\Sigma IIA_{size}(\varphi_i), i=0,1,\ldots,q$$

wherein the $CI_{size}$ is a characteristic of anisotropy of size for the 2-D image invariant to image alignment.

The subject system is further configured to receive from the imaging system at least a first and a second images under study, and the first parameterization system is further configured to compute in the second computing unit, a first $IIA_{str}$ (2-D image) for the first 2-D image, to compute in the second computing unit a second $IIA_{str}$ (2-D image) for the second 2-D image, to construct a first plot for "$IIA_{str}$ vs. Number of transects", and to compute the preferred approximating functions for each of the first and second 2-D images, respectively, to compare the first plots of the first and second 2-D images, to identify structural differences between the first and second 2-D images as a deviation between the first plots thereof, to quantify the identified structural difference based on the preferred approximating functions of the first and second 2-D images, and to apply a routine of localization of structural difference between the first and second 2-D images.

Another aspect of the present invention addresses a method for encryption/decryption of 2-D and 3-D arbitrary images. The subject method is envisioned in numerous areas of application, including, for example, in secure transmission of images between a sender and a receiver. The method includes a sequence of steps which may include:

establishing an imaging system and acquiring, by the imaging system, at least one image of an object under study, operatively coupling a first (Sender's) computing sub-system to the imaging system to receive therefrom at least one image of the object under study.

The subject method continues with:

configuring the first computing sub-system with a first motherboard and a first Central Processor Unit (CPU) operatively coupled to the first motherboard, coupling a pre-programmed first Read Only Memory (ROM) unit to the first motherboard and the first CPU, operatively coupling a Random Number Generator (RNG) to the first CPU and the first ROM unit, and operatively coupling a first database-of-transects to the first CPU, the RNG, and the first ROM unit. The first database-of-transects in the subject method is pre-configured with a plurality of binary images of sets of transects which are used in the image encryption/decryption.

The subject method proceeds further with the steps of:

operatively coupling a second (Receiver's) computing sub-system to the first computing sub-system over a communication channel, and configuring the second computing sub-system with a second motherboard and second CPU operatively coupled thereto, operatively coupling a pre-programmed second ROM unit to the second motherboard and the second CPU, and configuring the second ROM unit of the second computing sub-system with a second reconstruction unit operatively coupled to an output of the first computing sub-system.

One of the core steps of the subject method is to provide the second computing sub-system with a database-of-transects identical to the first database-of-transects. It may be accomplished either through permitting an access for the second computing sub-system to the first database-of-transects, or by operatively coupling a second database-of-transects to the second CPU and the second ROM unit, and configuring the second database-of-transects with a plurality of sets of transects.

The first database-of-transects and/or the second database-of-transects may be constantly updated, i.e., dynamically changing, thus synchronization of the first and second database-of-transects is provided throughout the entire encryption/decryption process which substantially increases security of the system.

The subject method further proceeds with the steps of:
configuring the first ROM unit in the first computing sub-system with a first computing unit, a first reconstruction unit coupled to the first computing unit, and a second computing unit coupled to the first reconstruction unit, generating a random number for the image under study, retrieving, from the first database-of-transects, a respective set of transects corresponding to the random number, applying, in the first computing unit, the respective set of transects to the image of the object under study, and computing, in the first computing unit, an N-partite graph $G(N)\_RN_K$ describing connectivity of points situated along any two nearby transects and an Y coordinate of the first point on each transect, and a table $F(M,N)\_RN_K$ which includes thickness of each layer along each transect $T_j$ $j=1, N$.

Subsequently, the subject method includes the steps of:
reconstructing, in the first reconstruction unit, the image under study based on the $G(N)$ and $F(M,N)$ computed in the first computing unit, thus producing a first reconstructed image $R_{CS}BIPF\_RN_K$, and constructing, in the second computing unit, the N-partite graph $R_{CS}G(N)\_RN_K$ and the $R_{CS}F(M,N)\_RN_K$ and first group of hash values for the first reconstructed image $R_{CS}BIPF\_RN_K$, where the first group of hash values is representative by a first group of anisotropy parameters of the first reconstructed image $R_{CS}BIPF\_RN_K$, and where the first group of anisotropy parameters comprises an Index of Anisotropy of the Structure ($IIA_{STR}$) and an Index of Anisotropy of Size ($IIA_{SIZE}$) of the first reconstructed image $R_{CS}BIPF\_RN_K$ produced by the first reconstruction unit.

The method further assumes the steps of:
removing the coordinates from the $R_{CS}G(N)\_RN_K$, and transmitting the encrypted image representation (including the $R_{CS}G(N)\_RN_K$ devoid of the coordinates, the $R_{CS}F(M,N)\_RN_K$ of the first reconstructed image $R_{CS}BIPF\_RN_K$, a secret code $SK-A\_RN_K$ corresponding to the respective set of transects corresponding to the number $RN_K$, and the $IIA_{STR}$ and $IIA_{SIZE}$ of the first reconstructed image $R_{CS}BIPF\_RN_K$) to the second computing sub-system over the communication channel.

The sender removes from the graph $R_{CS}G(N)\_RN_K$ the coordinates of points of intersection of the image under study with the respective set of transects prior to sending the information to the receiver.

Upon the encrypted image representation is received at the Receiver's (second encryption/decryption sub-system), the subject method proceeds with the steps of:

retrieving, by the second reconstruction unit in the second cooperating sub-system, the respective set of transects from the second database-of-transects in accordance with the secret code $SK-A\_RN_K$ received from the first computing sub-system, and producing a second reconstructed image based on the $R_{CS}G(N)\_RN_K$, $R_{CS}F(M,N)\_RN_K$, and $SK-A\_RN_K$ received from the first computing sub-system, operatively coupling a third computing unit to the second reconstruction unit, and computing, in the third computing unit, a second group of hash values for the second reconstructed image, where the second group of hash values for the second reconstructed image is represented by a second group of anisotropic parameters comprising $IIA_{STR}$ and $IIA_{SIZE}$ of the second reconstructed image $IIA_{STR}$ and $IIA_{SIZE}$.

Upon computing the second group of hash values for the second reconstructed image by the Receiver's encryption/decryption sub-system, the subject method assumes the steps of:

comparing the first and second groups of hash values computed for the first and second reconstructed images, respectively, and authenticating the second reconstructed image if the match between the first and second groups of hash values is found.

Otherwise, requesting the first encryption/decryption subsystem to re-send the image under study encrypted with another set of transects, and corresponding image encryption representation to the second encryption/decryption sub-system.

The subject method further comprises the steps of:

(a) configuring the Sender's (first) computing sub-system with a parameterization system adapted to perform parameterization of the image under study, where the parameterization sub-system includes a slicing subsystem configured for applying a predetermined slicing procedure to the image under study if the image under study is a 3-D image, (b) processing, in the slicing sub-system of the first parameterization system, the image under study to identify the image under study as a 2-D image under study or a 3-D image under study, and, if the image under study is a 3-D image, slicing the 3-D image into a set of 2-D slice images of the 3-D image under study;

(c) supplying a 2-D image, including the 2-D image under study or each of 2-D slice images of the set thereof, to the first computing unit and plotting, in the first computing unit, a plurality of transects ($T_1, T_2, \ldots, T_j, \ldots T_N, \ldots, T_M$) selected in accordance with the random number $RN_K$ from the first database-of-transects onto the 2-D image, where each of the plurality of transects extends from a respective initial point towards the periphery of the 2-D image in crossing relationship with at least one of features found in the 2-D image, and to convert the 2-D image into said N-partite graph $G(N)$ describing an anisotropic structure of the 2-D image.

The method further advances by:

(d) computing, in the first computing unit, a set of bi-partite graphs $G(T_j, T_{j+1})$, each of bi-partite graphs $G(T_j, T_{j+1})$ of the set of bi-partite graphs being situated between neighboring transects $T_j, T_{j+1}$ and $T_{j+1}, T_{j+2}$ respectively, and merging the neighboring bi-partite graphs $G(T_j, T_{j+1})$ into the N-partite graph $G(N)$ based on the common vertex along the transects $T_{j+1}$ situated between each pair of neighboring bi-partite graphs of the 2-D image, (e) inputting the set of neighboring bi-partite graphs $G(T_j, T_{j+1})$ into the second computing unit, (f) computing, in the second computing unit of the first computing sub-system, an Index of Intrinsic Anisotropy of structure $IIA_{str}(X_i, X_{i+1})$ for each bi-partite graph $G(T_j, T_{j+1})$ in the set thereof as:

$$IIA_{str}(X_i,X_{i+1})=[VT(X_i,X_{i+1})-VI(X_i,X_{i+1})]/VT(X_i,X_{i+1}),$$

where $X_i$ and $X_{i+1}$ correspond to transects $T_j$ and $T_{j+1}$ transecting the 2-D image, $VT(X_i, X_{i+1})$ is the total number of vertices in the $G(X_i, X_{i+1})$, and $VI(X_i, X_{i+1})$ is the total number of vertices in the $G(X_i, X_{i+1})$ forming isotropic edges; and (g) computing the Index of Intrinsic Anisotropy of structure $IIA_{str}$ ($X_1$, $X_N$) for a predetermined number N of transects, N=$N_{min+1}$, ..., $N_{max}$ as:

$$IIA_{str}(X_1,X_N)=1/(N-1)*[\Sigma IIA_{str}(X_i,X_{i+1})], i=1, \ldots, N-1.$$

The subject method is further augmented by:
operatively coupling a rotational unit to the first parameterization system, and
after the step (f), applying to the 2-D image a routine of rotation of the first reconstructed image for a number of rotation angles $\varphi_i$, i=0, 1, ..., q
computing the $IIA_{str}$ (2-D image) for each rotation angle $\varphi_i$ of the number thereof to construct a sequence of $IIA_{str}(\varphi_0)$, $IIA_{str}(\varphi_1)$, ..., $IIA_{str}(\varphi_q)$, and
computing an Index of Complexity of Image Anisotropic structure ($CI_{str}$) as a structural characteristic of the 2-D image invariant to the image alignment,
where $CI_{str}=(1/q)*\Sigma IIA_{str}(\varphi_i)$, i=1, ..., q, where q is a number of image rotations applied to the 2-D image.

The subject method further comprises the steps of:
in the step (e), computing, in the second computing unit, an Index of Intrinsic Anisotropy of size ($IIA_{size}$) for the first reconstructed image across the N transects positioned across a sampling area of the first reconstructed image through the steps of:
plotting N transects across the sampling area of the reconstructed image;
computing a thickness of a layer in the first reconstructed image situated across each transect $T_j$, j=1, ..., N;
constructing a table W ($w_{i,j}$), where $w_{i,j}$ is a thickness of a layer i passing across the transect $T_j$;
normalizing the thickness $w_{i,j}$ as:

$$w(\text{normalized for } T_j)=[w_i-\min(w_i)]/[\max(w_i)-\min(w_i)];$$

where $\min(w_i)$ is the minimal value of w and $\max(w_i)$ is the maximal value of $w_i$;
calculating a deviation $D_j$ of a thickness $w_i$ of the layer i along the transect $T_j$ as:

$$D_j=(1/n_j)*\{\Sigma[w(\text{normalized for } T_j)_i - w(\text{average normalized})_i]^2\}^{1/2}$$

where $n_j$ is the number of layers situated along the transect $T_j$, and w (average normalized) is the average normalized thickness of the layer along the transect $T_j$;
repeating said normalization routine for the thickness $w_{i,j}$ and calculation of the deviation $D_j$ for the transects $T_1$, $T_2$, ..., $T_N$, resulting in a set of deviations $D_1$, $D_2$, ..., $D_N$ of thicknesses of the layers in the 2-D image;
calculating the $IIA_{size}$ for N transects as:

$$IIA_{size}(\text{for } N \text{ transects})=(1/N)*\Sigma(D_k), k=1, \ldots, N;$$

computing the $IIA_{size}$ for a number of transects N+1, N+2, ..., N+M, and
computing the $IIA_{size}$ (reconstructed image) for the first reconstructed image as:

$$IIA_{size}(\text{reconstructed image})=(1/M)*\Sigma[IIA_{size}(\text{for } N+k \text{ transects})], k=1, \ldots, M.$$

In the step (e), the subject method advances by applying to the first reconstructed image a routine of rotation of the 2-D image for a number of rotational angles $\varphi_0, \varphi_1, \ldots, \varphi_i$, i=0, 1, ..., q, computing the $IIA_{size}$ (2-D image) for each rotation angle $\varphi_i$ of the number q thereof to construct a sequence of $IIA_{size}(\varphi_0)$, $IIA_{size}(\varphi_1)$, ..., $IIA_{str}(\varphi_q)$, and computing an Index of Complexity of Image Anisotropic size ($CI_{size}$) as:

$$CI_{size}=(1/q)*\Sigma IIA_{size}(\varphi_i), i=0,1, \ldots, q$$

wherein the $CI_{size}$ is a characteristic of anisotropy of size for the first reconstructed image invariant to image alignment.

In the step (c), the method of the present invention is executed through the steps of:
processing a first reconstructed image and an additional reconstructed image,
computing a first $IIA_{str}$ (2-D image) for the first reconstructed image,
computing a second $IIA_{str}$ (2-D image) for the additional reconstructed image,
constructing, in the step (f), the first plot for "$IIA_{str}$ vs. Number of transects", and computing the preferred approximating functions for each of the first and additional reconstructed images, respectively,
comparing the first plots of the first and additional reconstructed images,
identifying structural differences between the first and additional reconstructed images as deviation between the first plots thereof, and
quantifying the identified structural difference based on the preferred approximating functions of the first and additional reconstructed images.

For a first and second 2-D images under study, the subject method applies a routine of localization of structural difference between the first and second 2-D images through the steps of:
in the step (e), computing N-partite graphs $G_1$ (N) and $G_2$ (N) of the first and second 2-D images, respectively,
constructing tables $F_1$ (M,N) and $F_2$ (M,N) for each of the first and second 2-D images, each of the tables $F_1$ (M,N) and $F_2$ (M,N) includes coordinates of points of intersections of the transects N transecting the 2-D image with layers M existing therein, wherein each vertex in the N-partite graphs $G_1$ (N) and $G_2$ (N) has a coordinate X, Y stored in the $F_1$ (M,N) and $F_2$ (M,N), respectively,
comparing the coordinates X, Y of vertices located along the transect $T_j$ in the N-partite graphs $G_1$ (N) and $G_2$ (N), and along the transect $T_1$ in the N-partite graphs $G_1$ (N) and $G_2$ (N), resulting in a set of equal vertices $EV_j$ coinciding in the $G_1$ (N) and $G_1$ (N) and equal edges corresponding thereto, resulting in comparison of areas of the first and second 2-D images situated between the transects $T_j$ and $T_{j+1}$, and
pinpointing an area of structured difference between the first and second 2-D images by removing from the $G_1$ (N) the edges equal to edges in said $G_2$ (N), and removing the vertices connected by the edges.

The subject method further comprises the steps of:
in the step (b), inputting in the slicing sub-system unit, a 3-D image A in the raster format,
slicing the 3-D image A into the first set of 2-D slice images, wherein 3-D image A={slice 1 (2-D image A), slice 2 (2-D image A), ..., slice Q (2-D image A)},
in the step (f), computing the parameters $IIA_{str}$ and $IIA_{size}$ for each 2-D slice image from the first set of 2-D slice images, resulting in a second set including $IIA_{str}$ (slice 1), $IIA_{str}$ (slice 2), ..., $IIA_{str}$ (slice Q), and a third set including $IIA_{size}$ (slice 1), $IIA_{size}$ (slice 2), ..., $IIA_{size}$ (slice Q),
constructing a second plot for "$IIA_{str}$ vs. slice number", and a third plot for "$IIA_{size}$ vs. slice number", averaging the parameters $IIA_{str}$ and $IIA_{size}$ of the 2-D slice images in the second and third sets thereof, respectively, resulting in parameters $IIA_{str}$ (3-D image) and $IIA_{size}$ (3-D image) for the 3-D image A under study, where $IIA_{str}$(3-D image)=$1/Q*[IIA_{str}$(Slice1)+$IIA_{str}$(Slice2)+ . . . +$IIA_{str}$(SliceQ)], $IIA_{size}$(3-D image)=$1/Q*[IIA_{size}$(Slice1)+$IIA_{size}$(Slice2)+ . . . +$IIA_{size}$(SliceQ)], and computing the Index of Complexity of Image Anisotropy (IACom) for the 3-D image under study as:

IACom(3-D image)=$[IIA_{size}$(3-D image)$^2$+$IIA_{str}$(3-D image)$^2]^{1/2}$, and in the step (g), outputting the $IIA_{str}$ (3-D image), $IIA_{size}$ (3-D image), IACom (3-D image) and the second and third plots into the output system.

In the step (c), the first computing unit, computes a model of the 2-D image represented by the N-partite graph G (N) and a Table F(M,N) comprising XY coordinates of points of intersection of segments M in the 2-D image with transects $T_i, \ldots, T_j, T_{j+1}, \ldots T_N$, where j=1, . . . , N, inputs the G (N) and the Table F(M,N) into the first Reconstruction Unit, for performing a reconstruction routine by:
(h) connecting a vertex $q_f$ located on the transect $T_j$ with a vertex $p_k$ located on the transect $T_{j+1}$, if the vertexes $q_f$ and $p_k$ belong to the same segment M of the 2-D image situated between $T_j$ and $T_{j+1}$ for k<M until k=M;
(i) connecting the vertex $q_f$ located on the transect $T_j$ with a vertex $q_{f+1}$ located on the transect $T_j$, if the vertex $q_f$ and the vertex $q_{f+1}$ belong to the same segment M of said 2-D image situated between the transects $T_j$ and $T_{j+1}$ for f<M until f=M;
(j) connecting the vertex $p_k$ located on the transect $T_{j+1}$ with a vertex $p_{k+1}$ located on the transect $T_{j+1}$, if $p_k$ and $p_{k+1}$ belong to the same segment M of said 2-D image situated between the transects $T_j$ and $T_{j+1}$ for k<M until k=M;
(k) repeating steps (h)-(j) for bi-partite graphs $G(T_1, T_2), \ldots, G(T_j, T_{j+1}), \ldots, G(T_{N-1}, T_N)$ while j<N−1, resulting in a set of binary matrices BM $(T_1, T_2), \ldots,$ BM $(T_j, T_{j+1}), \ldots,$ BM $(T_{n-1}, T_N)$ describing connections between vertices located on the transects $T_j$ and $T_{j+1}$;
(l) constructing the N-partite graph G (N) of the 2-D image in visual format by placing vertices on the 2-D image in correspondence to the Table F(M,N) and drawing edges on the 2-D image based on the set of binary matrices BM $(T_j, T_{j+1})$, thereby forming a reconstructed image for the 2-D image; and
(m) outputting the first reconstructed image.

The subject method, further comprises the steps of:
in the step (a), incorporating a raster-vector-raster converting unit in the first computing sub-system in operative coupling to an input of the slicing sub-system;
in the step (c), supplying the 2-D image in the raster format to the raster-vector-raster converting unit,
converting the 2-D image into the vector format, thereby forming a first 2-D image,
rotating the first 2-D image to form image Img ($\varphi_i$), where $\varphi_i$ is the angle of rotation of the first 2-D image, i=0, 1, . . . , q,
subsequently storing the image Img (pi) in the raster format, thereby forming a second 2-D image, and supplying the second 2-D image in the raster format to the first computing unit.

In still another aspect, the present invention provides a method for fully automated encryption/decryption of medical images, including parameterization of size and structure of 3-D lesions. The method is initiated by acquiring a grayscale medical image of an anatomical area of interest. A medical doctor analyzes the image, and outlines a lesion found in the grayscale medical image.

Subsequently, the grayscale medical image is converted into a binary 3-D image, and brightness of each pixel in the binary 3-D image computed, where an elevation E ($p_i$) of a pixel $p_i$ is represented as:

$E(p_i)=1/B(p_i)$, where $B(p_i)$ is a brightness of the pixel $p_i$

Subsequently, a set of contour reliefs of the grayscale medical image is constructed, where each contour relief is represented by a line connecting pixels with equal brightness, and the lesion found in the grayscale medical image is divided into p contour intervals $CI_i$, i=1, . . . , p.

The contour intervals $CI_i$, i=1, . . . , p, are stored in a file $F_i$ in the raster format, and the file $F_i$ is converted from the raster format into the CSV format. Furthermore, pixels p which belong to the same contour interval are identified, and the area Area ($CI_i$) of each contour interval $CI_i$ is computed, wherein each contour interval CI, is associated with brightness B ($CI_i$) of pixels included in the Area ($CI_i$). Subsequently, the size of the lesion is then computed based on the B ($CI_i$) and $CI_i$.

The area Area (lesion q) of lesion q is computed as:

Area(lesion $q$)=$\{\Sigma[Area(CI_i)*w_i]\}/(\Sigma w_i), i=1, \ldots, p$, where $w_i$ is a measure of contribution of $CI_i$ to the area of 2-D lesion q defined by a medical doctor.

When the grayscale medical image is a 3-D grayscale image, slicing routine is applied to the 3-D grayscale medical image to obtain a predetermined number of 2-D grayscale slice images which combinably form the 3-D grayscale image under study.

Each 2-D grayscale slice image is subsequently converted into a corresponding 2-D binary image, and a thickness of each 2-D grayscale slice image is determined. A volume of the lesion q within each binary slice j is further computed as:

Volume(lesion $q$,slice $j$)=Area(lesion $q$,slice $j$)*slice thickness.

For each 2-D binary slice j of the lesion q, the Index of Intrinsic Anisotropy of structure ($IIA_{str}$), Index of Intrinsic Anisotropy of size ($IIA_{size}$), and Index of Complexity of Image Anisotropy (IACom) are computed for all contour intervals $CI_i$, i=1, . . . , p, for all 2-D slice images of the 3-D grayscale medical image, and the structure of the lesion for all 2-D slice images of the 3-D grayscale medical image is computed based on the $IIA_{str}$, $IIA_{size}$, IACom. Subsequently, the $IIA_{str}$, $IIA_{size}$, IACom for the 3-D lesion q are computed.

Correspondence between lesions lesion$_q$ (slice$_i$) and lesion$_k$ (slice$_{i+1}$) found in nearby 2-D slice images i and i+1 is determined based on a relationship between a distance H between pixels of the lesion$_q$ (slice$_i$) and the lesion$_k$ (slice$_{i+1}$).

The volume of the lesion across the predetermined number of 2-D slice images is computed as:

Volume(lesion$_q$ in 3-$D$)=$\Sigma$Volume(lesion $q$,slice $i$),$i=1, \ldots, m$, where m is the predetermined number of 2-D slice images in the lesion on the 3-D grayscale medical image.

These and other objects and advantages of the present invention will become more apparent when considered in view of further description accompanying the Patent Drawings.

BRIEF DESCRIPTION OF THE DRAWINGS

FIG. 1A depicts the sender's side, and FIG. 1B depicts the receiver's side, respectively;

FIG. 3A shows the simplest complexity, FIG. 3B shows the simple complexity, FIG. 3C shows the medium complexity, and FIG. 3D shows the high complexity levels of the transect sets;

FIG. 9A is representation of an image under study and its bipartite graphs situated between three transects (A-B and B-C);

FIG. 9B is a representation of an image under study and its bipartite graphs situated between four transects (A-B, B-C, and C-D);

FIG. 10A-10D are representations of images of various incremental patterns of various size and origins and corresponding graphs of $IIA_{str}$ vs. number of transects, where FIG. 10A is representative of the image of dunes in Arabia Peninsula (Image size in hundreds kilometers), FIG. 10B is representative of the image of Transverse Aeolian Ridges on Mars (Image size in hundreds meters), FIG. 10C is representative of the image of a salmon fish scale (Image size in millimeters), FIG. 10D is representative of the image of Nano-ripples (Image size in nano-scale);

FIG. 12B is representative of plots $IIA_{str}$ and $IIA_{size}$ as a function of an angle of rotation;

FIGS. 13A-13B are representative of the sensitivity of the $IIA_{str}$ to structural changes of an incremental pattern, with FIG. 13A showing the images of the fish scale before and after minor structural changes (rectangles and circles indicate the structural differences between fish scales), and FIG. 13B is a graph representation of the differences in Index of Intrinsic Anisotropy of structure between two fish scales;

FIGS. 15A-15C are representative of the Index of Intrinsic Anisotropy of structure for images of geometrical figures, where FIG. 15A shows the Index of Intrinsic Anisotropy of structure for the image of a circle as an example of an isotropic figure, FIG. 15B shows the Index of Intrinsic Anisotropy of structure for the image of a triangle, as an example of an isotropic figure, and FIG. 15C shows the Index of Intrinsic Anisotropy of structure for the combined image of the triangle and the circle as an example of the figure with anisotropic structure;

FIG. 15D illustrates a slicing routine for 3-D images, and FIG. 15E is representative of plots for $IIA_{str}$ (3-D) and $IIA_{size}$ (3-D) vs. slice number;

FIG. 19A shows the image of an area under study, FIG. 19B is an image of the shore line in the grayscale format, FIG. 19C is an image of the shore line in the binary format, and FIG. 19D is the plot for "Index of Intrinsic Anisotropy of structure vs. Relative distance between transects" for the image of the shore line;

FIG. 20A is a grayscale image of the leaf under study, FIG. 20B is representative of a binary image of the left and right parts of the leaf under study and corresponding plots for "Index of Intrinsic Anisotropy of structure vs. Number of transects", and FIG. 20C is representative of the visualization of the difference in $IIA_{str}$ between the left and right parts of the leaf under study;

FIG. 21A is a binary image of the seismic profile, FIG. 21B is a corresponding plot for the "Index of Intrinsic Anisotropy of structure vs. Number of transects", and FIG. 21C is a corresponding plot for the "Index of Intrinsic Anisotropy of structure vs. Relative distance between transects";

FIG. 22A is the grayscale MRI image under study, FIG. 22S is a plot representative of the comparison of the graphs of FIGS. 22K-22R;

FIG. 24A is an original binary image of the fingerprint, FIG. 24B is a modified image of fingerprint with minor structural changes indicated by encircled areas, FIG. 24C is the plot for the "Index of Intrinsic Anisotropy of structure vs Number of transects" before structural changes, FIG. 24D is the plot for the "Index of Intrinsic Anisotropy of structure vs Number of transects" after structural changes, and FIG. 24E is a graph showing differences in the Indices of Structural Anisotropy of structure in absolute values (before changes minus after changes) vs. Number of transects;

FIG. 26A is an original image of the fingerprint, FIG. 26B is an image after reconstruction (30 transects are used for image reconstruction), FIG. 26C is an image after reconstruction (60 transects are used for image reconstruction), and FIG. 26D is an image after reconstruction (170 transects are used for image reconstruction);

FIGS. 26E-26F are representative of the results of reconstruction technique applied to a handwritten sample, where FIG. 26E shows the original image, and FIG. 26F shows the image after reconstruction;

FIGS. 27A-27D are representative of the grayscale and binary images of a face and the corresponding plots for the "Index of Intrinsic Anisotropy of structure vs. Number of transects", where FIG. 27A is a grayscale image under study, FIG. 27B is a binary image of the face for Bmin(1)=81 and Bmax(1)=90, and corresponding plot for "$IIA_{str}$ vs. Number of transects", FIG. 27C is a binary image of the face for Bmin(2)=91 and Bmax(2)=100, and corresponding plot for "$IIA_{str}$ vs. Number of transects", and FIG. 27D is a binary image of the face for Bmin(3)=101 and Bmax(3)=110, and corresponding plot for "$IIA_{str}$ vs. Number of transects";

FIGS. 30A-30D are representative of an MRI of a tumor, where FIG. 30A is an MRI of a tumor, FIG. 30B is an enlarged 2-D grayscale image of the tumor with fuzzy margins depicted in FIG. 30A, FIG. 30C is a 2-D binary image of the tumor shown in FIGS. 30A, and 30D is a 3-D binary image of the tumor shown in FIG. 30A;

FIGS. 31A-31C are representative of the tumor structure for the 3-D image depicted in FIG. 30D for low resolution (FIG. 31A), medium resolution (FIG. 31B), and high resolution (FIG. 31C);

FIGS. 32A-32D are representative of the tumor of FIGS. 30A-30D in three contour intervals, where FIG. 32A is a 2-D binary image of the tumor for 3 contour intervals; FIG. 32B is representative of the contour interval 1; FIG. 32C is representative of the contour interval 2; and FIG. 32D is representative of the contour interval 3;

DETAILED DESCRIPTION OF THE PREFERRED EMBODIMENT(S)

Figure 1A:
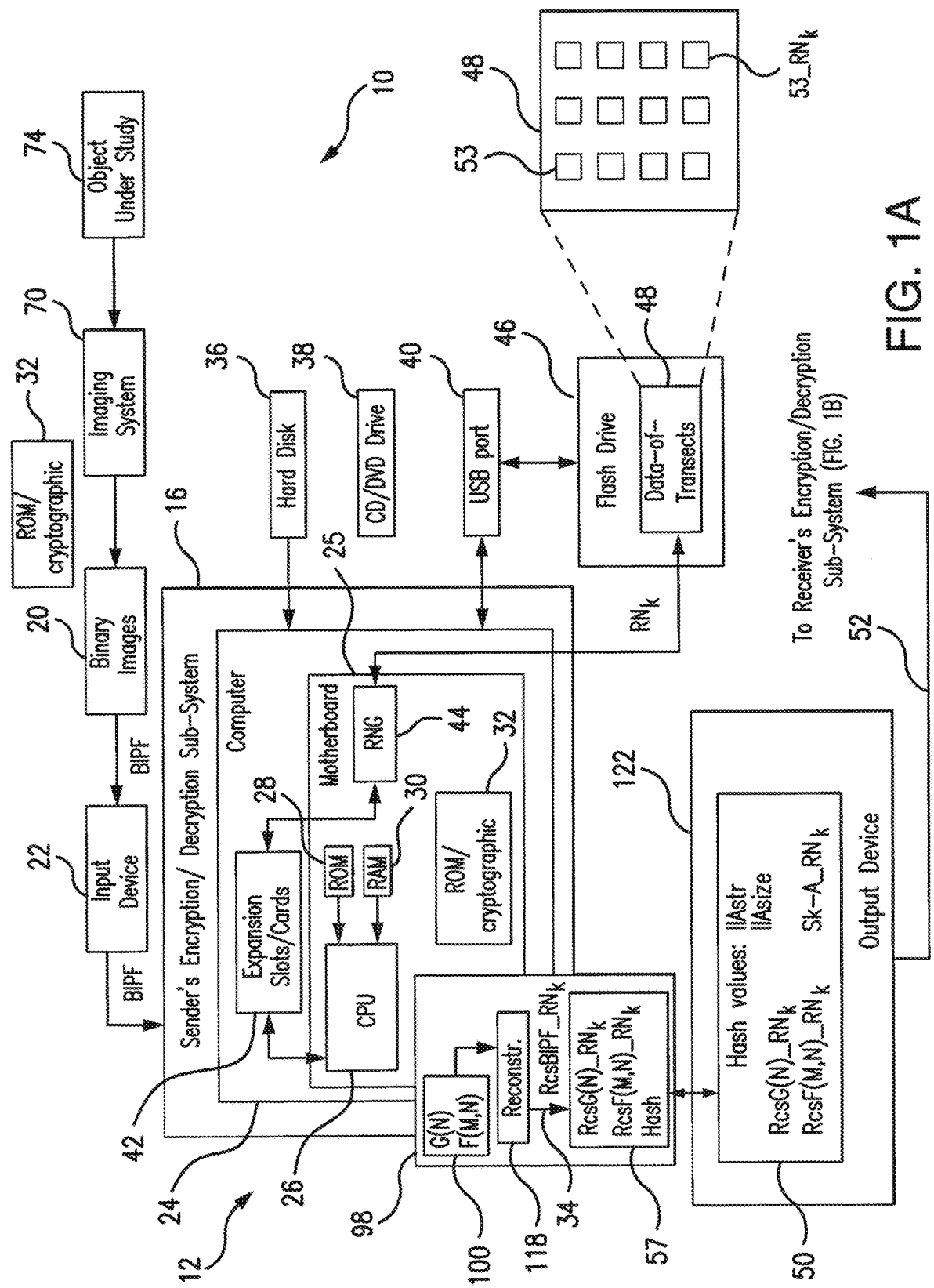
FIGS. 1A-1B are schematic representations of the subject system for an image decryption/encryption, where

Referring to FIGS. 1A-1B, 2, 4, and 5-8, the subject system 10 for encryption/decryption of an arbitrary 2-D or 3-D image uses a computer system adapted specifically to support a unique approach for images encryption/decryption which avoids the individual pixels encryption/decryption, but operate with representations of the structural and dimentional properties of an image in its entirety. The subject system and method operate with the N-partite graph G(N) and the Table F(M,N) of arbitrary images, which are numeric representations of the structure and dimentons, respectively, of an arbitrary image, as will be detailed in further paragraphs.

The subject system 10 is uniquely equipped for a processing assuming routine application of various sets of transects $T_1, \ldots, T_N$ to a binary image as a tool which permits to convert binary image into its quantitative representations, i.e., G(N) and F(M,N). The subject system also uses transects to solve the reverse problem, i.e., to reconstruct the binary image in the pixel format using the G(N) and F(M,N) parameters of the binary image with a high level of accuracy.

The subject encryption/decryption system and method may find the use in numerous applications requiring images encryption/decryption. As one of the applications of the subject system and method, the present system and method may be uniquely suitable, and will be further described, for a secure transmission of an arbitrary image between a sender 12 and a receiver 14.

Transects $T_1, \ldots, T_N$ are presented in the form of a binary image describing geometrical configuration of each individual transect. The set of transects may also be seen as a coordinate system relative to which an image is encrypted/decrypted. Thus, the transects will also be referred to herein intermittently as coordinate systems.

There are numerous configurations of the coordinate systems (transects) which can be used for the image encryption/decryption process supported by the present system. As exemplified in FIGS. 3A-3D, endless possibilities exist for geometrical configurations of the transects $T_1, \ldots, T_N$.

Shown in FIG. 3A is a low (simple) complexity of geometrical configuration of the transects (or a coordinate system). Shown in FIG. 3A, all transects $T_1$ through $T_N$ are straight parallel lines extending equidistant each with respect to the other. Distance between two nearby transects remain constant through their entire length. The coordinate system (or the simplest transects set) shown in FIG. 3A, is not recommended for an image encryption. Assuming, for example, an image is encrypted using five different sets of transcripts of FIG. 3A, each differing from another by a distance between adjacent transects, for example, 3, 5, 8, 11, and 15 pixels of the image between adjacent transects. In this case, an unauthorized entity would examine only five different configurations of coordinate systems (transects sets) to reconstruct the encrypted image. Thus, the simplest complexity is not suitable for secure transmission protocol.

Shown in FIG. 3B, is a simple complexity of the transects set (coordinate system). In FIG. 3B, all transects $T_1$ through $T_N$ are straight lines, with the distance between any two adjacent transects randomly defined. Assuming, for example, that there are two alternative distances exist for a distance between adjacent transects, for example, 4 and 7 pixels therebetween. In this case, an unauthorized entity needs to examine $2^N$ different configurations of coordinate systems (transect sets).

If there are three alternative distances between adjacent transects, then an unauthorized entity is to examine $3^N$ different configurations of the coordinate systems. Both values $2^N$ and $3^N$ require substantial computer power even for a small number of transects. For instance, if N=20 (20 transects are used in parameterization of a binary image), then more than one million possible versions of coordinate systems are necessary to be examined in order to reconstruct image. Even though with the simple complexity, the coordinate system configured as shown in FIG. 3B, can be used in image encryption for secure transmission from a sender to a receiver.

FIG. 3C depicts a medium complexity of coordinate system (transect set). All transects $T_1, \ldots, T_N$ are free-hand lines of identical shape. The distances between any two adjacent transects are randomly defined. Assuming that 1,000 possible versions exist for the shape of transects (S=1000). Even if an unauthorized entity knows these versions, the number of possible versions of free-hand transects sets necessary to be examined in order to reconstruct an encrypted image $2^N \times S$ and $3^N \times S$.

In the present system, the shape of transects is available only for the sender and authorized receiver, as will be detailed in further paragraphs, and countless versions exist for the free-hand shape of transects. Thus, the use of the medium complexity of the transect sets guarantees high level security in the present encryption/decryption system.

Shown in FIG. 3D, is a high complexity coordinate system (transect set). As shown in FIG. 3D, all transects $T_1, \ldots T_N$ are all free-hand lines with no two transects having an identical shape. Distances between transects are defined randomly. Such coordinate system guarantees the highest possible level of security for transmission of images via public communication channels.

Configuration of each set of transects corresponding to the random number $RN_K$ may be considered as a unique secret key SK-A (also referred to herein as an SK-A_$RN_K$ for the number $RN_k$) available only to the sender and the authorized receiver for encryption/decryption of a specific image.

Another database-of-transects, which is identical to the Sender's database-of-transects may be installed at the Receiver's side. Alternatively, the Receiver can have an access to the Sender's database-of-transects.

The subject system 10 is equipped with the database(s) of different versions of $T_1, \ldots, T_N$ (Database-of-Transects), and the information on the transects set for a particular image processing is available exclusively for the sender and authorized receiver.

If the subject system uses the Sender's databases-of-transects and the receiver's side database-of-transects, each database-of-transects contains thousands of different transects sets (or coordinate systems) of each category shown in FIGS. 3B, 3C, and 3D. The receiver is provided with a respective one-time secret key SK-A which identified which transects set from the receiver's transects database is to be used for the image description. The one-time secret key is randomly selected for processing of each respective image. This concept is contributory to further the security of the image transmission.

The image parameters by themselves do not provide any level of security G(N) and F(M,N) without a specified transect set from the Database-of-Transects $T_1, \ldots, T_N$. Each transects set $T_1, \ldots, T_N$ forms the coordinate system supporting the image conversion into G(N) and F(M,N), and serves as the one-time secret key (SK-A) transmitted by the sender to a target (authorized) receiver, thus allowing only the authorizer/receiver to reconstruct the encrypted image from the G(N) and F(M,N).

One-time secret key method is one of the most secure approaches in cryptography (as presented, for example, in Bruce Schneier, "Applied Cryptography: Protocols, Algorithms and Source Code in C,", 1996, John Wiley & Sons, 784 Pages, ISBN 978-1-119-09672-6; and Frank Rubin, "One-time pad cryptography", Cryptologia, 2010, 20:4, 359-364). In the subject system, the one-time secret key concept is based on choosing a coordinate system (which serves as a secret key representation) to be shared between the sender and the authorized receiver.

Because endless possibilities exist for geometrical configurations of $T_1, \ldots, T_N$ and different versions of transects' sequence could be generated by the subject system, the Database-of-Transects comprises an endless number of secret keys SK-A, wherein each secret key SK-A corresponds to a specific transects set to be used by both the sender and the receiver. This allows to assign to each image only one-time secret key SK-A. Thus, the subject system constitutes one-time shared secret key encryption system, meaning that an individual image is assigned a specific individual randomly chosen secret key.

As another level of security in the subject system, hash values are transmitted from the Sender to the Receiver. Cryptography systems customarily generate a numeric value called hash value, as for example discussed in P. Rogaway, et al., "Cryptographic hash-function basics: Definitions, implications, and separations for preimage resistance, second-preimage resistance, and collision resistance", In: Roy, B. K., Meier, W. (eds.) Fast Software Encryption—FSE 2004. LNCS, Vol. 3017, pp. 371-388. Springer (2004). Hash values uniquely identify data and verify the integrity of data transmitted through insecure channels. A hash value has to be sensitive to small changes in encrypting data.

In the subject system, unlike in any other cryptographic system, $IIA_{str}$ and $IIA_{size}$ of an image are used as hash values. The IIAstr and IIAsize are extremely sensitive to minor changes in image structure and size (as depicted in FIGS. 13A-13B), and thus they can be used as hash values:

Hash-value-1 = $IIA_{str}$, and

Hash-value-2 = $IIA_{size}$.

Figure 1B:
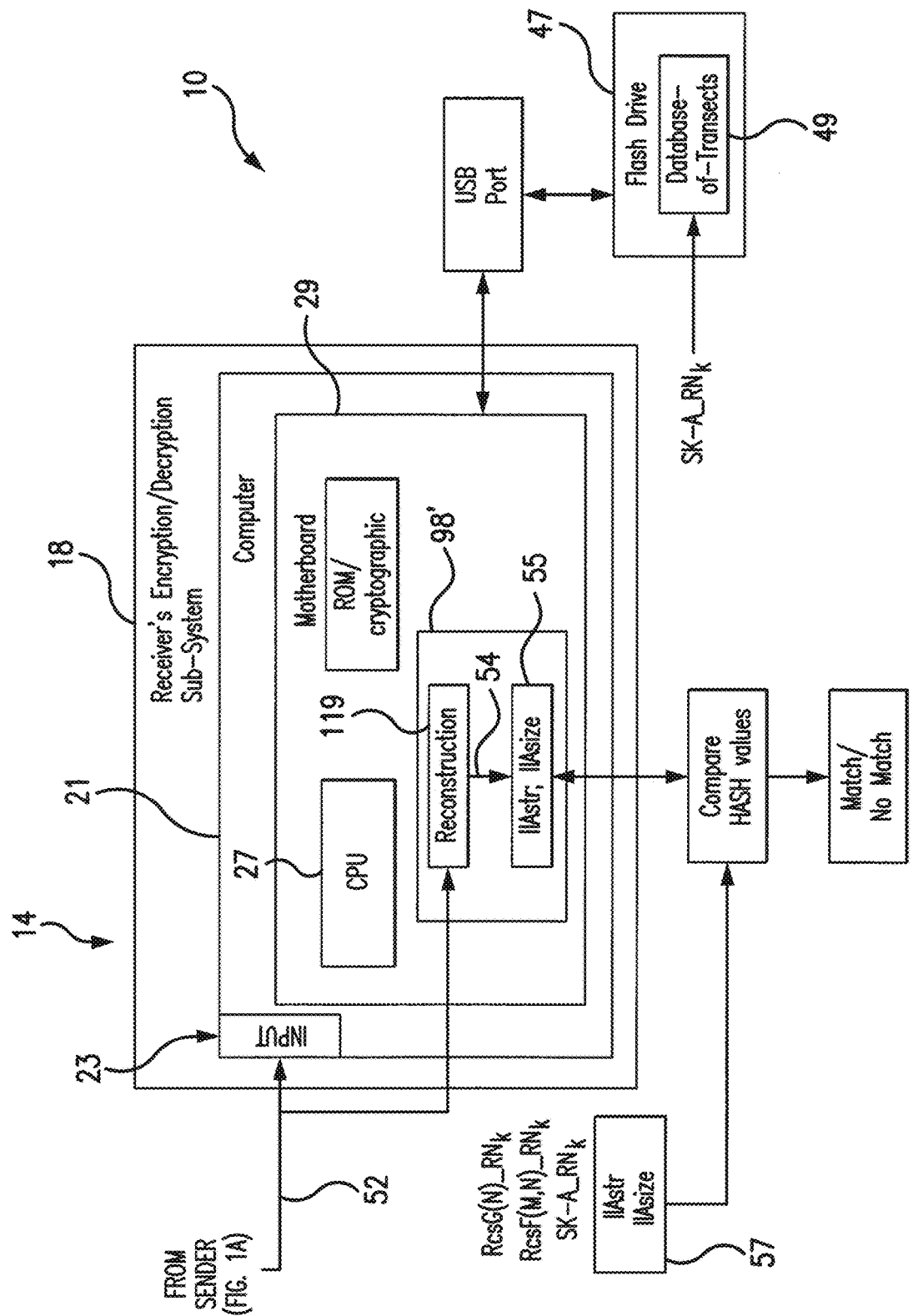
Figure 2:
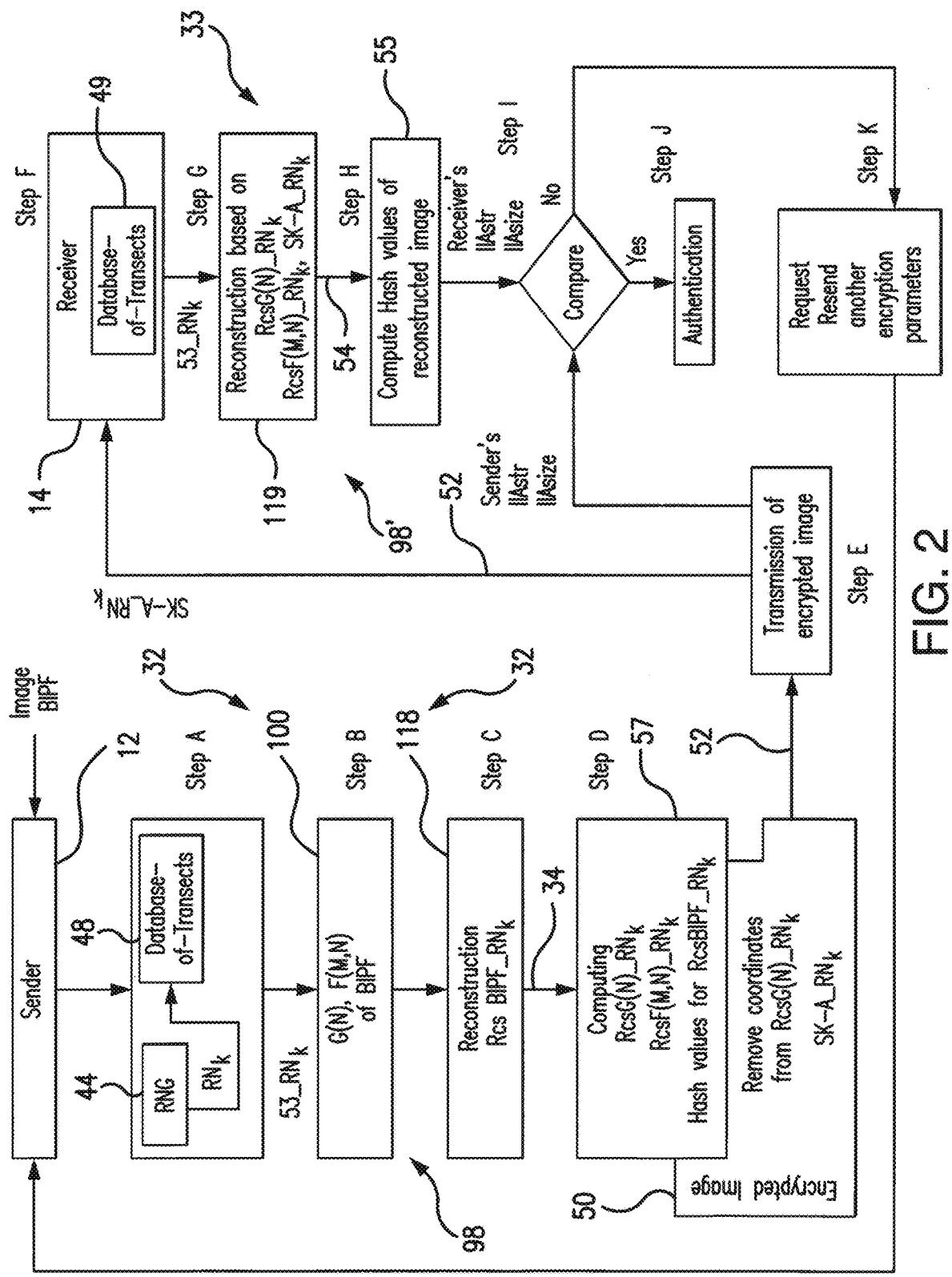
FIG. 2 is a conceptual representation of the subject system operation for a secure transmission of an image supported by the image encryption/decryption at the sender and receiver, respectively.
Figure 3:
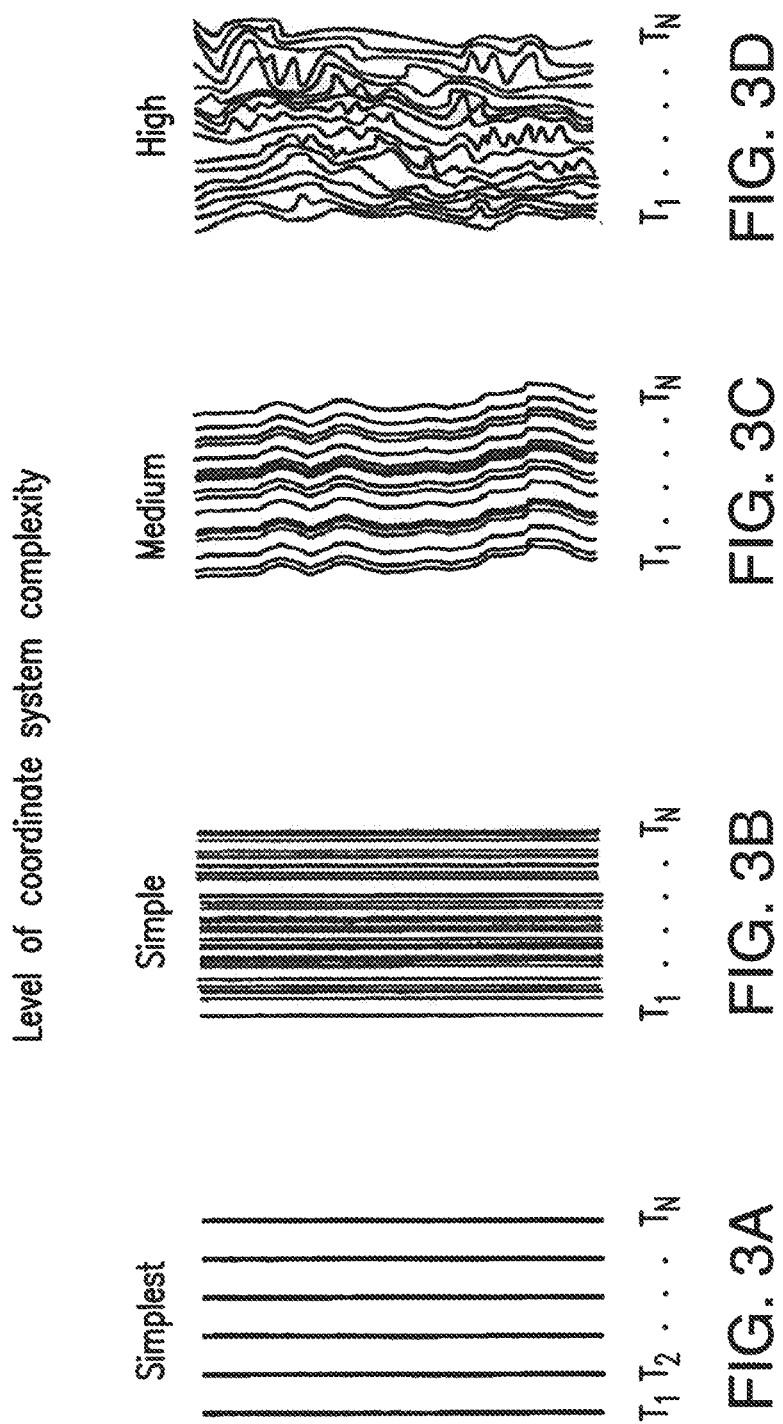
FIGS. 3A-3D are diagrams representative of various levels of complexity of the transect sets used in the encryption/decryption of an image, where

Referring to FIGS. 1A-1B and 2, the subject system 10 is configured for encrypted communication of an image between the Sender 12 and the Receiver 14. Each of the Sender 12 and Receiver 14 is equipped with a respective computer sub-system specifically adapted, on the hardware and software levels, for the subject encryption/decryption of an arbitrary image.

Shown in FIG. 1A, is a Sender's encryption/decryption sub-system 16 which receives an image 20 for encryption. The Sender's encryption/decryption sub-system 16 is equipped with a Computer system 24 which is uniquely configured with hardware features permitting the subject encryption/decryption of an arbitrary image not available in general purpose computers.

The image 20, for example, the Binary Image in Pixel Format (BIPF), is supplied from the Imaging System 70 to the subject Computer system 24 through an Input device 22. The Input device 22 may serve as the image format converter (as will be presented in further paragraphs) or any other input interface through which the image 20 is supplied to the Computer system 24.

The Computer system 24 includes a motherboard 25 and a processor unit (CPU) 26 residing on, or operatively coupled to, the motherboard 25. The Computer System 24, also is equipped with a Read Only Memory (ROM) 28 and Random Access Memory (RAM) 30.

Uniquely for the configuration of the subject system 10, the Computer system 24 includes a pre-programmed Read-Only Memory (ROM) hardware unit 32 which constitutes an independent hardware unit that is physically mounted on the motherboard 25 in operative cooperation with the CPU 26, and which is configured to perform (in conjunction with the CPU 26) all cryptographic operations with respect to the image 20.

The functionality of the ROM unit 32 (in cooperation with the CPU 26) supports numerous routines, such as, for example:

a) application of transects $T_1, \ldots, T_N$ to convert the binary image 20 into the image parameters G(N) and F(M, N);

b) reconstruction of the original image from the parameters G(N) and F(M, N) to form a reconstructed image 34 corresponding to the original image 20; and c) calculation of the Index of Intrinsic Anisotropy of Structure ($IIA_{STR}$) and the Index of Intrinsic Anisotropy of Size ($IIA_{SIZE}$) of the reconstructed image 34. In the subject system, the indices $IIA_{STR}$ and $IIA_{SIZE}$ are used as hash values to verify the integrity of the encrypted image representation transmitted through the communication channel 52, as will be presented in detail in further paragraphs.

Further, the Computer system 24 includes a hard disk drive 36, a CD/DVD drive 38, a USB port 40, and an Expansion Slots and Cards Unit 42 coupled to the CPU 26. The units 36, 38, 40, and 42 are standard for computer systems. However, unique for the subject system, in addition to the cryptographic ROM unit 32, is inclusion of the true Random Number Generator (RNG) 44 which is operatively coupled to the processor 26 via the Expansion Slots and Card Unit 42.

The RNG 44 is a hardware unit that generates random numbers. The RNG 44 in the subject system is an electronics unit that may be installed by a manufacturer into the computer memory via the Expansion Slots and Cards Unit 42. The RNG 44 used in the subject system may be manufactured, for example, by Intel USA; ID Quantique SA, Switzerland; Kidekan, South Korea; LETech, Japan, or any other company manufacturing RNGs.

Another hardware feature unique for the subject system is represented by a database-of-transects 48 coupled to the Computer system 24 through the USB port 40. The database-of-transects 48 may reside, for example, with an external USB memory 46 configured with a "write" protected switch on the flash drive removably coupled to the USB port 40.

The RNG 44 in the present system 10 is used to generate random numbers $RN_k$ in accordance with which the subject system determines a respective set of transects 53_$RN_k$ in the database-of-transects 48 to be available to the sender and the authorized receiver for the secure transmission of the parameterized image.

For each image 20 to be encoded at and transmitted out by the Sender 12, both the Sender 12 and only the authorized Receiver 14 share a one-time secret key (SK-A_$RN_k$) which identifies a corresponding set of transects from the database-of-transects 48. The secret key is determined by the random number RNK generated by the RNG 44 for each image 20. In this fashion, only the authorized Receiver 14 is aware of the set of transects applied to the image 20 for encryption at the Sender, and can use this set of transects for decryption.

As a matter of fact, without knowing the set of the transects applied to the image in question for encryption, an unauthorized Receiver cannot decode the image, especially if transects of the simple, medium or high levels of complexity (shown for example in FIGS. 3B-3D) have been used for the image encryption. Such scheme tremendously increases security of the encryption/decryption process in the subject system 10.

Referring to FIG. 1B, the Receiver 14 is equipped with a Receiver's encryption/decryption sub-system 18 which is interconnected with the Sender's encryption/decryption sub-system 16 via the communication channel 52. The Receiver's encryption/decryption sub-system 18 may be identical to the Sender's encryption/decryption sub-system 16, or slightly modified with respect thereto, as will be detailed in further paragraphs.

However, even when having a configuration differing from the Sender's sub-system 16, the Receiver's encryption/decryption sub-system 18 includes the Input device 23 for receiving hash values $IIA_{str}$ and $IIA_{size}$, G(N) and F(M,N) for the reconstructed image 34, and a randomly chosen one-time secret key SK-A from the Sender.

The Receiver's encryption/decryption sub-system 18 further includes a Computer system 21. Similar to the Computer system 24 at the Sender's encryption/decryption sub-system 16, the Computer system 21 includes a processor unit (CPU) 27 and a motherboard 29 supporting or operatively coupled to the CPU 27. The Computer System 21 also is equipped with a Read Only Memory (ROM), Random Access Memory (RAM), hard disk drive, a CD/DVD drive, a USB port, and an Expansion Slots and Cards Unit which are standard for computer systems and are not shown in FIG. 1B..

However, uniquely for the configuration of the subject system 10, the Computer system 21 includes a pre-programmed Read-Only Memory (ROM) hardware unit 33 which constitutes an independent hardware unit that is physically mounted on the motherboard 29 in operative cooperation with the CPU 27, and which is configured to perform (in conjunction with the CPU 27) the cryptographic operations with respect to decoding the encrypted image received at the Receiver.

The functionality of the ROM unit 33 (in cooperation with the CPU 27) of the Receiver's encryption/decryption sub-system 18 supports numerous routines, such as, for example:

a) obtaining the respective set of transects identified in accordance with the one-time security key SK-A_$RN_k$ received from the Sender;

b) generating a Receiver-reconstructed image 54 based on the respective set of transects and the parameters G(N) and F(M, N) computed for the Sender-reconstructed image 34;

c) calculating the Index of Intrinsic Anisotropy of Structure ($IIA_{STR}$) and the Index of Intrinsic Anisotropy of Size ($IIA_{SIZE}$) of the Receiver-reconstructed image 54; and d) comparing the indices $IIA_{STR}$ and $IIA_{SIZE}$ (which are used in the subject system as hash values) of the Receiver-reconstructed image 54 with the indices $IIA_{STR}$ and $IIA_{SIZE}$ of the Sender-reconstructed image 34 to verify the integrity of the encrypted image representation transmitted through the communication channel 52, as will be presented in detail in further paragraphs.

The Receiver's Computer system 21 further includes a hardware which is also unique for the subject system and which includes an external USB memory 47 containing the Receiver's database-of-transects 49 coupled to the ROM unit 33 and the CPU 27. The Receiver's database-of-transects 49 is identical to the Sender's database-of-transects 48.

Alternatively, the Receiver may be devoid of its own database-of-transects 49, but merely have a permanent access to the Sender's database-of-transects 48.

The databases-of-transects 48, 49 may be configured with a feature of dynamical upgrade of their contains. In this embodiment, these databases are dynamically changing in precise synchronism one with another.

As depicted in FIG. 1A, the Sender's encryption/decryption sub-system 16 further includes a parameterization system 98 residing on or operatively coupled to the ROM unit 32 and the CPU 26. As will be detailed in further paragraphs, the parameterization system 98 includes a G(N), F(M,N) computing unit 100, a reconstruction unit 118, and Sender's encrypted representation computing unit 57.

As depicted in FIG. 1B, the Receiver's encryption/decryption sub-system 18 further includes a parameterization system 98' residing on or operatively coupled to the ROM unit 33 and the CPU 27. As will be detailed in further paragraphs, the parameterization system 98' includes a reconstruction unit 119, and Receiver's hash values computing unit 55.

Referring to FIG. 2 which is a simplified illustration of the image encoding routine supported by the subject system 10, and returning to FIG. 1A, at the sender side 12, at Step A, the Random Number Generator 44 generates a random number $RN_K$ in accordance with which, the Sender's encryption/decryption sub-system 16 chooses a respective set of transects 53 in the database-of-transects 48, and retrieves a corresponding binary image of the set of transects 53_$RN_K$ corresponding to the random number $RN_K$. The respective set of transects 53_$RN_K$ serves as a one-time secret key SK-A which is transmitted to the Receiver 14 along with the representation 50 of the encrypted image and hash values, as will be detailed in further paragraphs.

Subsequent to Step A, in Step B, the Sender's encryption/decryption sub-system 18, and particularly the parameterization system 98 supported the ROM unit 32 and the CPU 26, controls the computing Unit 100 to apply the transects set 53_$RN_K$ identified by the randomly generated number $RN_K$ to the image 20 and to constructs an N-partite graph G(N) and the Table F(M,N) for the image 20 in question. The image 20 may be an arbitrary 2-D or 3-D image of the raster (pixel) format, a 2-D binary layered image in the raster format, a 2-D or 3-D grayscale arbitrary image, as well as images in vector format. As an example, the following description will refer to the image 20 as a Binary Image in Pixel Format (BIPF).

In the subsequent step C, the Sender's encryption/decryption sub-system 16 uses the G(N) and F(M,N) calculated in Step B to reconstruct, in the Sender's reconstruction unit 118, the image BIPF to create a Sender's reconstructed image 34, also referred to herein as $R_{CS}BIPF\_RN_K$.

In the following step D, the parameterization system 98 of the Sender's sub-system 16, computes, in the computing unit 57, the N-partite graph $R_{CS}G(N)\_RN_K$ and the Table $R_{CS}F(M,N)\_RN_K$ for the Sender's reconstructed image 34.

Also in step D, the Sender computes, in the computing unit 57, the Indices of Anisotropy $IIA_{STR}$ and $IIA_{SIZE}$, respectively, of the reconstructed image 34, which are used in the subject system as hash value 1 and hash value 2 calculated by the Sender.

As shown in FIGS. 1A and 2, after the encryption routine at the sender's side 12 is completed, the Sender's encryption/decryption sub-system 16 creates the encoded image representation 50 which includes the N-partite graph $R_{CS}G(N)\_RN_K$ and Table $R_{CS}F(M,N)\_RN_K$ of the reconstructed image 34, a randomly chosen secret key SK-A_$RN_k$ (which is a one-time secret key corresponding to the transects image used for the encryption), and hash values $IIA_{STR}$ and $IIA_{SIZE}$ of the reconstructed image 34. The representation 50 for the encrypted image in question computed by the Sender 12 is transmitted in Step E over the communication channel 52 from the output device 122 to the Receiver 14.

In Step F, at the Receiver side 14, as shown in FIGS. 1B and 2, the Receiver's encryption/decryption sub-system 18, accesses the Receiver's database-of-transects 49 which is identical to the database-of-transects 48 at the Sender's side 12, and retrieves therefrom a set of transects 53_$RN_K$ in accordance with a secret key SK-A_$RN_k$ sent to the Receiver 14 from the Sender 12. In this fashion, the Receiver's encryption/decryption sub-system 18 will operate with the same set of transects 53_$RN_k$ as the Sender's encryption/decryption sub-system 16.

Alternatively, the Receiver can have an access to the Sender's database-of-transect 48, for retrieving therefrom the respective set of transects 53_$RN_k$ in accordance with the secret key SK-A_$RN_k$ received from the Sender 12.

In the following Step G, the parameterization system 98' supported by the ROM unit 33 and the CPU 27 at the Receiver's encryption/decryption sub-system 18, reconstructs, in the Receiver's reconstruction unit 119, the image based on the secret key SK-A_$RN_k$ and the N-partite graph $R_{CS}G(N)\_RN_K$ and Table $R_{CS}(M,N)\_RN_K$ received from the Sender, and generates a Receiver's reconstructed image 54.

Subsequently, in Step H, the $IIA_{STR}$ and $IIA_{SIZE}$ for the reconstructed image 54 are computed in the computing unit 55, which serve as Receiver computed hash values for the image in question.

Subsequently, in Step I, the hash values ($IIA_{STR}$, $IIA_{SIZE}$) calculated by the Sender 12 for the reconstructed image 34 (in Step D) and hash values ($IIA_{STR}$, $IIA_{SIZE}$) calculated by the Receiver 14 for the reconstructed image 54 (in Step H), respectively, are compared.

If the match is found in Step I, the permission is granted to use the reconstructed image by the receiver. If however the hash values calculated by the Sender and Receiver for the reconstructed images 34 and 54, respectively, do not match, then the Sender is requested by the Receiver to resend the image representation encrypted with another set of transects (a new one-time secret key), and the procedure at the Sender and Receiver repeats with a new representation of the encrypted image and another set of randomly chosen transects.

Figure 4:
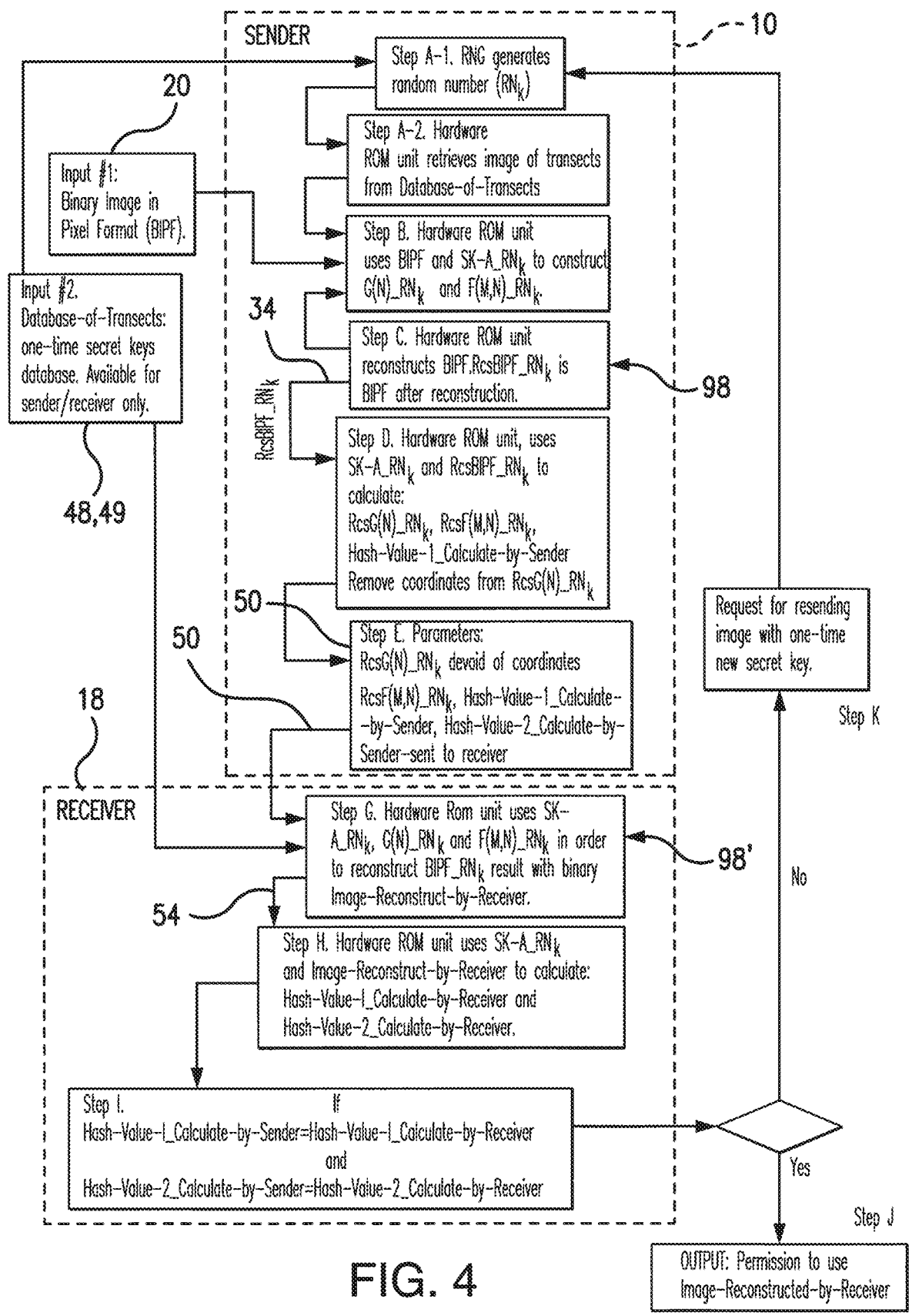
FIG. 4 is a flow chart diagram detailing the subject operational concept illustrated in FIG. 2.

Referring to FIG. 4, which represents the subject procedure of an image encryption/decryption in further detail, and returning to FIGS. 1A-1B and 2-3, the starting point of the image encryption procedure requires two Input elements:

(a) Input #1, which is a binary image 20, for example, in the pixel format (BIPF) entered in the Sender's encryption/decryption sub-system 16, for image encryption. The image 20 may be, for example, a text image, a drawing, as well as a combination of the text and drawings.

(b) Input #2, which represents the Sender's Database-of-Transects 48, and/or the Receiver's Database-of-Transects 49. The database(s) 48, 49 include(s) numerous binary images of the sets of transects (for example, as shown in FIGS. 3B-3D). Each binary image of a set of transects (identified in the database 48, 49 by a respective key SK-A) is used in the subject system 10 for encoding/decoding of the BIPF 20. The Sender's database 48 is stored in the external removable USB memory 46 (shown in FIG. 1A) and is available exclusively for the sender 12 and receiver 14. The Receiver 14 may have an access to the Sender's Database-of-Transects 48, or alternatively, may be provided with the Receiver's Database-of-Transects 49, identical to the database 48. The Receiver's Database-of-Transects 49 is stored in the external removable USB Memory 47 (shown in FIG. 1B) and is accessible by the Receiver and/or Sender to retrieve therefrom the respective transects image 53_RN$_K$ corresponding to the one-time secret key identified by the random number RN$_K$ transmitted to the Receiver from the Sender.

The subject process of transmission of the image 20 between the sender 12 and receiver 14 includes a sequence of encryption/decryption operations illustrated briefly in FIG. 2 and further detailed in FIG. 4, which include execution of the unique routines of the subject method fully supported by the Sender's and Receiver's encryption/decryption sub-systems 16, 18, respectively, implemented with corresponding computer systems 24 and 21, respectively, the architecture of which is specifically adapted for the purposes and objectives of the subject concept and contains specific hardware units not found in general purpose computers.

The subject routine (shown in FIGS. 2 and 4) is initialized by the Sender's encryption/decryption sub-system 16 in Step A-1 (corresponding to Step A, shown in FIG. 2), where the RNG 44 generates a random number (RN$_K$) used to find a corresponding set of transects 53_RN$_K$ in the database 48, and to extract the corresponding set of transects to be used in the original binary image 20 encoding.

The procedure further advances to Step A-2 (corresponding to Step A shown in FIG. 2), where the cryptographic ROM unit 32 (shown in FIG. 1A) retrieves the binary image of transects 53_RN$_K$ corresponding to the RN$_K$ from the Sender's Database-of-Transects 48. The image of transects (shown, for example, in FIGS. 3B-3D) identified by the RN$_K$ is used in the subject system as a one-time secret key, which is denoted by SK-A_RNk.

Subsequently, in Step B, the cryptographic ROM unit 32 initiates the parameterization system 98 (shown in FIG. 1A) to use the BIPF 20 and SK-A_RN$_k$ chosen in accordance with the randomly generated RN$_K$ to construct an N-partite graph denoted by G(N)_RNk and the Table F(M, N) denoted by F(M,N)_RNk.

Upon completion of the Step B, the procedure follows to Step C, where the cryptographic ROM unit 32 uses the G(N)_RNk and F(M,N)_RNk to reconstruct the BIPF 20 to produce a Sender's reconstructed image 34 in accordance with a routine described in detail in further paragraphs. The Sender's reconstructed image 34 is denoted by RcsBIPF_RNk, and represents the initial BIPF 20 after reconstruction with the G(N)_RN$_K$, F(M,N)_RN$_K$, which correspond to the RN$_K$. The reconstruction image RcsBIPF_RNk is output in the pixel format.

In the subsequent Step D, the hardware unit, i.e., the cryptographic ROM unit 32 uses the RcsBIPF_RNk to calculate the following parameters of the Sender's reconstructed image 34:

(a) RcsG(N)_RNk, which is the N-partite graph of the reconstructed image RcsBIPR_RNk;

(b) R$_{CS}$F(M, N)_RNk, which is the Table F(M,N) of the reconstructed image RcsBIPR_RNk; and (c) Indices of Anisotropy of the Sender's reconstructed image RcsBIPR_RNk 34, which include the Index of Structural Anisotropy IIA$_{STR}$ and Index of Inosotropy of Size IIA$_{SIZE}$ of the reconstructed image 34. The computational steps for the IIA$_{STR}$ and IIA$_{SIZE}$ will be detailed in further paragraphs.

The Indices of Anisotropy are used as hash values for a secure transmission protocol and authentication of the image transmitted between the sender 12 and the receiver 14.

Hash-Value-1_Calculated-by-Sender=$IIA_{str}$ of the image RcsBIPR_RNk

Hash-Value-2_Calculated-by-Sender=$IIA_{size}$ of the image RcsBIPR_RNk

The results of computations executed in Step D correspond to the encoded representation 50 of the image 20 after encryption by the Sender's encryption/decryption sub-system 16.

In Step E, the representation 50 of the encoded image is transmitted to the Receiver's encryption/decryption sub-system 18 via the communication channel 52.

The following parameters are sent to the receiver 14 from the sender 12:

1. a one-time secret key SK-A-RN$_K$, used for encoding/decoding of the original binary image 20. The SK-A-RN$_K$ is determined by the RN$_K$ which is the randomly generated identification number identifying the set of transects;

2. R$_{CS}$G(N)_RNk, which is the N-partite graph of the reconstructed image 34;

3. R$_{CS}$F(M, N)_RNk, which is the Table (M,N) comprising the thickness of layers along N transects of the image after reconstruction (image 34);

4. Hash-Value-1 Calculated-by-Sender for the BIPF after reconstruction; and

5. Hash-Value-2 Calculated-by-Sender for the BIPF after reconstruction. Parameters 2-5 can be sent via public communication channels without encryption since without the one-time secret key SK-A_RNk, they cannot be used by the unauthorized receiver.

The secret key SK_A_RNk is known to the Sender and only the authorized Receiver. Only Sender and Receiver have an access to the frequently changing databases 48, 49, which change in synchronism one with another during the image encryption/decryption procedure. An unauthorized Receiver, without knowing the secret key SK-A_RN$_K$, cannot retrieve the same set of transects for the image decryption as the one which was used by the Sender for the image encryption. Thus, the unauthorized Receiver is prevented from encryption of the encoded image corresponding to the image 20.

At the Receiver's encryption/decryption sub-system 18 (shown in FIGS. 1B and 2-4), upon receipt of the parameters 1-5, the decryption routine is initiated in the parameterization system 98' supported by the cryptographic ROM unit 33 (at the receiver's sub-system 18). The Rom unit 33 accesses the Database-of-Transects (48 or 49), and uses the received SK-A-RN$_K$ to retrieve the corresponding set of transects to decrypt the image.

Subsequently, in Step G, the Receiver's encryption/decryption sub-system 18 uses the SK-A_RNk, G(N)_RNk and F(M, N)_RNk to reconstruct the BIPF_RNk. Step G results in a binary Image-Reconstructed-by-Receiver 54 generated by the Receiver's reconstruction unit 119.

Subsequently, in Step H, the cryptographic ROM unit 33 (at the Receiver's side) uses the secret key SK-A_RNk and the Image-Reconstructed-by-Receiver 54 to calculate $IIA_{str}$ and $IIA_{SIZE}$ for the receiver's reconstructed image 54. The Indices of Anisotropy, i.e., the $IIA_{STR}$ and $IIA_{SIZE}$ of the Receiver's reconstructed image 54, are used as Hash-Value-1_Calculated-by-Receiver and Hash-Value-2_Calculated-by-Receiver, respectively.

In the following step I, the Indices of Anisotropy computed by the Sender and Receiver are compared, and the Image-Reconstruct-by-Receiver 54 is authenticated and is permitted to be used for analysis in Step J if:

Hash-Value-1_Calculated-by-Sender=Hash-Value-1_Calculated-by-Receiver and

Hash-Value-2_Calculated-by-Sender=Hash-Value-2_Calculated-by-Receiver.

Otherwise, if the match is not found in Step I, the request is sent in Step K from the Receiver to the Sender for resending another representation of the image encoded with another randomly selected set of transects.

As one of the key features of the subject system and method, in Step D, shown in FIGS. 2 and 4, prior to transmitting the N-partite graph $R_{CS}G(N)\_RN_K$ plotted (constructed) for the reconstructed image 34 to the Receiver, the Sender removes the coordinates of all points of intersection of the graph $R_{CS}G(N)\_RN_K$ with the reconstructed image (shown in FIGS. 9A-9B and detailed in further paragraphs). Without the coordinates, the N-partite graph $R_{CS}G(N)\_RN_K$ cannot be used by an unauthorized party, and thus the N-partite graph $R_{CS}G(N)\_RN_K$ can be sent via a public communication channel without encryption.

The Receiver, upon receipt of the coordinates-devoid N-partite graph of the Sender's reconstructed image 34, uses the set of transects corresponding to the one-time secret key $SK\text{-}A\_RN_K$ and the $R_{CS}F(M,N)\_RN_K$ to reconstruct the coordinates to generate the Receiver's reconstructed image 54.

Figure 25:
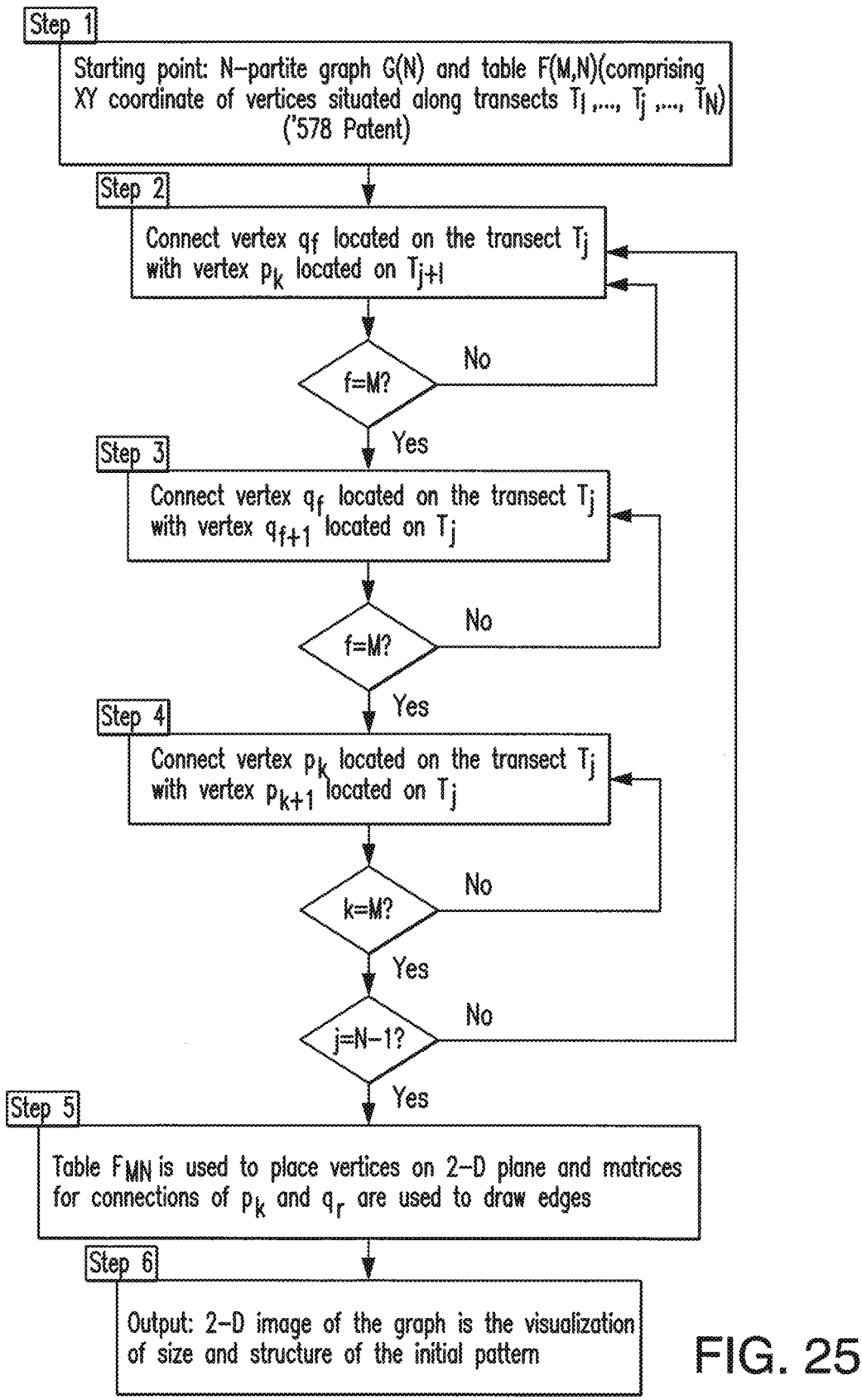
FIG. 25 is a flow chart diagram of the routine for an image reconstruction.

Specifically, the present parameterization systems 98, 98' uses the N-partite graph G(N) of two categories:

(a) the G(N) for the image parameterization which contains X and Y coordinates of points of intersection of the image under study with the set of transects $T_1, \ldots, T_N$, and the connectivity of points situated between any two nearby transects $T_j$ and $T_{j+1}$, j=1, N−1, as shown in FIGS. 9A-9B. The transects shown in FIGS. 9A-9B and 3A are straight lines with an identical distance between any two nearby transects. The partite graph of this category can be used to reconstruct image. The procedure for the image reconstruction is detailed in FIG. 25; and (b) the N-partite graph $RcsG(N)\_RN_K$ for the image encrypting/decrypting which contains only Y coordinate of the first point of intersection of the reconstructed image 34 with each of the transects. The remaining coordinates are removed from the $R_{cs}G(N)\_RN_k$ for security reasons. Thus, the N-partite graph of the reconstructed image 34 can be sent via public communication channels from the Sender to the Receiver.

Also, the G(N) comprises the connectivity points situated between two nearby transects $T_j$ and $T_{j+1}$, j=1, N−1. The N-partite graph of this category is used to reconstruct the image with a one-time secret key, i.e. set of transects representing anisotropic coordinate system (for example, shown in FIG. 3D).

The N-partite graph for image encryption/decryption is converted into the graph for image parameterization. Subsequently, the subject system performs the image reconstruction.

A starting point of the procedure at the Sender is RcsG (N)_RNK for the image encrypting/decrypting, the F(M,N) which comprises thicknesses of layers across the image of the anisotropic coordinate system (FIG. 3D) presented in the Comma Separate Value (CSV) format. All pixels (cells in CSV format) which comprise the transect Tj have identical identification number j. A thickness of each transect in one pixel correspond to one cell in CSV format. There is a precise correspondence between X and Y coordinate of Tj since each transect contains no horizontal lines (FIG. 3D).

The procedure of the conversion of the N-partite graph for the encryption/decryption into the graph for image parameterization consists of four steps:

Step #1. A coordinate Y of the first point situated on $T_1$ is retrieved from the G(N), used for image encrypting/decrypting. This point is denoted by $Y(T_1)$. All cells comprise the first transect $T_1$ retrieved from the CSV format. These cells are denoted by $Cell(X_1, Y_1), Cell(X_2, Y_2), \ldots, Cell(X_q, Y_q), \ldots$ where $X_1$ and $Y_1$ are X and Y coordinates of the first cell which comprises $T_1$.

$Y(T_1)$ is further compared with Yq coordinate of a cell which comprises $T_1$. If $Y(T_1)=Y_q$, then $X(T_1)=X_q$, since there is a precise correspondence between X and Y coordinate of $T_j$, j=1, N. Coordinates $Y(T_1)$ and $X_q$ serve as coordinates of the reference point for reconstruction of X and Y coordinates of all points situated along the transect $T_1$. The coordinates of the reference point are denoted as by Xref and Yref.

Step #2. A thickness of the first layer $w_1(T_1)$ situated along the transect $T_1$ is retrieved from F(M,N). Coordinates $X_2$ and $Y_2$ of the second point situated on $T_1$ are equal to coordinates of the reference point Xref and Yref plus thickness of the first layer situated between the reference and second points along the transect $T_1$.

Step #3. Step #2 is repeated for the coordinates of all points situated along transect $T_1$.

The coordinates of each subsequent point $X_{i+1}$ and $Y_{i+1}$ are equal to the coordinates of the previous points $X_i$ and $Y_i$ plus the thickness along the transect $T_1$ of the layer situated between these two points. The procedure results in reconstruction of the coordinates of all points situated along $T_1$.

Step #4. Step #2 and Step #3 are repeated N−1 times to result in reconstruction of the coordinates of all points situated along all transects. Thus, the N-partite graphs RcsG (N)_$RN_K$ of the reconstructed image RcsBIPF_$RN_K$ without coordinates of points situated along transects can be used by the Receiver for conversion into graph with coordinates of all points to reconstruct the image with application the routine depicted in FIG. 25.

As was presented in previous paragraphs, the subject system 10 can augment any image transmission system and is installed at both the sender 12 and a receiver 14 sides of the transmission channel 52 for the image encryption at the sender 12 and the image decryption at the receiver 14. The sender's and receiver's image processing are represented by the sender's encryption/decryption sub-system 16 and the receiver's encryption/decryption sub-system 18 which are presented in FIGS. 1A-1B, 2, and 4.

The Sender's encryption/decryption sub-system 16 and the Receiver's encryption/decryption sub-system 18 may be identical, or may differ one from another. For example, the Random Number Generator 44 may be included only into the Sender's portion 16, while leaving the Receiver's encryption/decryption sub-system 18 devoid of the random number generator.

Furthermore, in an alternative embodiment, only the Sender's encryption/decryption sub-systems 16 may include an interface with an Imaging System, as detailed in further paragraphs.

Referring to FIGS. 1A and 5-8, the Sender's encryption/decryption sub-system 16 is coupled, at the input 22 thereof, to the Imaging System 70. The Sender's encryption/decryption sub-system 16 includes a parameterization sub-system 98 configured for parameterization of arbitrary images 20 of an object 74. The image parameterization sub-system 98 may be included in both the Sender's and Receiver's encryption/decryption sub-systems 16, 18, or alternatively, be included, in its entirety, at the Sender's sub-system 16, while a portion 98' of the parameterization sub-system 98 is included in the Receiver's sub-system 18. Each object 74 serves as a source of pattern(s) depicted in the image(s) 20.

As was presented in previous paragraphs, the parameterization sub-system 98' included in the Receiver's encryption/decryption sub-system 18, as shown in FIG. 1B, includes at least a Receiver's Reconstruction Unit 119, and the Receiver's hash values computing unit 55 for computing $IIA_{STR}$ and $IIA_{SIZE}$ of the Receiver's reconstructed image 54.

The patterns which the subject system 10 is capable of securely transmitting after the parametrization at the sender's encryption/decryption sub-systems 18 may be an arbitrary 2-D or 3-D pattern of an isotropic nature, or having a structural anisotropy. The patterns may be represented by incremental patterns of biological origin (such as, for example, fish scales, shells, corals, human bones, animal bones, as well as spider nets, fingerprints, etc., tree rings, as well as the patterns of geological origin, and nano-ripples (or micro-scale formations) found in objects of semiconductor or nano-structures fabrication.

The present system 10 embodies and supports the function of an arbitrary image parameterization based on the principles that the structure of an arbitrary 2-D or 3-D image may be considered as a superposition of 2-D isotropic and anisotropic images which can be quantified using N-partite graph G(N) and Boolean functions.

The parameterization of 2-D and 3-D arbitrary images is initiated by operatively coupling the Computer system 24 to the imaging system to receive therefrom at least one image 20 under study. The image under study 20 may be a 2-D binary layered image in the raster format, a 2-D arbitrary image in the raster format, a 3-D arbitrary image in the raster format, a 2-D grayscale arbitrary image in the raster format, a 3-D grayscale arbitrary image in the raster format, a 2-D binary layered image in the vector format, a 2-D binary arbitrary image in the vector format, and their combinations.

The subject Computer system 24 is configured to perform parameterization of the image under study and includes a computing unit for applying a predetermined slicing procedure to the image under study if the image under study is a 3-D image, a computing unit 100 operatively coupled to the slicing computing unit to compute an N-partite graph G(N) of the image under study, a quantification parameters computing unit operatively coupled to the computing unit 100 to compute image quantification parameters of the image under study, and a reconstruction unit 118 operatively coupled to the computing unit 100 and configured for reconstruction of images, as will be detailed in further paragraphs. In addition, the present system is capable of parameterization of arbitrary patterns of any nature, grayscale images of various objects, MRI (and other imaging modalities) images, fingerprints, works of arts, etc. The subject system is also configured to reconstruct images at both sender's and receiver's sides, as will be presented in detail in further paragraphs.

Figure 5:
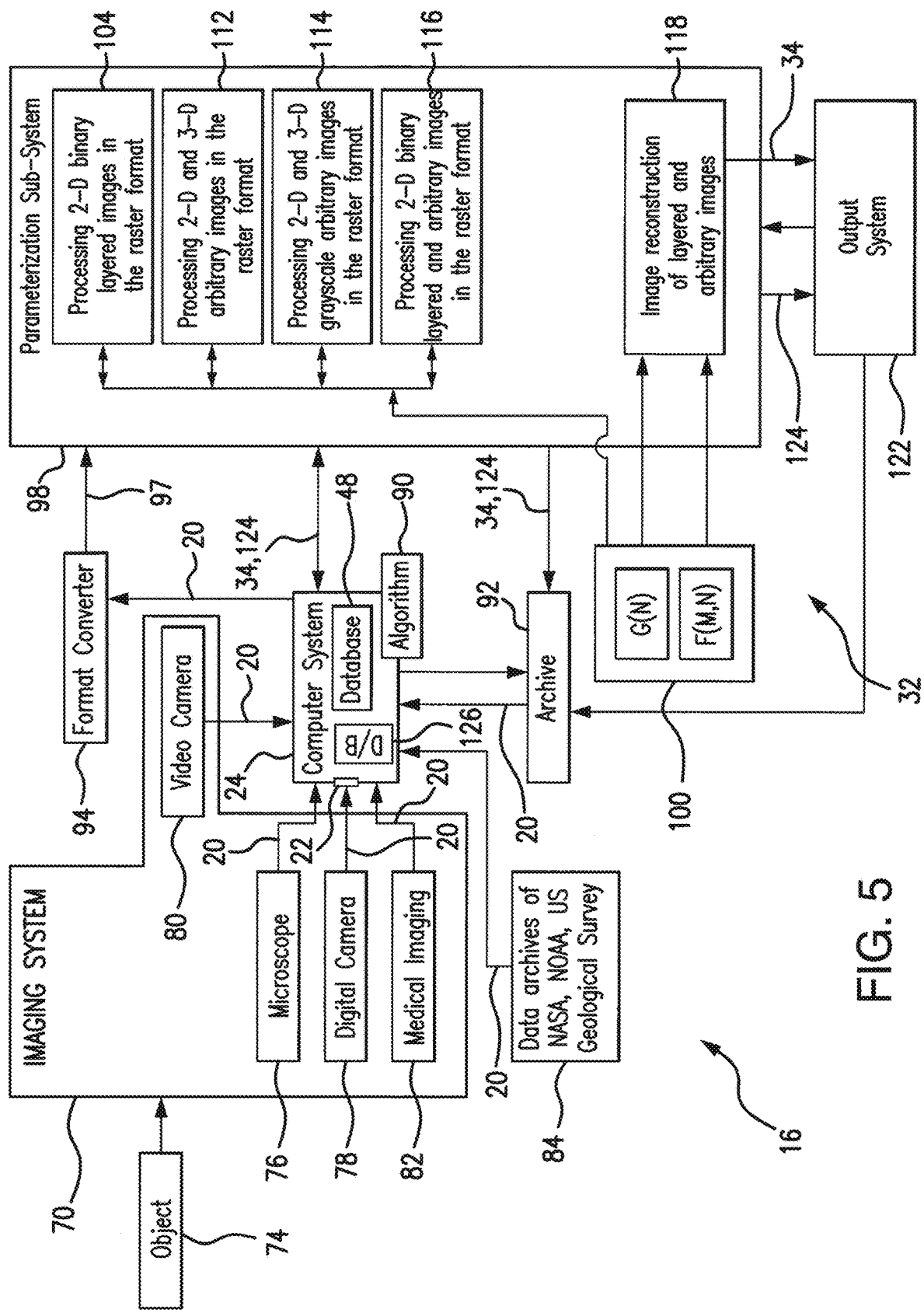
FIG. 5 is a schematic representation detailing the imaging and parameterization sub-systems used in the subject system.

The Imaging System 70, as shown in FIG. 5, is provided at the sender's side 12 for imaging the micro- and macro-patterns (objects) 74. The imaging system 70 may include image capturing device(s), such as, for example, microscope(s) 76, digital camera(s) 78, video camera(s) 80, as well as medical imaging systems (MRI, CT, PET-scan, X-Ray, etc.) 82, and/or other image acquiring systems.

Microscopes 76 may be used for imaging micro and nano-scale incremental patterns, as well as those having the width of incremental bands ~1-100 µm, usually found in fish scales, shells, corals and bones, or even nano-structures. Digital cameras 78 with resolution 14-20 MP may be used for imaging macro patters, i.e., having the width of incremental bands >1-5 millimeter, which are usually found, for instance, in tree rings. Video cameras 80 may be used to acquiring and imaging the time-series images. Medical imaging systems 82 may be used for acquiring images of various parts of interest of patients' bodies.

Another source of the patterns under study may be publicly available databases 84 of images of layered geological objects, such as, for example, digital archives of NASA, NOAA, and US Geological Survey, etc.

The images 20 from the microscopes, digital cameras, video cameras, medical imaging equipment, and databases are entered and recorded in computer system 24 for further processing in accordance with the algorithm 90 presented in detail in further paragraphs, as well as for archiving in an archive 92 for further use.

The computer system 24 supports the algorithm 90, which controls the processing of the incremental patterns under study entered into the computer system 24 through specific routines presented in detail in further paragraphs. The algorithm 90 is operatively coupled to the computer system 24, and may run physically in the computer system 24 (or on another computer or computers).

The subject sender's encryption/decryption sub-system 16 also includes an image format convertor 94 coupled to the computer system 24 for conversion of acquired images into the ASCII (American Standard Code for Information Interchange) format, and more precisely, into the CSV (Comma_Separate_Value) format.

In one implementation, the images 20 of the patterns, in their raster (pixel) format, may be supplied from the computer 24 to the format converter 94 for conversion into the ASCII format. The image in its raster (pixel) format, as well as in the CSV format, is supplied to the archive 92, which is bi-directionally coupled to the computer system 24. Although shown as a separate unit, the format converter 94 may be embedded into the computer system 24. Alternatively, the format converter 94 may be implemented as a portion of the algorithm 90, or be included in the Input Device 22 (shown in FIG. 1A).

The ASCII is a character-encoding scheme and basically is a universal language for encoding numeric bits of data into characters. With the help of the ASCII image converter 94, pixels in the digital pictures (binary format), may be converted into ASCII characters.

The raster images 97 of the patterns 20 under study, in their pixel and/or ASCII formats, are supplied to the parameterization sub-system 98 which may reside on (or be operatively interconnected) with the computer system 24 (or any other computer system), i.e., the images 20 are processed/parameterized in accordance with the parameterization routine of the algorithm 90.

The parameterization sub-system 98 may reside on the cryptographic ROM unit 32, which, in conjunction with the computer system 24, CPU 26, and the software 90, performs all cryptographic operations relative to the image 20.

Preferably, the input of the parameterization subsystem 98 is coupled to the format converter 94 to receive the patterns 97 in their CSV format, as well as in their pixel (raster) format, or alternatively in the vector format, for further processing.

The processor (CPU) 26 in conjunction with the ROM unit 32 (shown in FIG. 1A) operatively support the parameterization sub-system 98, as well as a G(N), F(M, N) computing unit 100, which may be included in the parameterization sub-system 98, or reside on another processing foundation.

The patterns 97 received at the input of the parameterization sub-system 98 are processed in the N-Partite Graphs Computing Unit 100, which generates a sequence of N-partite graphs $G(N_{min})$, $G(N_{min}+)$, ..., $G(N_{max})$ of the 2-D binary incremental patterns, as well as a Table F(M,N), in accordance with the routine presented in '578 Patent incorporated herein by reference.

A 2-D image 97, when supplied to the G (N) unit (also referred to herein as G(N), F(M,N) unit) 100, is exposed to the transects plotting routine, where a plurality of transects $T_1, T_2, \ldots, T_j, \ldots T_N, \ldots, T_M$ are plotted onto the 2-D image 97. Each of the plurality of transects extends from a respective initial point towards the periphery of the 2-D image in crossing relationship with at least one of segments (layers) found in the 2-D image.

The Sender's database-of-transects 48 includes an enormous number of sets of transects of different configuration and complexity, presented, for example, in FIGS. 3A-3D. In order to apply a specific set of transects to a specific image for its encryption, the RNG 44 generates a random number $RN_K$, in accordance with which the sender's encryption/decryption sub-system 16 retrieves the transects set corresponding to that random number from the Sender's database-of-transects 48.

For processing of another image 20, another random number $RN_m$ will be generated by the RNG 44, and another set of transects will be retrieved (corresponding to the $RN_m$) from the database-of-transects 48 for application in the image parameterization routine. Thus, each image is processed/parameterized/encrypted with a respective set of transects randomly selected for this particular image. Each set of transects may be considered as coordinates system relative to which a particular image is parameterized, or as a one-time secret key SK-A-$RN_K$ or SK-A_$RN_m$, etc.

For image secure transmission purposes, the sets of transects applied to a particular image serve as the one-time secret key communicated to an authorized Receiver from the Sender, so that only the authorized Receiver is aware of the set of transects used by the Sender for the image encryption. In this fashion, only the authorized Receiver can use the same set of transects as used by the Sender for the image decryption.

The G(N) unit 100 is included in the parameterization sub-system 98 to convert the 2-D image into the N-partite graph G(N) and the Table F(M,N) describing an anisotropic structure and dimensions, respectively, of the 2-D image in accordance with the technique described in '578 Patent. Specifically, the G(N), F(M,N) unit 100 computes a set of bi-partite graphs G ($T_j, T_{j+1}$). Each of bi-partite graphs G ($T_j$, $T_{j+1}$) of the set of bi-partite graphs is situated between neighboring transects $T_j$, $T_{j+1}$ and $T_{j+1}$, $T_{j+2}$, respectively. The neighboring bi-partite graphs G ($T_j$, $T_{j+1}$) are merged into the N-partite graph G(N) based on a common vertex along the transects $T_{j+1}$ situated between each pair of neighboring bi-partite graphs of the 2-D image.

Figure 6:
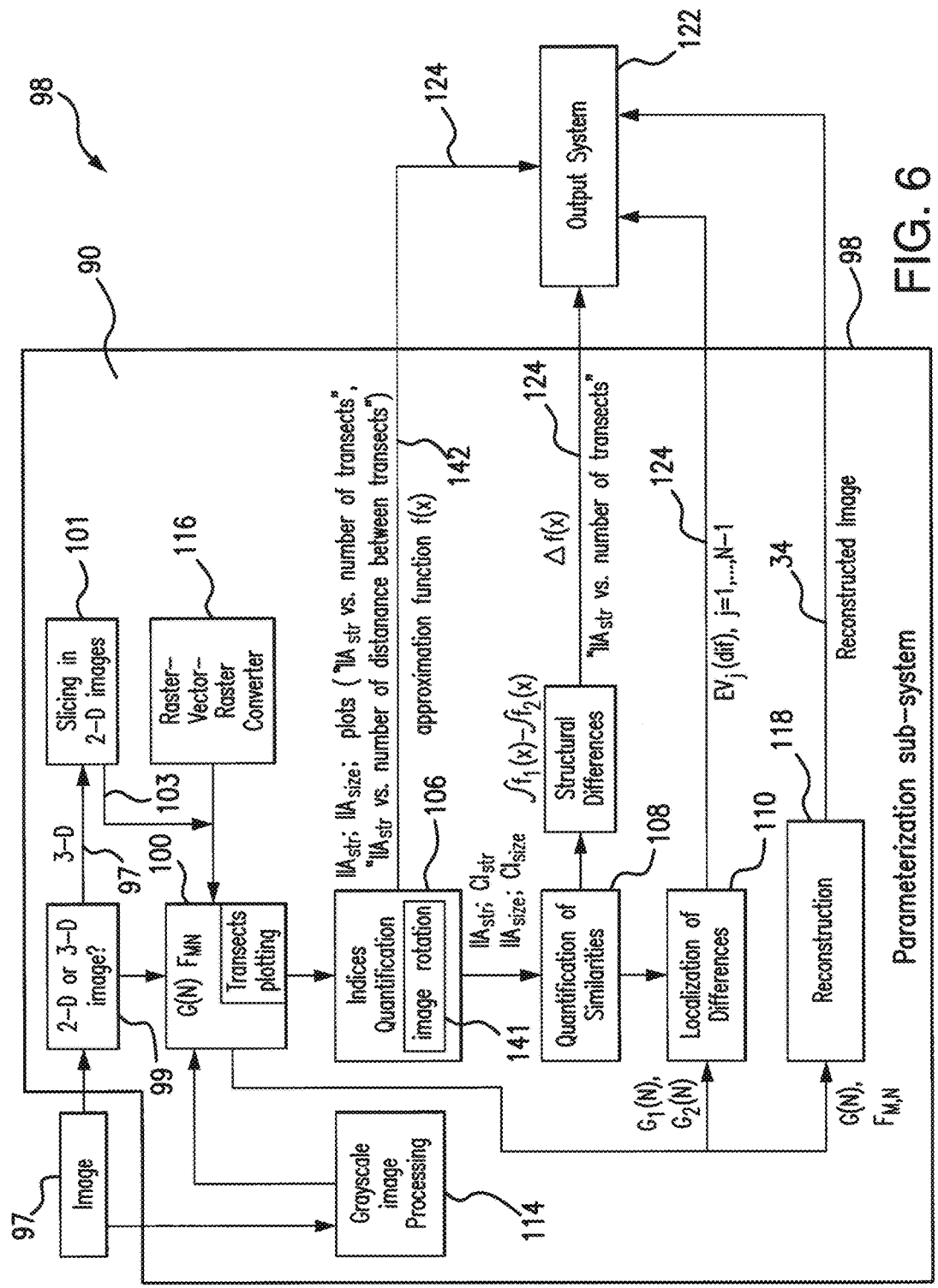
FIG. 6 is the detailed schematic representation of the detailed parameterization sub-system in the subject system.

As shown in FIG. 6, prior to being received at the N-partite graphs Computing Unit 100, the images 97 are received at a computing unit 99 which analyses the received images 97 to distinguish between the 2-D and 3-D images, and applies a 3-D image slicing routine to 3-D images, as will be detailed in further paragraphs.

Figure 7:
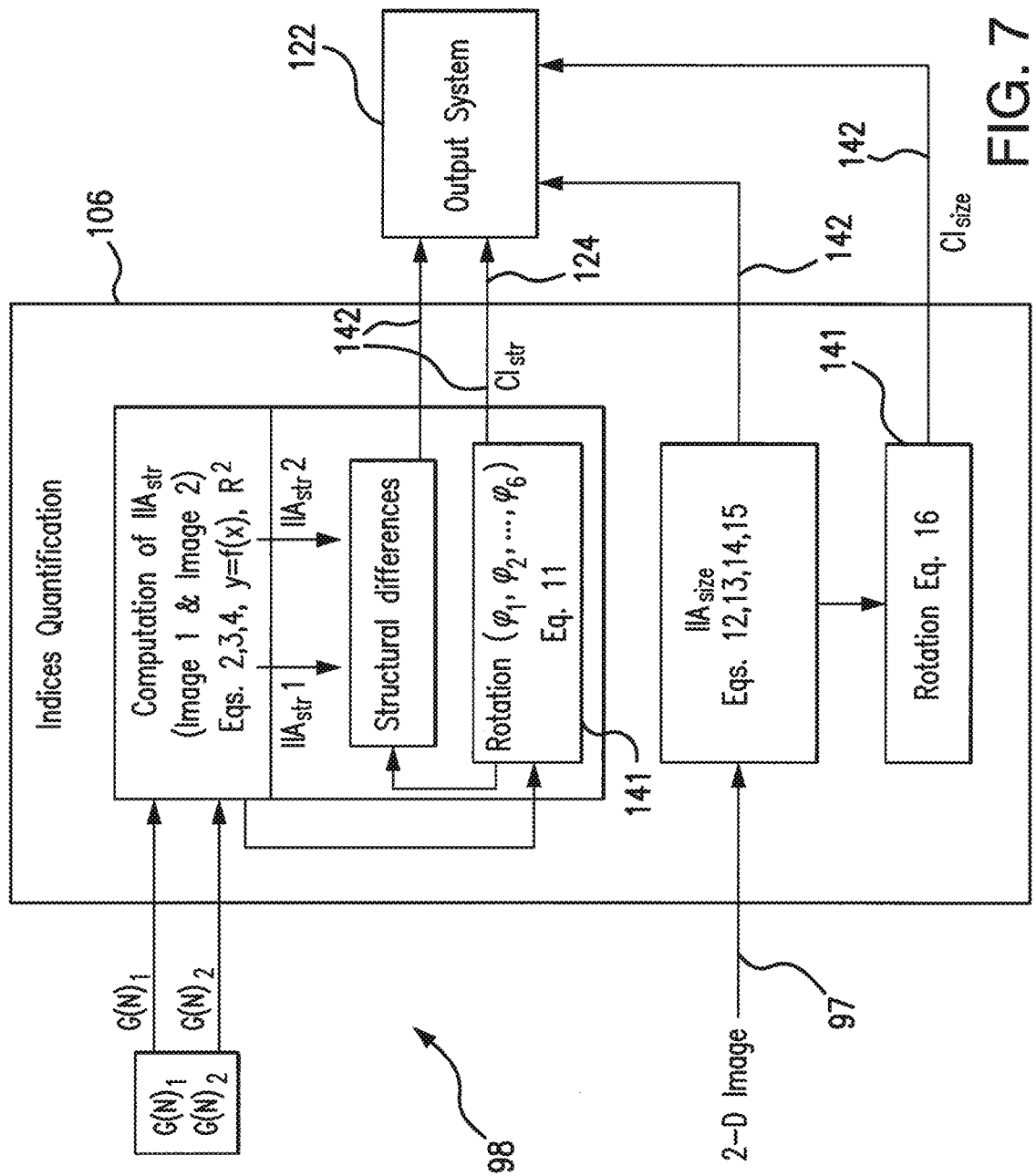
FIG. 7 is a schematic representation of the Indices Quantification Sub-System in the subject system.

As shown in FIGS. 5-7, the output of the N-Partite Graphs Computing Unit 100 is coupled to a processing unit 104 for processing 2-D and 3-D binary layered images in the raster format. The processing unit 104 includes the Indices Quantification Unit 106. The set of bi-partite graphs G($T_j$, $T_{j+1}$) is supplied into the Indices Quantification unit 106 for computing the image quantification parameters, which include an Index of Intrinsic Anisotropy of structure ($IIA_{str}$), an Index of Intrinsic Anisotropy of size ($IIA_{size}$), an Index of Complexity of Image Anisotropic structure ($CI_{str}$), and an Index of Complexity of Image Anisotropic size ($CI_{size}$) for the images under study.

The Processing (Computing) unit 104 further includes a Quantification of Similarities unit 108 for computing similarities in structure and size of several images under study (or portions of the same image), and a Localization unit 110 for localization of differences in size and structure of time-series of anisotropic layered images.

The parametrization sub-system 98 further includes a processing (computing) unit 112 for processing of 2-D and 3-D binary arbitrary images in the raster format. The parametrization unit 98 also includes a processing (computing) unit 114 for processing 2-D and 3-D grayscale arbitrary images in the raster format. The parametrization unit 98 further includes a processing (computing) unit 116 for processing 2-D and 3-D binary layered and arbitrary images in vector format.

The operation of the computing units 112, 114, 116 is based on the algorithm 90 and is executed by the CPU 26 in conjunction with the ROM unit 32 shown in FIG. 1A. The computing units 104, 112, 114, 116 are interrelated each with the other and are supported by a common computing platform, and have a number of common hardware and software features, as will be further presented.

The Sender's Reconstruction Unit 118 for image reconstruction of layered and arbitrary images from their models is included in the Parametrization Sub-System 98.

The Reconstruction Unit 118 is configured for producing reconstructed images 34 which may be output to the output sub-system 112 for example, in the form of 2-D or 3-D images, grayscale or colored, or other format. However, for the purposes of image transmission, the Sender's reconstructed images 34 and Receiver's Reconstructed Images 54 are processed at both the sender 12 and receiver 14 to compute $IIA_{str}$ and $IIA_{size}$ as was presented in previous paragraphs to authenticate the images.

Data produced as the result of computations in the Parametrization sub-system 98, are output to the output subsystem 122 in any suitable format, for example, in the form of 2-D or 3-D graphs, values of parameterization parameters, plots, images, visual and mathematical representation of computed data, etc.

The output sub-system 122 may be presented in the subject system 10 by any information output device, such as, for example, a printer, any type of computer screen, 2-D and 3-D display systems, data storage device(s), sound producing system(s), video projector, etc. The output data 34, 124 may be recorded in the archive 92 or in the memory of the computer system 24 as a database 126 for further processing and/or use for different purposes, including, but not limited to, fingerprints analysis, ballistic analysis, in medical applications for diagnostic, treatment and disease monitoring purposes, in art authentication, etc., as well as for being further processed to compute $IIA_{str}$ and $IIA_{size}$ which are used in the subject system as hash values for increasing safety of the images transmission as illustrated in FIGS. 1A-1B, 2 and 4, and detailed in previous paragraphs.

The operation of the present systems 10 is based on the algorithm 90 running on the computer system 24 or any other external computer(s). The algorithm 90 has been devised for effective and noiseless parameterization of patterns of different categories of 2-D or 3-D arbitrary images acquired by the Imaging System 70, as well as for secure transmission of the encrypted image to a receiver for decryption and authentication thereat, as depicted in FIGS. 1A-1B, 2 and 4, and as detailed in previous paragraphs.

The algorithm 90 of the present invention, as well as its various sub-routines, may be executed in a variety of different programming environments. For the purpose of illustration only, but not to limit the scope of the present invention to this particular programming environment, the subject system and method, will be detailed in the following paragraphs as, for example, implemented in the EXCEL Visual Basic environment.

The model of incremental pattern, i.e., an N-partite graph or a Boolean function computed in the N-Partite Graphs Computing Unit 100 in accordance with the technique presented in '578 Patent, provides a tool for fully automated procedure for computations related to image parameterization and image reconstruction from the G(N), noise reduction in arbitrary grayscale images, and analysis of time-series images in order to detect structural changes and differences between images of different objects or between different areas on the same image.

The effectiveness of the subject method has been demonstrated on various categories of patterns formed in nature and images of man-made objects.

The subject system is capable of encryption/decryption of various formats of images, as described in detail in the following sections:

A. Processing of 2-D Binary Layered Images in the Raster Format.

This part contains the description of routines performed in the processing unit 104 for calculation of:

Index of Intrinsic Anisotropy of structure ($IIA_{str}$);
Index of Intrinsic Anisotropy of size ($IIA_{size}$);
Index of Complexity of Image Anisotropic structure ($CI_{str}$);
Index of Complexity of Image Anisotropic size ($CI_{size}$).

This section also contains a) the description of the routine for quantification of similarity in structure and size of 2-D layered images; b) the routine for localization of differences in size and structure of time-series of 2-D anisotropic layered images. The effectiveness of the developed methods has been studied and presented herein with regard to the images of landscapes of Earth, Mars, fish scale, and nano-ripples.

B. Processing of 2-D and 3-D Binary Arbitrary Images in the Raster Format.

This section contains the description of the routine performed in the computing unit 112 for computation of parameterization parameters $IIA_{str}$, $IIA_{size}$, and the comparison routine for 2-D and 3-D arbitrary binary images. The effectiveness of the developed method has been demonstrated on images of a contour map, a nautical chart, a leaf, seismic profiles, and fingerprints, and presented herein in the following paragraph C. Processing of 2-D and 3-D Grayscale Arbitrary Images in the Raster Format.

This section contains the description of the routine performed in the processing unit 114 for calculation of the parameterization parameters $IIA_{str}$, $IIA_{size}$, and the routine for structure comparison for arbitrary 2-D and 3-D grayscale images. The effectiveness of the developed methods has been demonstrated for a Magnetic Resonance Image (MRI), image of human face and presented in further paragraphs.

D. Image Reconstruction of Layered and Arbitrary Images.

This section contains the description of the routine for reconstruction of 2-D binary arbitrary images from their model performed in the Reconstruction Unit 118. The effectiveness of the developed method has been demonstrated on images of fingerprints and a handwritten sample.

E. Processing of 2-D Binary Layered and Arbitrary Images in the Vector Format.

This section contains the description of the routine performed in the Computing Unit 116 for construction of the structure, i.e., N-partite graph G(N) and Boolean function for 2-D arbitrary images presented in the vector format.

F. Measurement of the Area, Volume and Structure of 2-D and 3-D Images of Lesions with Fuzzy Margins.

This section details a fully automated procedure performed in the processing unit 114 for precise measuring of dimensions and structure of lesions.

A. Processing of 2-D Binary Layered Images in the Raster Format Index of Intrinsic Anisotropy of Structure ($IIA_{str}$) for 2-D Binary Layered Images The basis for the definition of the $IIA_{str}$ is the observation that the structure of an incremental pattern includes isotropic and anisotropic parts. The isotropic part includes fragments of incremental bands without breaks and confluences. The anisotropic part includes incremental bands with numerous breaks and confluences.

Definition of $IIA_{str}$ in the 0-1 interval.

If $IIA_{str}=0$, then the entire area of an incremental pattern is covered by isotropic incremental bands.

If $IIA_{str}=1$, then the entire area of an incremental pattern includes numerous lines making it difficult or even impossible to define the structure of incremental bands across a 2-D incremental pattern. Thus, $IIA_{str}=1$ is the characteristic of the structural chaos of a 2-D pattern. More precisely, $IIA_{str}=1$ if a segment of an image situated between any possible versions of transects contains no isotropic bands, i.e., layers.

A starting point of operation of the Parametrization subsystem 98 (shown in FIGS. 1A-1B, and 5-8) is the N-partite graph G(N) unit 100 configured to construct the N-partite graph G(N) of the incremental pattern in accordance with the technique presented in '578 Patent.

The following procedure, for the sake of simplicity of explanation will be presented, as an example, with respect to parallel equidistant transects. However, the principles described herein for the image parameterization are fully applicable to other configurations of sets of transects, depicted for example, in FIGS. 3B-3D and others.

FIG. 9A depicts an incremental pattern 130 of the 2-D image and a corresponding G(N) graph 132 situated between transects A, B and C plotted on the 2-D image under study. Considering a fragment 134 of the pattern 130 situated between transects A and B and the corresponding bi-partite graph G(A, B) 136, the graph G(A, B) 136 includes two sets of vertices A={$a_1, a_2, a_3, a_4, a_5$}, B={$b_1, b_2, b_3, b_4$}.

Two vertices $a_i$ and $b_j$ form the isotropic edge if $a_i$ is connected only with $b_j$, and $b_j$ is connected only with $a_i$, or in other words, there is one to one $$correspondence\ between\ a_i\ and\ b_j. \quad (Eq.\ 1)$$

A number of isotropic edges in G(A, B) equals zero because in FIG. 9A there are no vertices situated along the transects A, B that satisfies the definition (Eq. 1).

Thus, the $IIA_{str}=1$ for transects A and B, i.e., $IIA_{str}$ (A, B)=1.

The fragment G(B, C) 138 of the graph 132 situated between the transects B and C (FIG. 9A) consists of four vertices along the transect B and five vertices along the transect C. The total number of the vertices in the graph G(B, C) 138 equals 9.

There is an exact correspondence between the vertexes $b_4$ and $c_5$, as well as between $c_1$ and $b_1$. Four vertices out of nine vertices in the G(B,C) 138 form isotropic edges in the graph G(B,C).

Thus, $IIA_{str}$(B, C)=(9-4)/9=0.556.

The equation for calculation of the $IIA_{str}$ of a bi-partite graph $G(X_i, X_{i+1})$ can be presented as:

$$IIA_{str}(X_i,X_{i+1})=[VT(X_i,X_{i+1})-VI(X_i,X_{i+1})]/VT(X_i,X_{i+1}) \quad (Eq.\ 2)$$

where $VT(X_i, X_{i+1})$ is the total number of vertices in $G(X_i, X_{i+1})$, and $VI(X_i, X_{i+1})$ is the total number of vertices forming isotropic edges, where $X_i, X_{i+1}$ correspond to nearby transects plotted on the 2-D image under study.

From the definition (Eq. 1) and Eq. 2, it follows for a 2-D binary arbitrary image:

$$Index\ of\ Intrinsic\ Isotropy_{str}+Index\ of\ Intrinsic\ Anisotropy_{str}=1 \quad (Eq.\ 3)$$

Eq. 3 means that the structure of a binary arbitrary image consists of both the isotropic and the anisotropic layered components of different length.

The transects A, B and C are used to present the structure of incremental pattern (FIG. 9A) in terms of two bi-partite graphs G(A, B) 136 and G(B, C) 138.

Denoted by $IIA_{str}$ (A, C) is the Index of Intrinsic Anisotropy of structure of the incremental pattern 130 situated between the transects A and C. The equation for the calculation of Index of Intrinsic Anisotropy of structure of a 2-D incremental pattern is:

$$IIA_{str}(A,C)=[IIA_{str}(A,B)+IIA_{str}(B,C)]/2=(1+0.556)/2=0.778 \quad (Eq.\ 4)$$

Considering the calculation of the $IIA_{str}$ (A, D) for four transects (presented in FIG. 9B):
VT(A, B)=9; VT(B,C)=7; VT(C, D)=8; VI(A, B)=4; VI(B, C)=4; VI(C, D)=4. $IIA_{str}$ (A,B)=(9-4)/9=0.556; $IIA_{str}$(B, C)= (7-4)/7=0.428; $IIA_{str}$(C, D)=(8-4)/8=0.5. $IIA_{str}$(A, D)= [$IIA_{str}$ (A, B)+$IIA_{str}$ (B, C)+$IIA_{str}$ (C, D)]/3=(0.556+0.428+ 0.5)/3=0.495.

An equation for calculation of the $IIA_{str}$ for N transects is represented by:

$$IIA_{str}(X_1,X_N)=1/(N-1)*[\Sigma IIA_{str}(X_i,X_{i+1})] \\ ,i=1,\ldots,N-1 \quad (Eq.\ 5),$$

where N is the number of transects plotted on the 2-D image under study.

Examples of the calculation of the parameter $IIA_{str}$ for three and four transects suggest that different numbers of transects may be used to calculate $IIA_{str}$ for a 2-D incremental pattern, i.e., the number of transects in the computations varies from $N_{min}$ to $N_{max}$.

For computation of the $IIA_{str}$ for the image depicted on FIG. 9A, 100 different sets of transects sequences have been used, with the first set of three transects, the second set of four transects, the third set of five transects, . . . , and the last set of 102 transects.

Figures 9C, 9D:
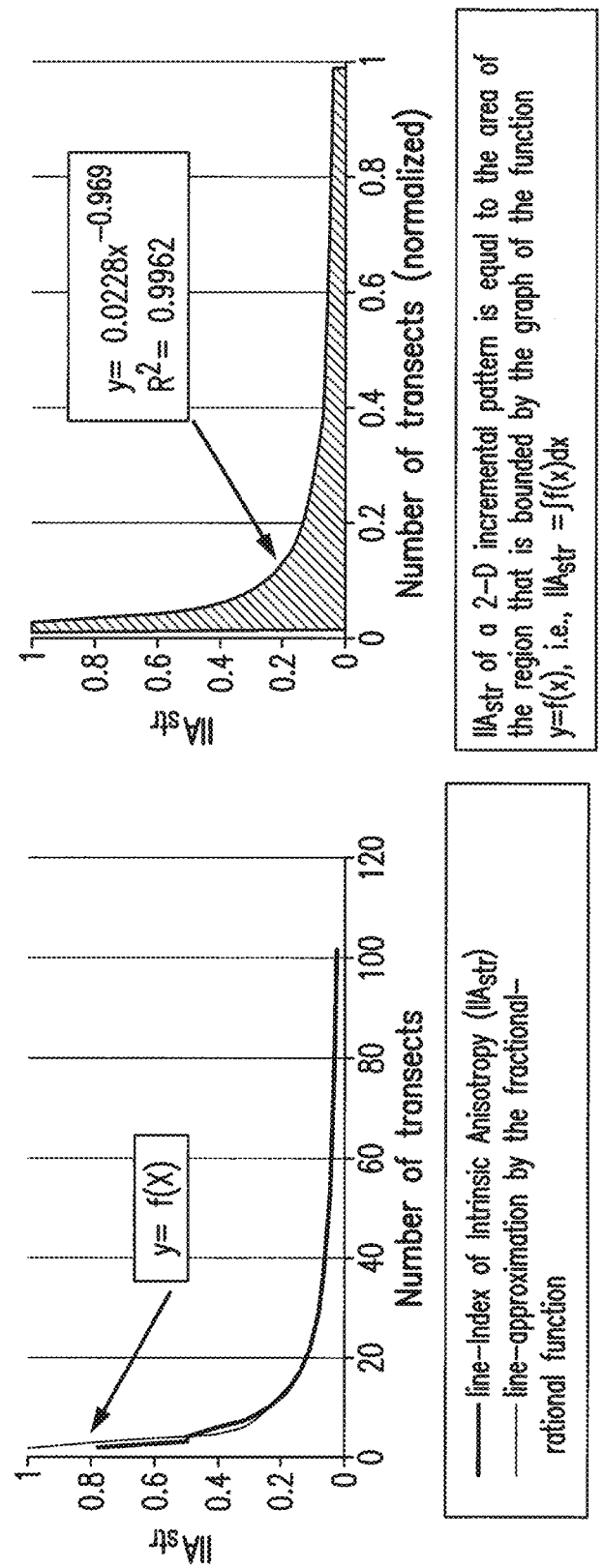
FIG. 9C is a plot representative of an Index of Intrinsic Anisotropy of structure ($IIA_{str}$) as a function of a number of transects, and an approximating function for the plot.
FIG. 9D is a graph representative of an Index of Intrinsic Anisotropy of structure for the 2-D incremental pattern shown in FIGS. 2A-2B.

Eqs. 2 and 5 have been used to calculate the $IIA_{str}$ for the 100 sets of transects numbers for the 2-D incremental pattern presented in FIG. 9A, and a resulting plot "$IIA_{str}$ vs. Number of transects" has been built, as shown in FIG. 9C.

In order to compare the $IIA_{str}$ of different incremental patterns, the x-axis of the plot "$IIA_{str}$ vs. Number of transects" has been scaled to values from 0 to 1 by using the scale coefficient equal 1/Maximal number of transects (FIG. 9D).

The parameter $IIA_{str}$ for an incremental pattern is defined as an area of the region that is located in FIG. 9D between the plot of f(x) and the x-axis and the vertical lines ranging from q=1/N to x=1. Thus, the equation for the calculation of an $IIA_{str}$ may be represented as:

$$IIA_{str}(X_1,X_N)={_0}\int^1 f(X)dX \quad (Eq.\ 6)$$

Eq. 1-Eq. 6 serve as the building block for the subject quantification of structure of layered and arbitrary images.

Coefficient of determination $R^2$ (calculated in accordance with a technique presented in N. R. Draper, et al., "Applied Regression Analysis", Wiley-Interscience, 1998, ISBN 0-471-17082-8), which ranges from 0 to 1, was used to estimate how well the plot "$IIA_{str}$ vs. Number of transects" is replicated by the partial-rational function $$Y=m\cdot X^{-k} \quad (Eq.\ 7)$$

If $R^2=1$, then $Y=m\cdot X^{-k}$ is the approximation of the plot "$IIA_{str}$ vs. Number of transects" with the error equal to zero.

Thus, if $R^2=1$, then the function $Y=m\cdot X^{-k}$ sets up a functional relationship between the Number of transects and the $IIA_{str}$ values.

Microsoft Excel 2007 was used to calculate the parameter of plot "$IIA_{str}$ vs. Number of transects" for the incremental pattern depicted in FIG. 9C. Because the value of $R^2$ is approximately equal 1 ($R^2=0.9962$), the function Y=0.0228 $X^{-0.969}$ (shown in FIG. 9D) can be used to calculate the $IIA_{str}$ value.

Eq. 8 (presented in D. Zwillinger, "CRC Standard Mathematical Tables and Formulae", $31^{st}$ Edition, Chapman & Hall/CRC Press. 2002, p. 819) is used to calculate $IIA_{str}$ ($X_1, X_{100}$):

$$\int m\cdot X^k\cdot dX=1/(k+1)X^{k+1}\ for\ k\neq 1 \quad (Eq.\ 8)$$

Thus, $$IIA_{str}(X_1,X_{100})=\int_{0.01}^1 0.0228X^{-00.969}dx=[0.0228/(-0.969+1)](X^{-0.969+1})|_{0.01}^1=0.0228\{[(1^{0.031})/0.031]-[(0.01^{0.031}/0.031]\}=0.0228(32.258-27.966)=0.09786 \quad (Eq.\ 9)$$

It has been found experimentally that the function $Y=m\cdot X^{-k}$ provides a satisfactory approximation for the plot "$IIA_{str}$ vs. Number of transects". This has been demonstrated for various categories of incremental patterns shown in FIGS. 10A-10D, for which the Coefficient of Determination $R^2>0.91$.

Anisotropic features of a 2-D image can also be presented in the form of a plot "$IIA_{str}$ vs. Relative distance between transects" (shown in FIGS. 18C, 19D, and 21C) where the relative distance is calculated with relation to the width of the image. For instance, the Relative distance between transects which equals 0.1 means that the distance between transects is equal to 0.1 of the width of the image.

The starting point of the calculation of the $IIA_{str}$ of the incremental pattern 65 (shown in FIGS. 9A-9B) is the sequence of $N_k$-partite graphs G(Nk) of the object of study, $k=N_{min}, \ldots, N_{max}$ computed in the G(N) unit 40 in accordance with the algorithm presented in the '578 Patent.

Figure 11:
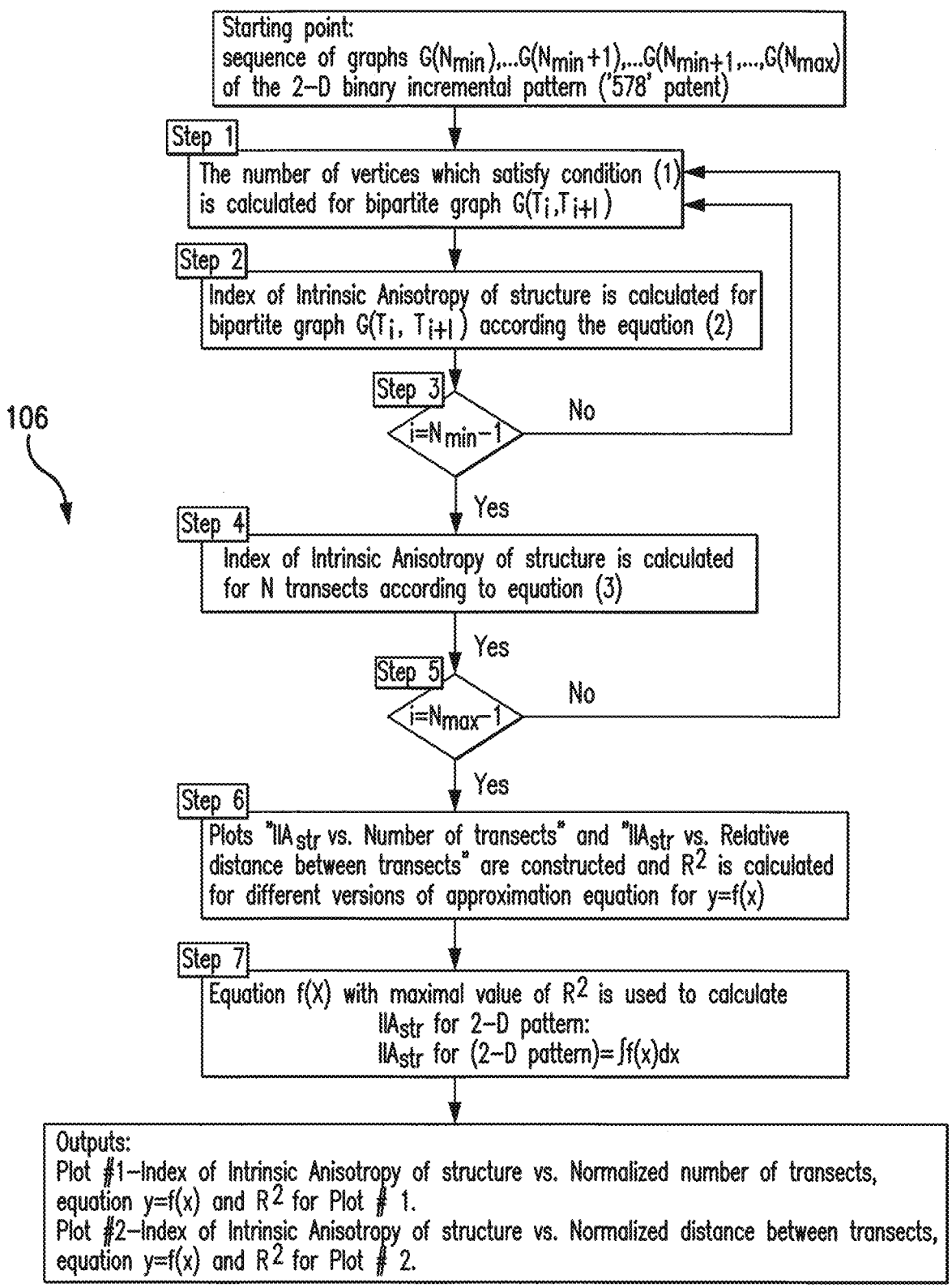
FIG. 11 is a flow-chart diagram of a process designed for the calculation of the Index of Intrinsic Anisotropy of structure.

Referring to FIGS. 7 and 11, which illustrates the operation of the parametrization unit 98, and particularly operation of the Indices Quantification Unit 106, the routine of computation of $IIA_{str}$ begins with receiving from the G(N) unit 100 of a sequence of graphs G ($N_{min}$), G($N_{min+1}$), ..., G($N_{max}$) of the 2-D binary incremental pattern, for example of the pattern 130 shown in FIGS. 9A-9B.

In Step 1 of the procedure, the number of vertices satisfying the condition (Eq. 1) is calculated for the bi-partite graph G($T_j$, $T_{j+1}$), $j=1, \ldots, N_{max}-1$, In Step 2, Eq. 2 is used to calculate the $IIA_{str}$ for the bi-partite graph G($T_j$, $T_{j+1}$).

In Step 3, Steps 1-2 are repeated $N_{max}-1$ times to result in the $IIA_{str}$ for each bi-partite graph G($T_j$, $T_{j+1}$).

In Step 4, Eq. 5 is used to calculate $IIA_{str}$ for $N_{min}$ transects.

In Step 5, Steps 1-4 are repeated for $N_{min}+1$, $N_{min}+2, \ldots, N_{max}$ transects to result in the sequence of plots "$IIA_{str}$ vs. Number of transects", shown in FIG. 9C.

In Step 6, Commercially available software (for instance, Microsoft Excel, Mathematic, Mat Lab) may be used to calculate $R^2$ (in accordance with the technique presented in N. Draper, et al., "Applied Regression Analysis", 1998, Wiley-Interscience, ISBM 0-471-17082-8), and the functions $Y=m \cdot X^{-k}$ and $Y=A \cdot X^3+B \cdot X^2+C \cdot X+D$ (approximation equations for y=f(x)), and the plots "$IIA_{str}$ vs. Number of transects" (shown in FIG. 9C) and "ISA vs. Number of transects" (shown in FIG. 9D), or "$IIA_{str}$ vs. Relative distance between transects" are constructed and output to the Output System 122.

In Step 7, Eq. 6 is used to calculate $IIA_{str}$ for N+M transects if the value of $R^2$ suffices for the object of study and the problem statement. For the calculation of the integral function, Eq. 10 is used (as presented in D. Zwillinger, 2002, "CRC Standard Mathematical Tables and Formulae", 31$^{st}$ edition, Chapman & Hall/CRC Press, 2002, p. 819):

$$IIA_{str}(X, X_{N+M}) = \int f(X)dX = \int_q^1 m \cdot X^k \cdot dx = m[(1/k+1)(X^k+1)], k \neq -1 \quad \text{(Eq. 10)}$$

where $q=1/N_{max}$.

If the value of $R^2$ is not sufficient for the object of study, then interpolation methods (presented in Davis and Rabinowitz, "Methods of Numerical Integration", 2$^{nd}$ Edition, 2007, p. 612) can be used to calculate the parameter $IIA_{str}$.

The resulting data, i.e., including the $IIA_{str}$ (2-D) 142 for 2-D binary incremental patterns output from the Indices Quantification unit 106 may be presented in the form of the plots shown in FIGS. 9C-9D, and may be output to the Output system 122.

Index of Complexity of Image Anisotropic Structure ($CI_{str}$)

Results of calculation of the parameter $IIA_{str}$ for a 2-D layered image depend on the image alignment. In order to construct structural characteristic of a 2-D layered image invariant to its alignment, a routine of rotation image for different rotational angles $\varphi_0, \varphi_1, \varphi_2, \ldots$ is performed in the rotation unit 141 (which is included in the Indices Quantification Unit 106), and the parameter $IIA_{str}$ is computed for each angle. The rotation procedure (shown in FIGS. 7 and 12A) results in a sequence of $IIA_{str}$ ($\varphi_0$), $IIA_{str}$ ($\varphi_1$), ..., $IIA_{str}(\varphi_i), \ldots IIIstr(\varphi_q)$.

Because $IIA_{str}(\varphi_0) = IIA_{str}(\varphi_0+180°)$, the image has to be rotated 180° in order to calculate $IIA_{str}(\varphi_i)$ for all possible versions of image alignment.

The union of $IIA_{str}$ ($\varphi_0$), $IIA_{str}$ ($\varphi_1$), ..., $IIA_{str}$ ($\varphi_i$), ..., $IIA_{str}$ ($\varphi_0+180°$) represents the structural characteristic of a 2-D layered image invariant to image alignment. This characteristic called Index of Complexity of Image Anisotropic Structure ($CI_{str}$) is computed in the Indices Quantification Unit 106. The characteristic $CI_{str}$ is invariant to image alignment and is defined as follows:

$$CI_{str} = (1/q) \cdot \Sigma IIA_{str}(\varphi_i), i=1 \ldots, q \quad \text{(Eq. 11)}$$

where q is the number of image rotations.

Index of Intrinsic Anisotropy of Size ($IIA_{size}$)

$IIA_{size}$ is the characteristic of the invariability of layers thickness of 2-D layered image across the 2-D plane, i.e., a sample area, or across N transects. The calculation of $IIA_{size}$ is performed in the Indices Quantification Unit 106, as shown in FIGS. 6-7, using the following routines:

Step 1. N transects are plotted and the thickness of each transects situated along transects $T_j$, j=1, N are calculated in accordance with the routine presented in '578 Patent, resulted with table W ($w_{i,j}$), where $w_{i,j}$ is the thickness of a layer i across transects $T_j$.

Step 2. Thickness of layers across transect $T_j$ is normalized in order to present $IIA_{size}$ on the uniform scale [0,1]:

$$w(\text{normalized for } T_j)_i = [w_i - \min(w_i)]/[\max(w_i) - \min(w_i)] \quad \text{(Eq. 12)}$$

Step 3. Deviation of layers thickness $D_j$ along transect $T_j$ is calculated based on regression analysis (in accordance with technique presented in N. R. Draper, et al., "Applied Regression Analysis", Wiley-Interscience, 1998, ISBN 0-471-17082-8, as:

$$D_j = (1/n_j) \cdot \{\Sigma[w(\text{normalized for } T_j)_i - w(\text{average normalized})_i]^2\}^{1/2} \quad \text{(Eq. 13)}$$

where $n_j$ is the number of layers situated along $T_j$ and w (average normalized) is the average layer normalized thickness along $T_j$.

Step 4. Steps 2 and 3 are repeated for transects $T_1, T_2, \ldots, T_N$ resulting in the sequence of deviations of layers thickness $D_1, D_2, \ldots, D_N$.

Step 5. $IIA_{size}$ is calculated for N transects by averaging $D_1, D_2, \ldots, D_N$:

$$IIA_{size}(\text{for } N \text{ transects}) = (1/N) \cdot \Sigma(D_k), k=1, \ldots, N \quad \text{(Eq. 14)}$$

Step 6. Steps 1-5 are repeated for number of transects N+1, N+2, ..., N+M resulting in the sequence of $IIA_{size}$ (for N+1 transects), $IIA_{size}$ (for N+2 transects), ..., $IIA_{size}$ (for N+M transects).

Step 7. Finally, Index of Intrinsic Anisotropy of size ($IIA_{size}$) of a 2-D layered image is calculated by averaging $IIA_{size}$ (for N+1 transects), ..., $IIA_{size}$ (for N+M transects):

$$IIA_{size}(\text{2-D layered image}) = (1/M) \cdot \Sigma[IIA_{size}(\text{for } N+k \text{ transects})], k=1, \ldots, M \quad \text{(Eq. 15)}$$

Index of Complexity of Image Anisotropic Size ($CI_{size}$)

The results of calculation of $IIA_{size}$ of 2-D layered image depends on the image alignment, similar to the index $IIA_{str}$. In order to construct the characteristic of the size for a 2-D layered image invariant to its alignment, a routine of rotation of the image for different rotational angles $\varphi_0, \varphi_1, \varphi_2, \ldots$ is applied in the Rotation Unit 141, and $IIA_{size}$ is calculated for each angle, resulting in the sequence $IIA_{size}$ ($\varphi_0$), $IIA_{size}$ ($\varphi_1$), $IIA_{size}$ ($\varphi_2$), . . . .

Because $IIA_{size}(\phi_0) = IIA_{size}(\phi_0+180°)$, the image has to be rotated 180° in order to calculate $IIA_{size}(\varphi_1)$ for all possible versions of the image alignment. The union of $IIA_{size}(\varphi_0), IIA_{size}(\varphi_1), IIA_{size}(\varphi_2), \ldots, IIA_{size}(\varphi_0+180°)$ represents the characteristic of anisotropy of size for a 2-D layered image invariant to image alignment. This characteristic is called the Index of Complexity of Image Anisotropic size ($CI_{size}$). $CI_{size}$ is invariant to image alignment, and is computed in the unit 106 as:

$$CI_{size}=(1/q)*\Sigma IIAsize(\varphi_i), i=1,\ldots,q \qquad (Eq.16)$$

where q is the number of image rotations.

$CI_{size}$ is invariant to image alignment.

Figure 12A:
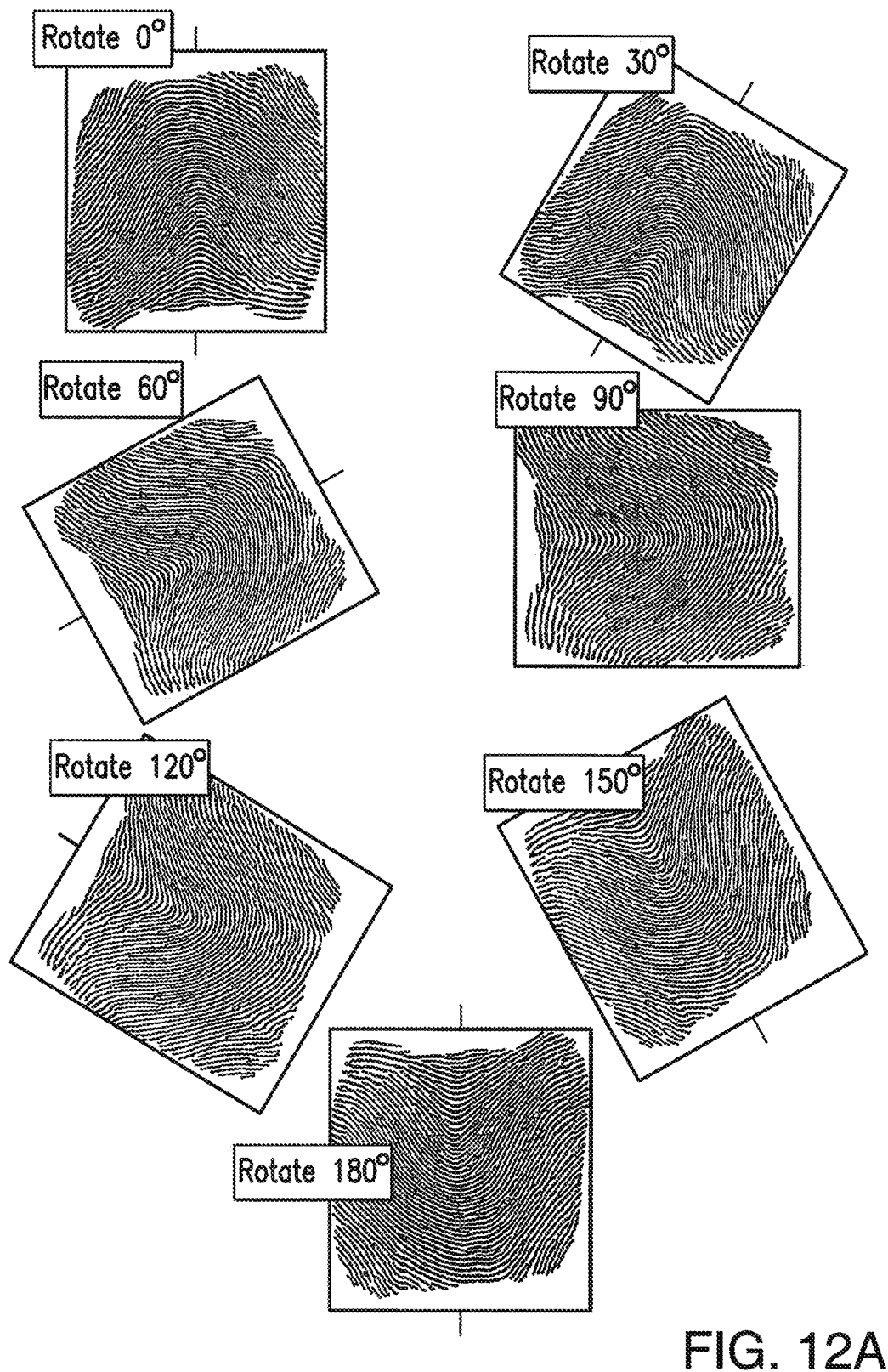
FIG. 12A is representative of various alignments of the image of a fingerprint.

FIG. 12A depicts images of a fingerprint for angles of rotation 0°, 30°, 60°, 90°, 120°, 150°, 180°. FIG. 12B is representative of the plots for $IIA_{str}=f(\varphi_i)$, $IIA_{size}=f(\varphi_i)$ and image characteristics $CI_{str}$ and $CI_{size}$, respectively, which are output to the Output System 122, as part of the output data 142.

$IIA_{str}$ as a Measure of Similarity of the Structure of Images

Comparison of structures of incremental patterns is performed in the Quantification of Similarities Unit 108, shown in FIG. 6. Similarities Quantification is a critical element for solving broad spectrum of problems in pattern recognition, remote sensing, nano-technology, shape analysis, in biomedical field, etc.

In order to use the $IIA_{str}$ for the comparison of structure, it is necessary to know the structural resolution of the $IIA_{str}$, or in other words it is necessary to quantify how sensitive the parameter $IIA_{str}$ is to the structural changes of an image.

In order to address this problem, the parameters $IIA_{str}$ of two fish scales (FS-1 and FS-2) shown in FIG. 13A have been compared. The FS-1 and FS-2 look similar but have controlled minor changes indicated by a circle 160.

Sixty two transects have been used ($N_{min}=3$, $N_{max}=62$) to construct the plot "$IIA_{str}$ vs. Number of transects" for FS-1 and FS-2 (shown in FIG. 13B), and the values $R^2$ have been calculated. The calculated values of $R^2$ are very high ($R^2$(FS-1)=0.9852 and $R^2$(FS-2)=0.9841), indicating that the function $Y=m \cdot X^{-k}$ can be used to calculate $IIA_{str}$. For FS-1:

$$Y=m \cdot X^{-k}=0.0703X-0.675; IIA_{str}(FS-1)=0.145 \qquad (Eq. 17)$$

For FS-2:

$$Y=m \cdot X^{-k}=0.0609X-0.68; IIA_{str}(FS-2)=0.129 \qquad (Eq. 18)$$

The distance between two binary incremental patterns is:

$$Distance(Pattern-1, Pattern-2)=abs[IIA_{str}(Pattern-1)-IIA_{str}(Pattern-2)] \qquad (Eq.19)$$

The distance between the structure of fish scales depicted in FIGS. 6A-6B is represented by:

$$\begin{aligned}Distance(FS-1,FS-2)&=IIA_{str}(FS-1)-IIA_{str}(FS-2)\\&=0.145-0.129=0.016\end{aligned} \qquad (Eq. 20)$$

From the difference $IIA_{str}$ (FS-1)$\neq IIA_{str}$ (FS-2) found when the parameters $IIA_{str}$ for the FS-1 and FS-2 have been compared, follows that the Index of Intrinsic Anisotropy of structure (Eq. 5) is sensitive to structural changes of 2-D incremental patterns. Thus, the parameter $IIA_{str}$ can serve as the metric which permits quantification of structural differences between 2-D binary incremental patterns.

However, the parameter $IIA_{str}$ does not provide a tool for detection of the location of structural differences. In order to compute the localization of the structural differences across two, or a number of images (for example, time-series images), a routine of localization is performed in the Localization of Difference unit 110 included in the parameterization sub-system 98.

Figure 14:
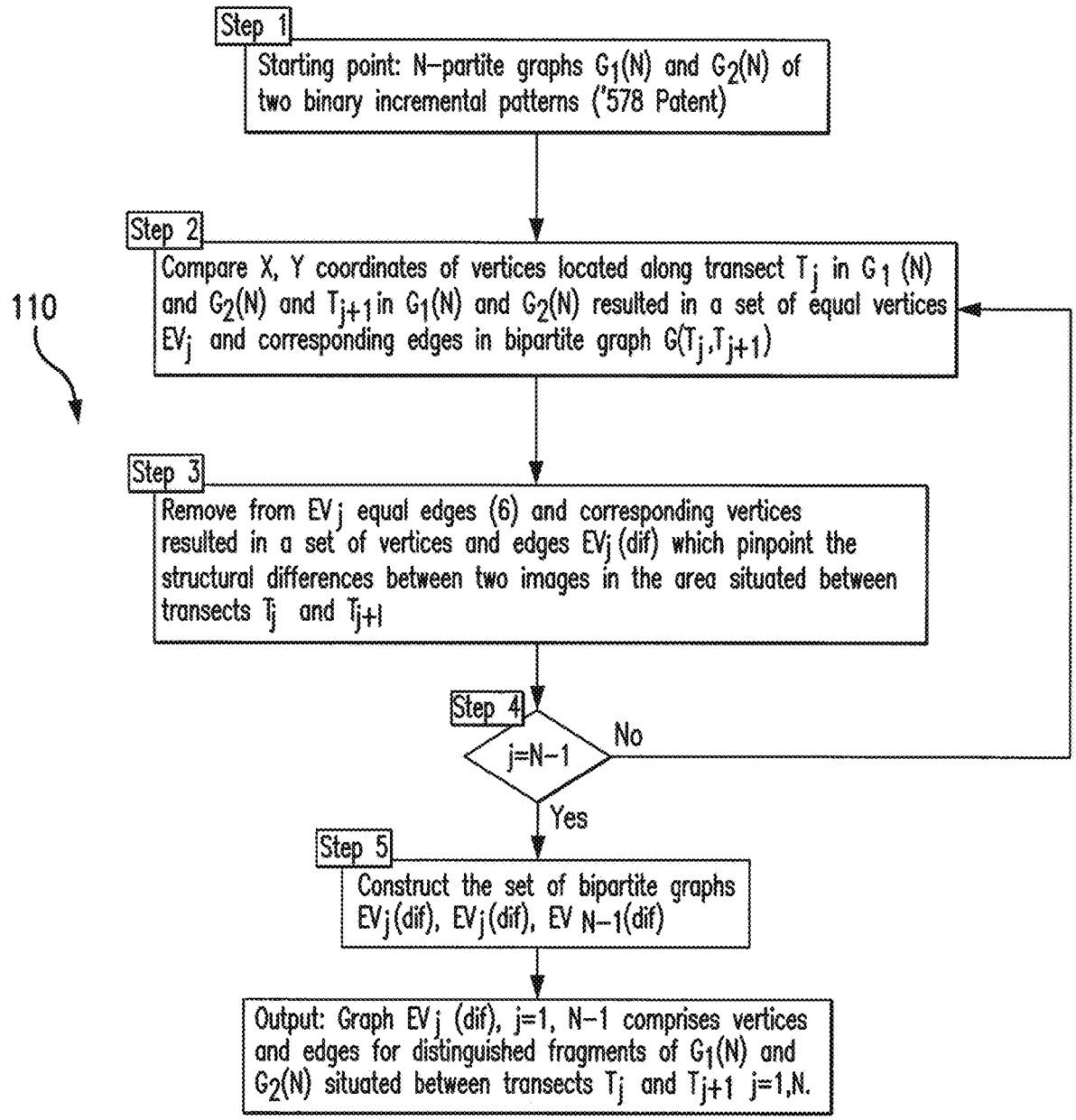
FIG. 14 is a flow-chart diagram of the routine for computation of the structural differences between two images.

Localization of Structural Changes Across Time-Series of 2-D Binary Layered Images The flow chart diagram of the routine performed in the Localization of Differences unit 110 is depicted in FIG. 14.

Image time series are broadly used in various disciplines as a source of information about the evolution of a state of an object of study over a time period. One of the goals of analyzing the image time series is to pinpoint the structural differences. The subject procedure for localization of the structural differences is based on the computation of the parameter $IIA_{str}$ presented in previous paragraphs which permits solving this problem for 2-D binary incremental patterns.

For the localization routine, as an example, two images are considered which represent the state of an object of study at two instances of time $t_1$ and $t_2$. The images are assumed to be synchronized in a space domain.

Denoted by $G_1(N)$ and $G_2(N)$, are the N-partite graphs of these images as presented in '578 Patent. The computing G(N), F(M,N) unit 100 also creates Tables $F_1(M,N)$ and $F_2(M,N)$ which include coordinates of points of intersections of transects with incremental bands and are also used in the computations, as presented in '578 Patent.

Each vertex in $G_1(N)$ and $G_2(N)$ has coordinates X and Y stored in $F_1(M, N)$ and $F_2(M, N)$ which identify its position in the 2-D space. A vertex $a_{i,j}$ located on transect $T_j$ in $G_1(N)$ is equal to vertex $b_{i,j}$ located on the transect $T_j$ in $G_2(N)$ if $a_{i,j}$ and $b_{i,j}$ have identical coordinates X, Y, or the distance between $a_{i,j}$ and $b_{i,j}$ less than a Threshold. The value of the Threshold depends on the size of the $a_i,j$ image and is defined empirically.

Further denoted by $E_1(a_{n,j}, a_{m,j+1})$ is the edge connected vertices $a_{n,j}, a_{m,j+1}$ in the graph $G_1(N)$, and by $E_2(b_{n,j}, b_{m,j+1})$ the edge of connected vertices $b_{n,j}, b_{m,j+1}$ in the graph $G_2(N)$.

The edge $E_1$ is equal $E_2$ if the vertex $a_{n,j}$ is equal $b_{n,j}$ and $a_{m,j+1}$ $$\text{is equal to } b_{m,j+1} \qquad (Eq. 21)$$

Thus, in order to pinpoint the area of structural difference between two images, it is necessary to remove from the graph $G_1(N)$ the edges which are equal to edges in the graph $G_2(N)$, as well as vertices connected by these edges.

The X, Y coordinates of the vertices remaining in the graph $G_1(N)$ then represent the structural differences between two images. The graph comparison thus is considered to be an efficient tool for pinpointing the differences in structure across the image time series.

The algorithm depicted in FIG. 14 for the comparison of two graphs $G_1(N)$ and $G_2(N)$ is carried out in the Localization of difference unit 110 through the steps of:

Step 1. The starting point of image is the N-partite graphs $G_1(N)$, $G_2(N)$ and tables $F_1(M, N)$ and $F_2(M, N)$, computed in accordance with the procedures presented in '578 Patent.

Step 2. Coordinates X,Y of vertices situated along the transect $T_j$ in the graph $G_1(N)$ are compared with coordinates of vertices situated along the transect $T_j$ in the graph $G_2(N)$.

Similarly, the vertices along the transect $T_{j+1}$ in the graph $G_1(N)$ are compared with the vertices along the transect $T_{j+1}$ in the graph $G_2(N)$.

The procedure results in a set $EV_j$ of equal vertices and corresponding edges which represent the results of the structural comparison of the areas situated between transects $T_j$ and $T_{j+1}$ in two images under study.

Step 3. Equal edges (satisfying Eq. 21) and corresponding vertices are removed from $EV_j$. This subtraction results in the set of vertices and edges $EV_j(dif)$ which pinpoint the structural differences between two images in the area situated between $T_j$ and $T_{j+1}$.

Step 4. Steps 1 and 2 are repeated for $j=1, \ldots, N-1$

Step 5. The set of bi-partite graphs $EV_1(dif), \ldots, EV_j(dif), \ldots, EV_{n-1}(dif)$ is constructed. This set pinpoints the structural differences between the sequence of image segments situated between transects $T_j$ and $T_{j+1}$, $j=1, \ldots, N-1$.

The output of the structural difference localization is represented by the Graph $EV_j(dif)$, $j=1, \ldots, N-1$ which comprises vertices and edges for distinguished fragments of the graphs $G_1(N)$ and $G_2(N)$ situated between the transects $Tj$ and $T_{j+1}$, $j=1, \ldots, N-1$.

Basic Concept for Measurements an Image Anisotropy

Parameter $IIA_{str}$ represents the results of the comparison of the structure of two layered images, which include an Image-1 (which is the initial 2-D layered image with anisotropy of structure) and an Image-2 (which is the layered image with isotropy of structure). The parameter $IIA_{str}$ is used as the measure of deviation of a structure of a layered anisotropic image from its isotropic prototype. This statement is an important concept underlying (inter alia) the present concept.

Transects of arbitrary configuration may be used for the calculation of $IIA_{str}$. In this case the Image-2 consists of arbitrary anisotropic transects, and the parameter $IIA_{str}$ will be the result of the anisotropic structure of Image-1 with respect to anisotropic structure of Image-2. In this case, the parameter $IIA_{str}$ is unusable as an intrinsic structural characteristic of Image-1.

The parameter $IIA_{size}$ represents the result of comparison of the size of two layered images. Image-1 is the initial 2-D layered image with the anisotropy of size, and the Image-2 is the layered image with isotropy of size and structure. A set of N parallel straight transects are plotted on the Image-2 with identical distance between two nearby transects. The $IIA_{size}$ is used as the measure of deviation of anisotropic size of a layered image (Image-1) from its isotropic prototype (Image-2).

It is possible to use the Image-2 with an arbitrary distance between transects for the calculation of $IIA_{size}$. In this case, the Image-2 consists of transects with anisotropy of layers size, and the parameter $IIA_{size}$ will be the result of comparison of two images with the anisotropy of size. In this case the parameter $IIA_{size}$ is unusable as an intrinsic characteristic of size of Image-1.

B. Processing of 2-D and 3-D Binary Arbitrary Images in the Raster Format

Index of Intrinsic Anisotropy of Structure ($IIA_{str}$) for Arbitrary 2-D Binary Images For computation of the parameter $IIA_{str}$ for arbitrary 2D binary images, an arbitrary 2-D binary image is divided by N parallel transects $T_1, \ldots, T_j, \ldots, T_N$, to form N-1 segments. The geometrical structure of the segment situated between two nearby transects $T_j$ and $T_{j+1}$ can be described by a bi-partite graph and a Boolean function in the same way as it performed for a 2-D incremental pattern in the '578 Patent.

It is considered that the Index of Intrinsic Anisotropy of structure and the method of its calculation is applicable for the quantification of various categories of 2-D binary patterns. In order to justify this statement, the calculation of $IIA_{str}$ for images with distinctive structural characteristics is considered.

FIG. 15A shows the image of a circle. Transects A, B, ..., E are used to generate four partite graphs consisting of five vertices a, b, c, d, e. Vertices a, b, c, d, e generate four isotropic edges: a-b, b-c, c-d, and d-e. Thus, there are no anisotropic edges in the N-partite graph 162 of the circle, and the $IIA_{str}$ of the circle equals zero. This means that a circle is the example of an image with isotropic structure.

A similar statement is true for the partite graph 164 of the image of a triangle shown in FIG. 15B. Triangles and circles are two different figures from geometrical point of view. Triangles and circles can be considered as incremental bands of isotropic structure in the context of quantification of the structure of a 2-D incremental pattern.

An image 166 shown in FIG. 15C is a combination of the images of a circle and a triangle shown in FIGS. 15A-15B, respectively. The $IIA_{str}$ of the new image 166 for the combined images of the Circle and Triangle, is radically different from the $IIA_{str}$ of each of the triangle and the circle, separately. The partite Graph 168 of the image of the combined Circle and Triangle consists of seven vertices: a, b, c, c2, c3, d, e, where the bi-partite graph formed by transect A and B consists of two vertices (9, 6) forming the isotropic edge a-b. Thus, the segment of the image 166 situated between the transects A and B has the Index of Intrinsic Anisotropy of structure equal to zero, i.e., $IIA_{str}(A-B)=0$.

The parameter $IIA_{str}$ for the image segment situated between the transects B and C is equal one, because the corresponding bipartite graph contains no isotropic edges. In addition, the graph corresponding to the image segments situated between transects B and C contains no edges at all, so $IIA_{str}(B-C)=1$.

The bi-partite Graph between the transects C and D contains four vertices c1, c2, c3, d. There are no vertices forming isotropic edges. Thus, $IIA_{str}(C-D)=1$.

The bi-partite graph between transect D and E consists of two vertices d and e which form the isotropic edge d-e.

Finally, the $IIA_{str}$ of the image 166 depicted in FIG. 15C for five transects is computed as:

$$IIA_{str}(A-E)=[IIA_{str}(A-B)+IIA_{str}(B-C)+IIA_{str}(C-D)+IIA_{str}(D-E)]/4=(0+1+1+0)/4=0.5 \quad \text{(Eq. 22)}$$

Function $Y=m \cdot X^k$ is used to describe the relationship between the Index of Intrinsic Anisotropy of structure and the Number of transects for the image 166 (Circle and Triangle combined). The corresponding plot representation of "Index of Intrinsic Anisotropy of structure vs Number of transects" constructed for the image 166 is shown in FIG. 15C, where the equation $Y=0.0384 \, X^{-0.855}$, and $R^2=0.9834$. The Index of Intrinsic Anisotropy of structure for the image 166 (Circle and Triangle combined)=0.112.

The equation of the same category (i.e., $Y=m \cdot X^k$) is used to describe the variability of the Index of Intrinsic Anisotropy of structure as the function of a number of transects for various incremental patterns which are presented in FIGS. 10A-10D.

Figure 17A:
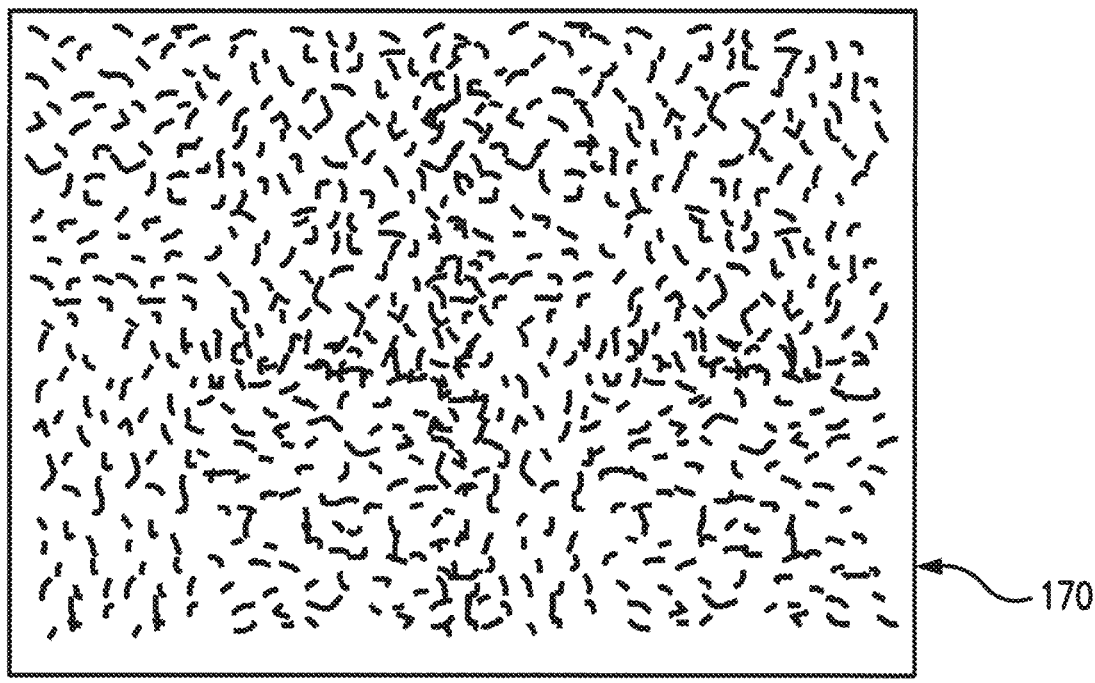
FIG. 17A is an example of the chaotic image.
Figure 17B:
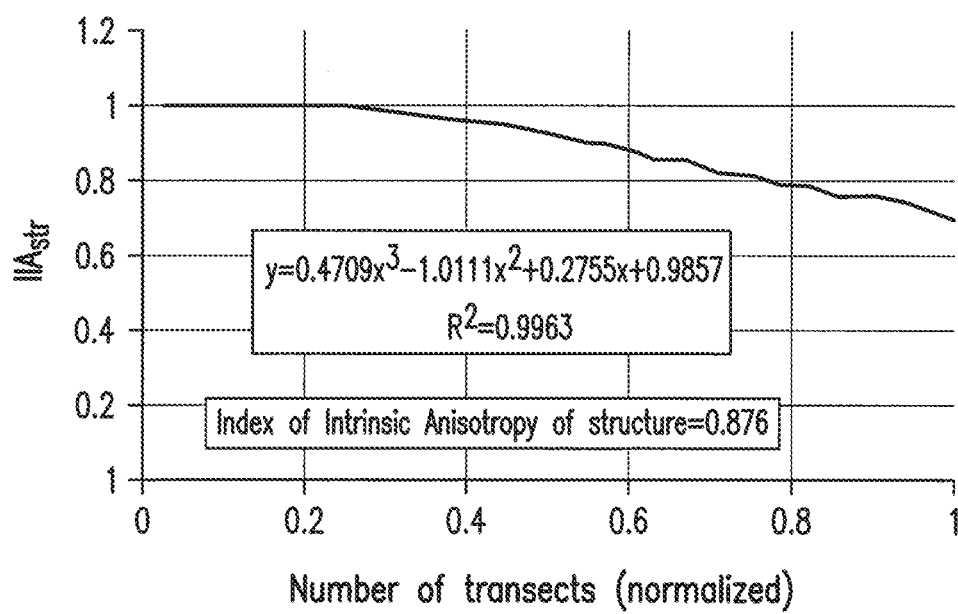
FIG. 17B is a graph representative of the Index of Intrinsic Anisotropy of structure of the chaotic image of FIG. 17A vs. the number of transects.

An example of an image 170 having a very high level of anisotropy and the accompanied plot "Index of Intrinsic Anisotropy of structure vs. Number of transects" are depicted in FIGS. 17A-17B. The $IIA_{str}=1$ for 40 transects suggesting that the image 170 has chaotic structure.

Results of processing the images of the circle, triangle, Circle and Triangle combined (image 166), and the chaotic image 170 lead to:

The simplest geometrical 2-D figures (for example, a straight line, a circle, a triangle, a square) have isotropic structure with respect to definition isotropic vertices in graph Eq. 1);

The superposition of two images with isotropic structure (FIGS. 15A and 15B) form a new image with anisotropic structure (FIG. 15C);

Chaotic images are formed by dots only. The size of any dot is equal one pixel. The Index of Intrinsic Anisotropy of structure of a chaotic image equals 1 (FIG. 17A).

Parameter $IIA_{str}$ of arbitrary images as well as $IIA_{str}$ for 2-D layered images is the deviation of anisotropic structure of 2-D arbitrary images from its layered analog with isotropy of structure; $IIA_{size}$ of arbitrary image is the deviation of anisotropic size of arbitrary image from it layered analog with isotropy of size.

Index of Intrinsic Anisotropy of 2-D Arbitrary Binary Images

The algorithm of the calculation of Index of Intrinsic Anisotropy of size of 2-D arbitrary binary images is identical to the algorithm of the calculation of Index of Intrinsic Anisotropy of size of 2-D binary images presented in previous paragraphs.

Figure 15D:
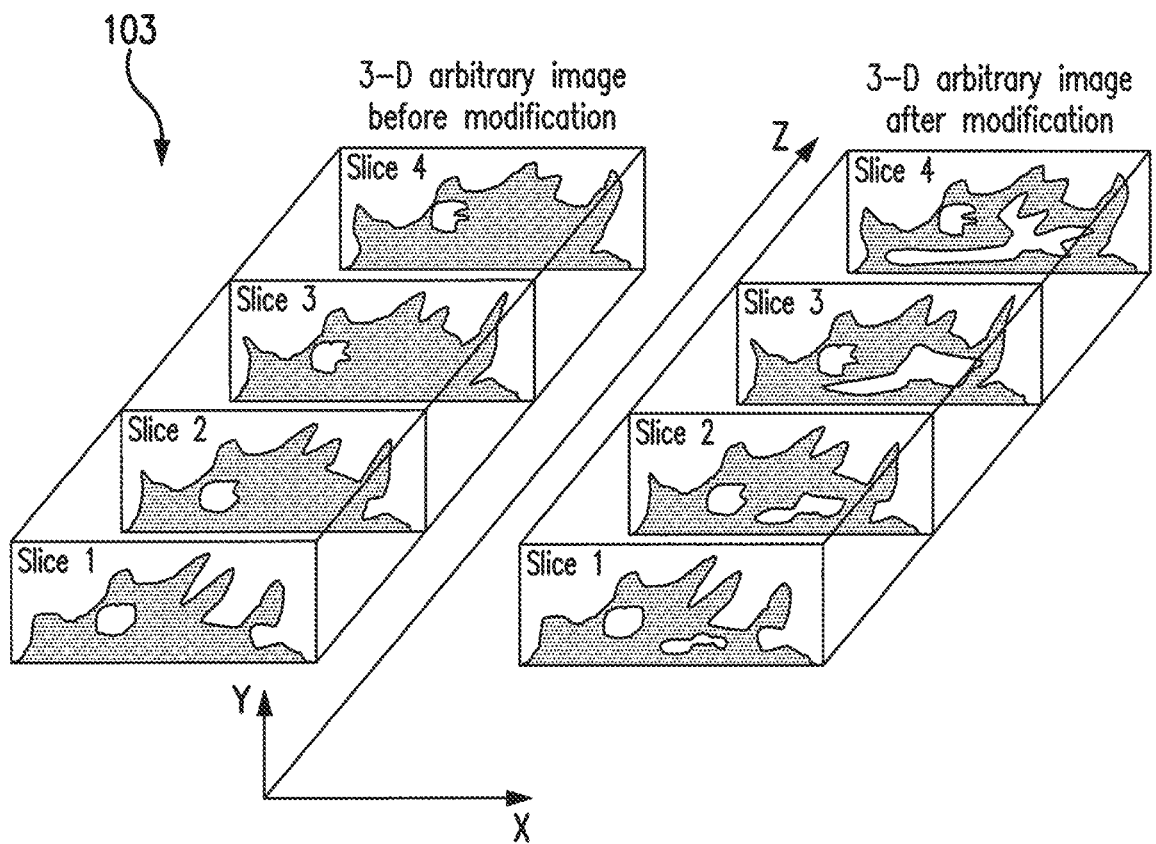
FIGS. 15D-15E are representative of the technique for computing the $IIA_{str}$ and $IIA_{size}$ for 3-D images, where

Index of Intrinsic Anisotropy of Structure and Size of 3-D Arbitrary Binary Images For quantification of 3-D arbitrary images and calculation of the Indices of Intrinsic Anisotropy of size and structure, the 3-D image under study is sliced into a set of 2-D images, as shown in FIG. 15D. The parameters $IIA_{size}$ and $IIA_{str}$ are calculated for each 2-D slice, and are subsequently averaged to result in the $IIA_{size}$ (3-D) and $IIA_{str}$ (3-D) for the 3-D arbitrary image under study. The sources of 3-D images may be MRI, computed tomography, 3-D scanner, etc.

Figure 16:
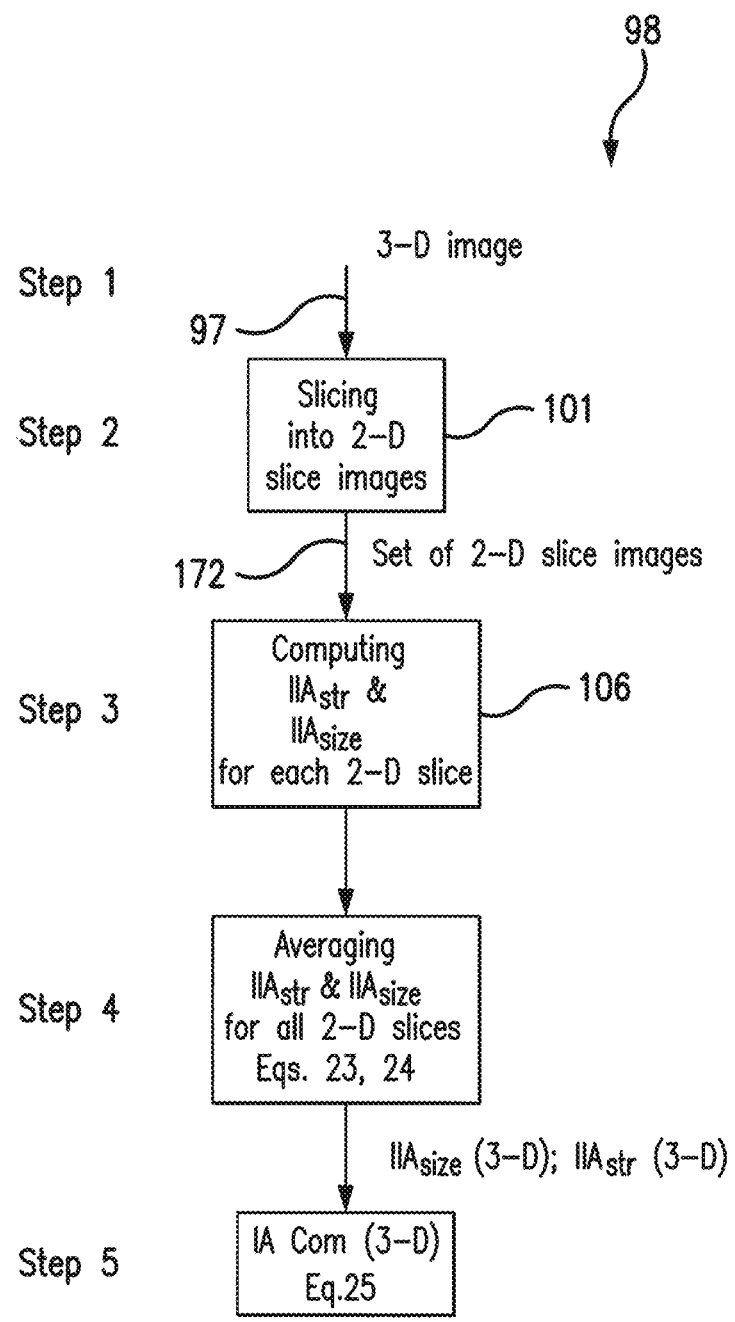
FIG. 16 is a flow-chart diagram depicting a routine for parameterization of 2-D and 3-D images.

Referring to FIGS. 6-7 and 16, the procedure of computing $IIA_{str}$ and $IIA_{size}$ for a 3-D image is initiated in Step 1, where, as the starting point of the algorithm of calculation of $IIA_{size}$ (3-D) and $IIA_{str}$ (3-D), an image 97 in the raster format is received at the "2-D or 3-D image?" Unit 99.

In Step 2, if in the Unit 99 it is determined that the Image under study is a 3-D image, a Slice Computational Unit 101 is applied to the 3-D image for slicing the 3-D image A into a set 172 of 2-D images: 3-D image A={(Slice 1(2-D image A), Slice 2(2-D image A), . . . , Slice Q(2-D image A}, as shown in FIG. 15D.

In Step 3, parameters $IIA_{size}$ and $IIA_{str}$ are calculated in the Indices Quantification Unit 106 for each 2-D slice, resulting in a with set $IIA_{size}$ (Slice 1), $IIA_{size}$ (Slice 2), . . . , $IIA_{size}$ (SliceQ), and a set $IIA_{str}$ (Slice 1), $IIA_{str}$ (Slice 2), . . . $IIA_{str}$ (Slice Q) depicted in plots for "$IIA_{size}$ vs. Slice number", and "$IIA_{str}$ vs. Slice number" (shown in FIG. 15E).

In Step 4, parameters $IIA_{size}$ and $IIA_{str}$ of 2-D slices are averaged to result in $IIA_{size}$ and $IIA_{str}$ for 3-D image:

$IIA_{size}$ and $IIA_{str}$ for 3-D image:

$$IIA_{size}(3\text{-}D)=1/Q^*[IIA_{str}(\text{Slice}1)+IIA_{size}(\text{Slice} 2)+ \ldots +IIA_{size}(\text{Slice}Q)] \quad (\text{Eq. 23})$$

$$IIA_{str}(3\text{-}D)=1/Q^*[IIA_{str}(\text{Slice}1)+IIA_{str}(\text{Slice} 2)+ \ldots +IIA_{str}(\text{Slice}Q)] \quad (\text{Eq. 24})$$

In Step 5, Index of Complexity of Image Anisotropy (IACom) of 3-D image is computed:

$$IACom(3\text{-}D)=[IIA_{size}(3\text{-}D)^2+IIA_{str}(3\text{-}D)^2]^{1/2} \quad (\text{Eq. 25})$$

Figure 15E:
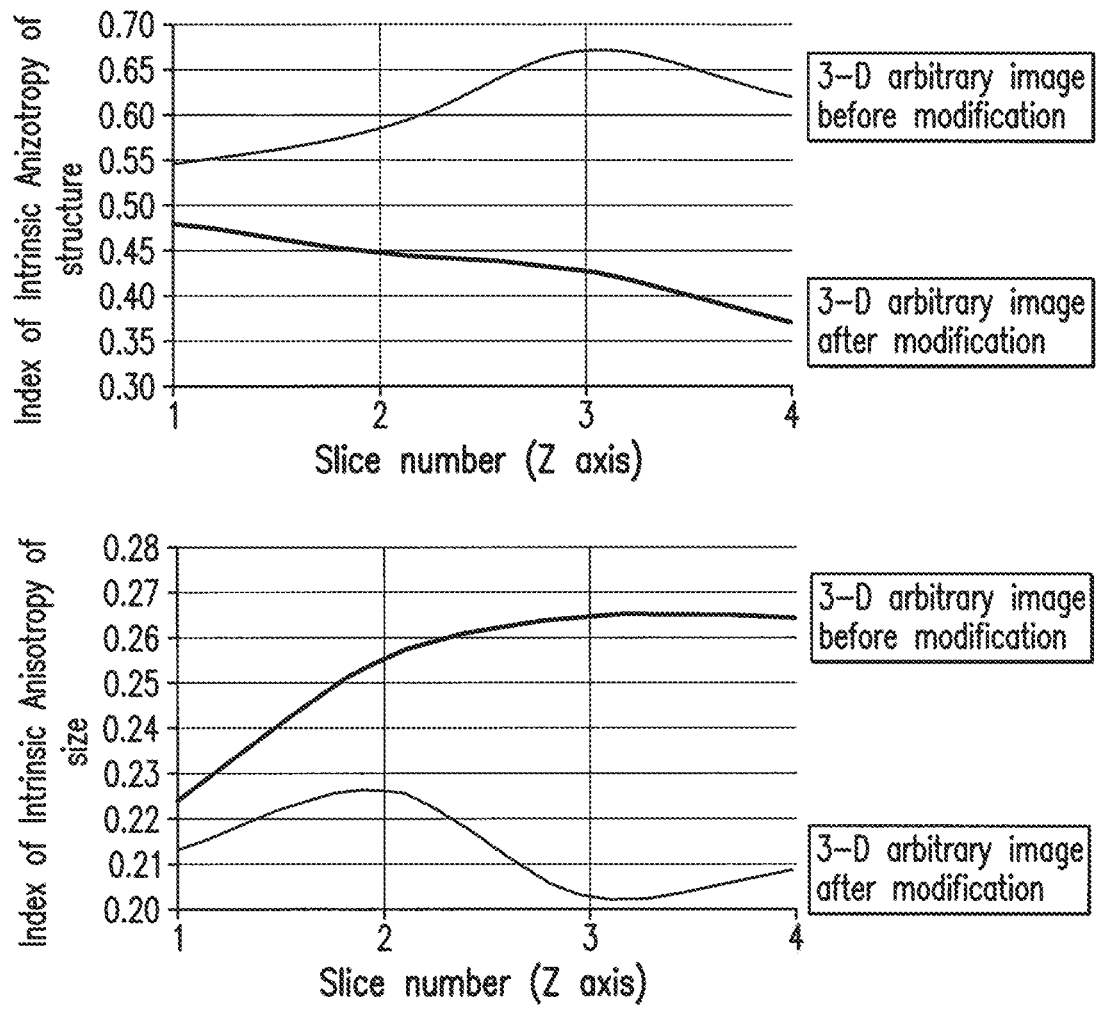

FIG. 15E depicts parameters $IIA_{size}$ (3-D), $IIA_{str}$ (3-D), and IACom (3-D) of 3-D images. These parameters can serve as tools for comparison of parameters of image complexity (Complexity of 3-D image after modification is higher than complexity of image before modification). It follows from Eqs. 23, 24 that the quantification of 3-D arbitrary images includes the routine of processing the set of 2-D arbitrary images. Thus, all results of processing of 2-D images in the present system are applicable for quantification of 3-D arbitrary images.

Figure 29A:
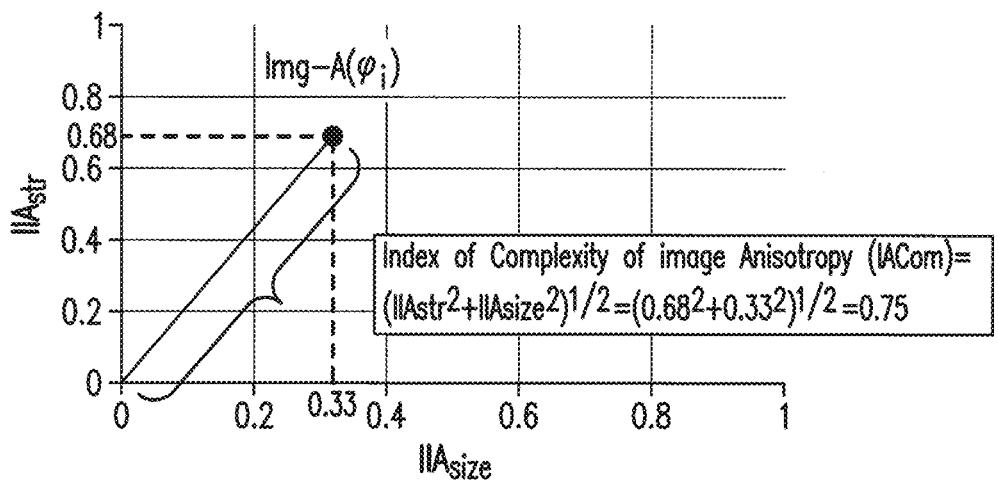
FIG. 29A is a diagram of "$IIA_{str}$ vs. $IIA_{size}$" showing the graph for the Index of Complexity of Image Anisotropy.
Figure 29B:
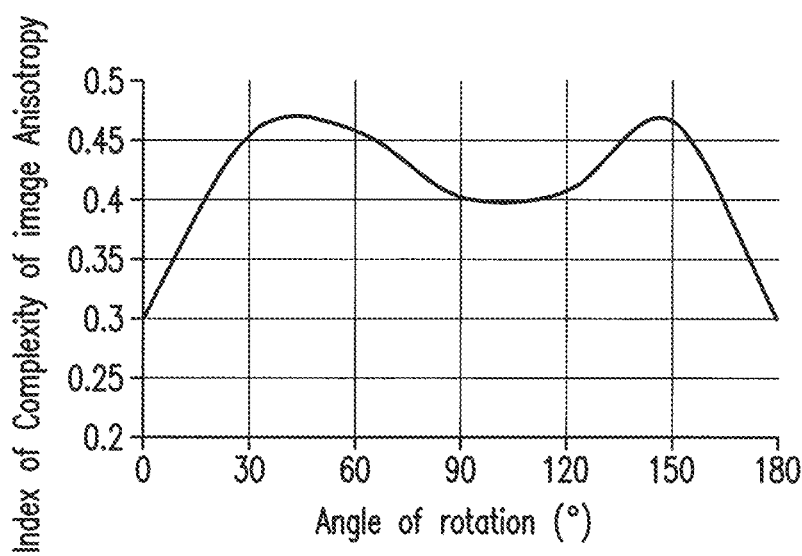
FIG. 29B is a diagram of the "Index of Complexity of Image Anisotropy vs. Angle of rotation"
Figure 29C:
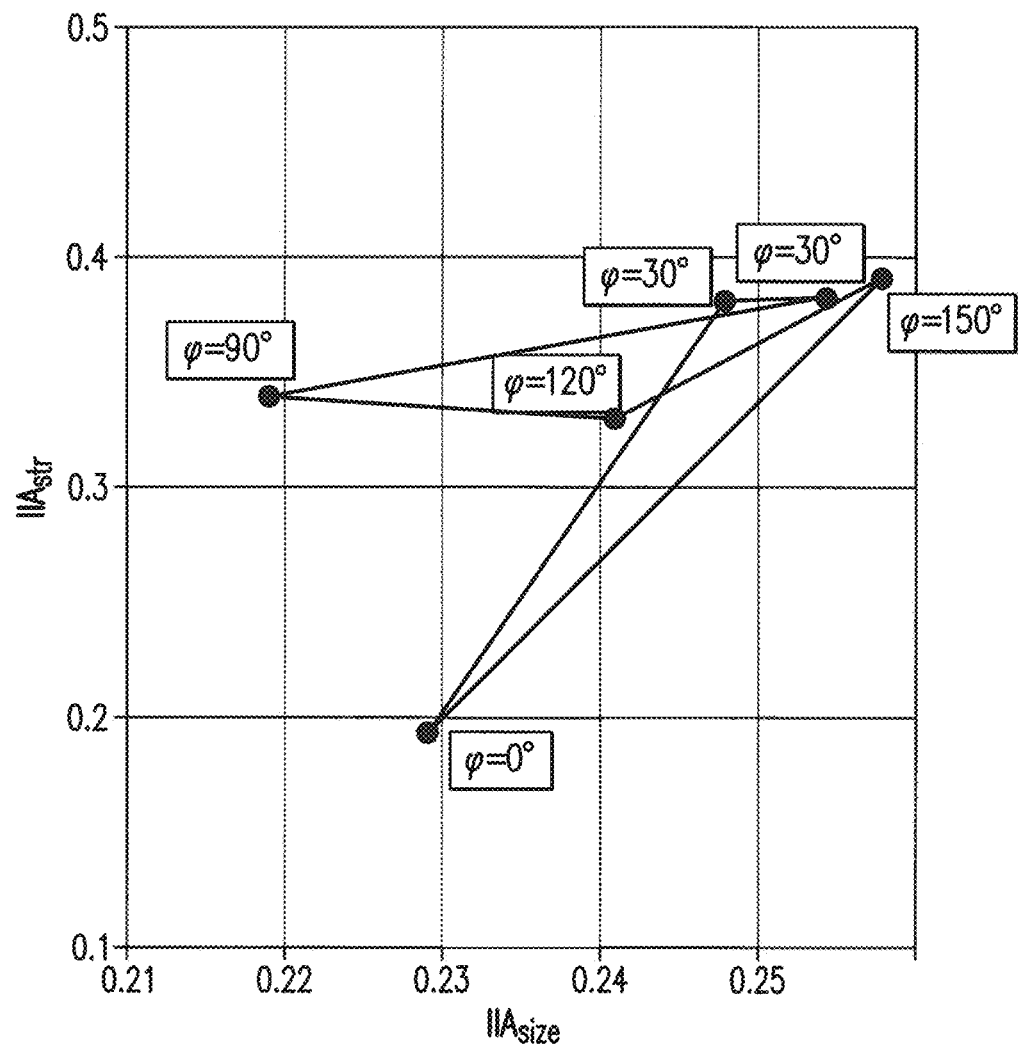
FIG. 29C is a diagram representative of the variability of $IIA_{str}$ and $IIA_{size}$ as the function of the rotation of image of the fingerprint (FIG. 12A) corresponding to diagrams of FIGS. 29A-29B.

FIGS. 29A-29C show the plot in the coordinates of $IIA_{str}$ Vs. $IIA_{size}$. FIG. 29A illustrates the notion of Index of Complexity of Image Anisotropy. FIG. 29B shows the variability of Index of Complexity of Image Anisotropy as the function of image rotation of fingerprint (as presented in FIG. 12A). FIG. 29C shows the position of the Index of Complexity of Image Anisotropy in the coordinate system of $IIA_{str}$. $IIA_{size}$.

Examples of Arbitrary 2-D Binary Images and their Indices of Intrinsic Anisotropy of Structure Substantial amount of data describing past and present state of the environment may be presented in the form of images of different electronic formats. Each image is the combination of contour lines of very complicated geometrical configuration. Examples of such images may include bathymetric maps of the bottom relief of the World Ocean with many contour lines, time series of meteorological maps describing the distribution of various atmosphere parameters on different heights, satellite images of the water color, where lines are the borders between areas of different colors, various topographical maps with many contour lines, nautical charts, and others. The subject method has been applied for the quantification of these categories of images.

Figure 18A:
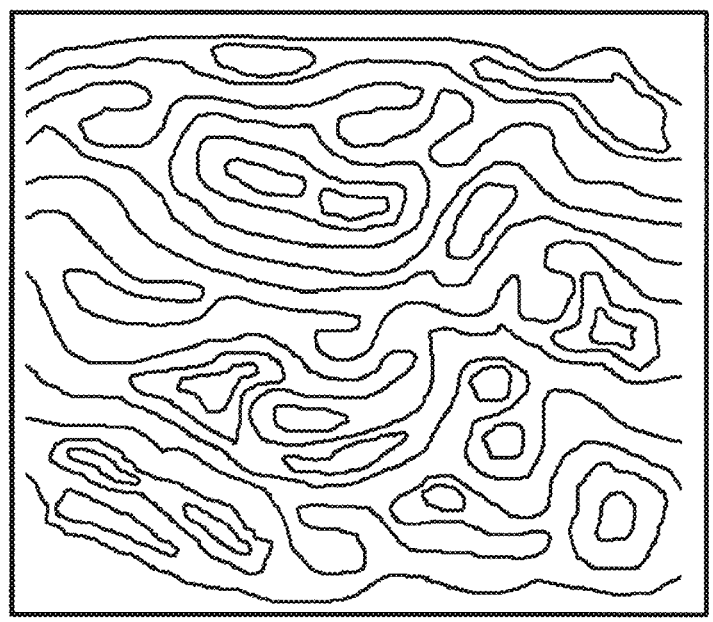
FIGS. 18A-18C are representative of a sketch of a contour chart (FIG. 18A) and the corresponding graphs of the $IIA_{str}$ vs number of transects (FIG. 18B), and $IIA_{str}$ vs Distance between transects (FIG. 18C)

Contour Map (FIG. 18A).

Figure 18B:
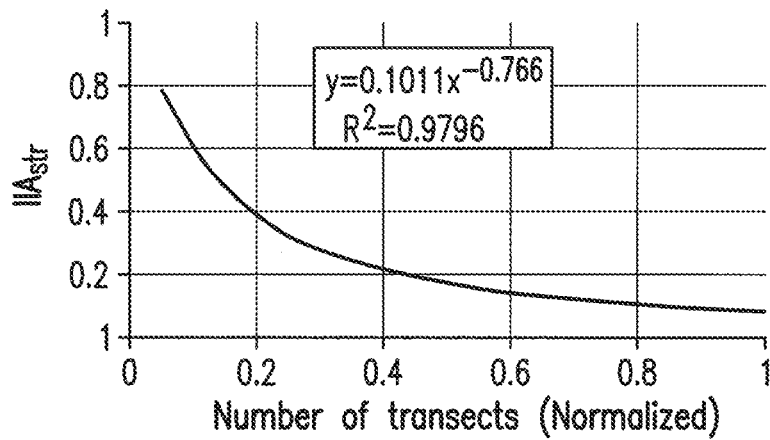

The image depicted in FIG. 18A may serve as the typical example of contour maps used in various disciplines. FIG. 18B shows the plot for "$IIA_{str}$ vs. Number of transects" constructed for the image depicted in FIG. 18A. Parameters of the plot are: $y=0.1011\ X^{-0.766}$, $R^2=0.9796$.

For many applications it is convenient to present the $IIA_{str}$ as a function of the relative distance between transects. Denoted by D(1–N) is the distance between the first and the last transects N used for the calculation of the $IIA_{str}$ of the image. In other words, the D(1–N) is the width of sampling area of the image.

If $N_j$ transects are used for calculation of the $IIA_{str}$, then the relative distance between transects is:

$$DR(N_j)=1/(N_j-1) \quad (\text{Eq. 26})$$

$$DR(N_j)=[D(1-N)/(N_j-1)]/D(1-N)=1/(N_j-1) \quad (\text{Eq. 27})$$

For example, if 5 transects are used for the $IIA_{str}$ calculation, then $DR(N_j)=0.25$, the distance between the nearby transects equals ¼ of the width of the sampling area.

Figure 18C:
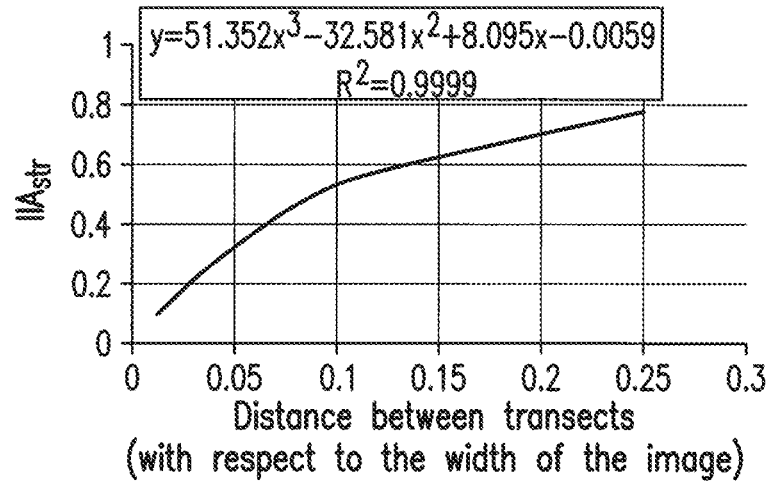

FIG. 18C shows the plot for "$IIA_{str}$ vs. Relative distance between transects". The cubic equation perfectly ($R^2=0.999$) describes the relationship between the $IIA_{str}$ and $DR(N_j)$, and may be used for the calculation of the area bounded by the function $y=51.352 \cdot X^3-32.581x^2+8.095x-0.0059$ and the X axis (as shown in FIG. 18C).

Figure 19A:
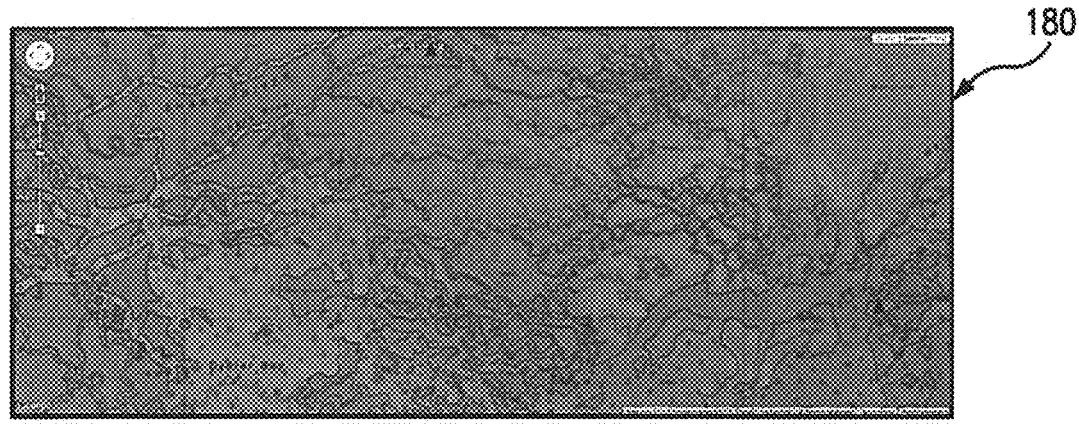
FIGS. 19A-19D are representative of the image of a shore line and its Index of Intrinsic Anisotropy of structure, where

Shore Line (FIG. 19A).

Figure 19B:
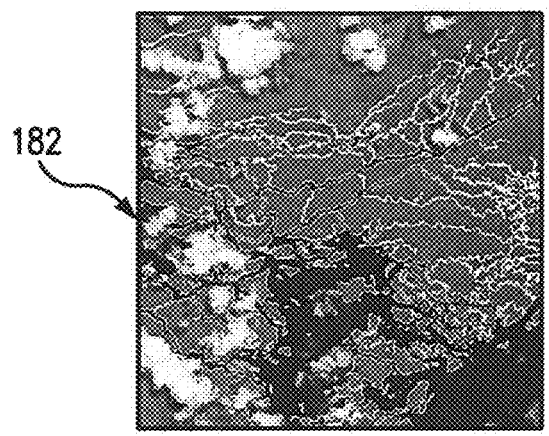

The image 180 depicted in FIG. 19A is the image (in color) of the shore line of the area of Florida downloaded from Google. FIG. 19B shows the image of shore line in grayscale format 182, and FIG. 19C shows the image 180 in the binary format 184.

It is seen in FIG. 19B that the shore line has a complicated structure. Thus the image 180 depicted in FIG. 19A serves as an example of the effectiveness of the application of the subject quantification of a structure of various categories of patterns formed in nature.

Figure 19C:
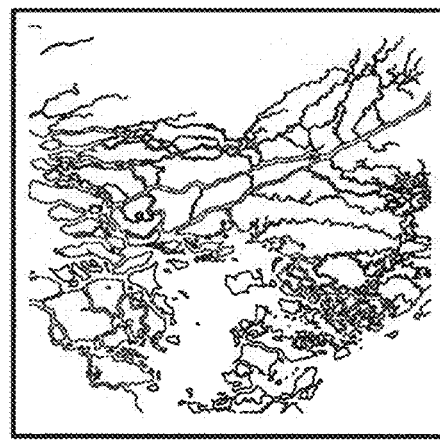
Figure 19D:
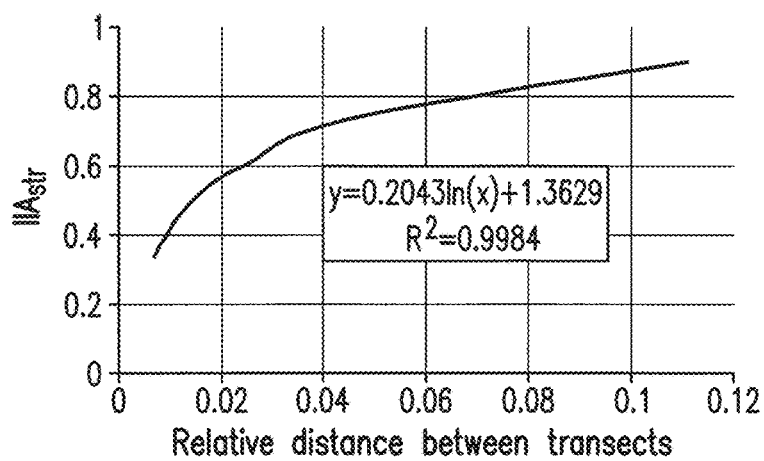

FIG. 19D shows the plot for "Index of Intrinsic Anisotropy of structure vs. Relative distance between transects" for the 2-D binary image 184 of the shore line (FIG. 19C).

The equation y=0.2043 ln(x)+1.3629 precisely describes the relationship between the $IIA_{str}$ and the Relative distance between transects, since the value for coefficient of determination $R^2$ is in close proximity to 1 ($R^2$=0.9984). Due to the fact that the $R^2$ value is close to 1, the equation y=0.2043 ln(x)+1.3629 provides sufficient accuracy in representing of the structure of the 2-D binary image 184 of shore line.

Figure 20A:
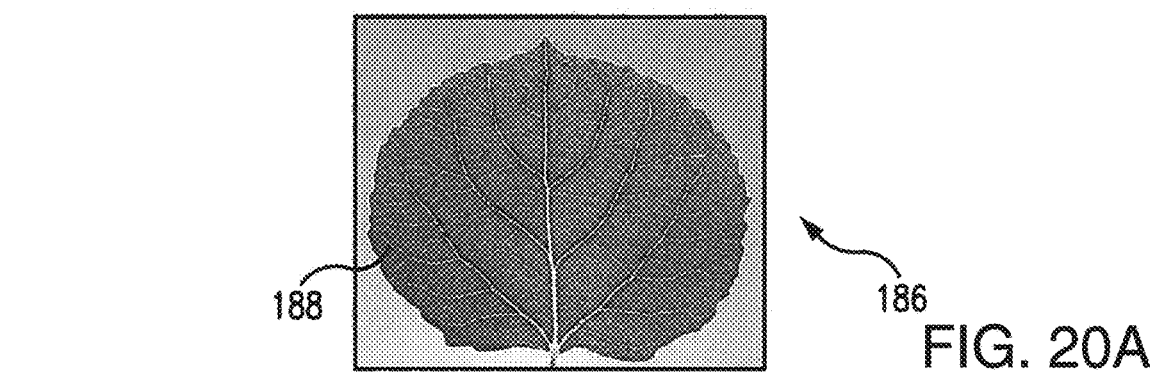
FIGS. 20A-20C are representative of the image of a leaf and the corresponding Index of Intrinsic Anisotropy of structure, where

A Leaf (FIG. 20A).

Another example of the application of the present method for the quantification of the structure of 2-D patterns formed in nature is the grayscale image 186 of the leaf 188 shown on FIG. 20A. The grayscale image 186 of the leaf 188 is converted into binary image 190 and is divided on Left and Right parts shown in FIG. 20B.

Results of processing of the Left and Right parts of the leaf indicate that a parabola function described by the equation $y=ax^2+bx+c$ perfectly reflects the relationship between the Index of Intrinsic Anisotropy of structure and the Number of transects of the Left and Right parts of the leaf, because $R^2$(Left)=0.9993, and $R^2$(Right)=0.9982.

Despite the fact that plot "$IIA_{str}$ vs. Number of transects" for the Left part of the leaf is somewhat similar to the plot "$IIA_{str}$ vs. Number of transects" of the Right part of the leaf, they are not identical. There is a difference between the $IIA_{str}$ (Left) and the $IIA_{str}$ (Right) identified by the subject method, and shown in FIG. 20C.

The structure of a leaf is somewhat similar to a structure of the blood and nerve systems of humans, and thus the subject method is envisioned also for application in quantification of the blood and nerve systems of patients for medical purposes.

Figure 21A:
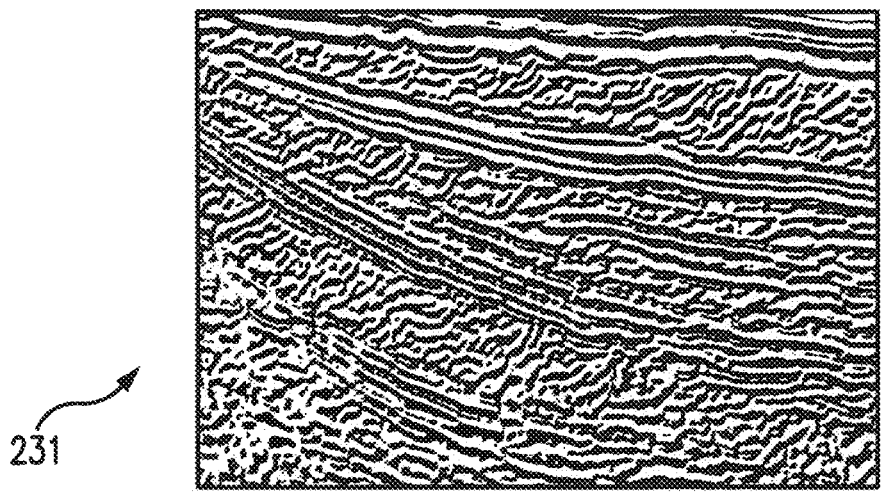
FIGS. 21A-21C are representative of the image of the seismic profile and corresponding Index of Intrinsic Anisotropy of structure, where

Seismic Profile (FIG. 21A).

Another area of the application of the present technique is the processing of seismic profiles. Seismic profiles are the source of information about the subsurface structure of the Earth and are broadly used for gas and oil exploration.

Figure 21B:
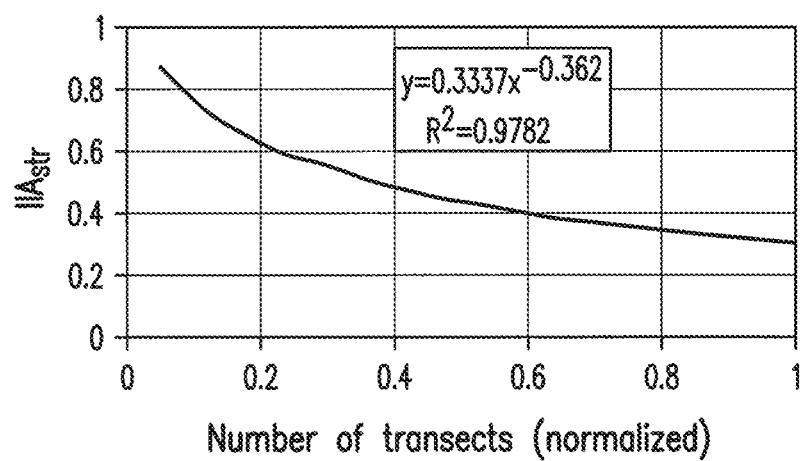
Figure 21C:
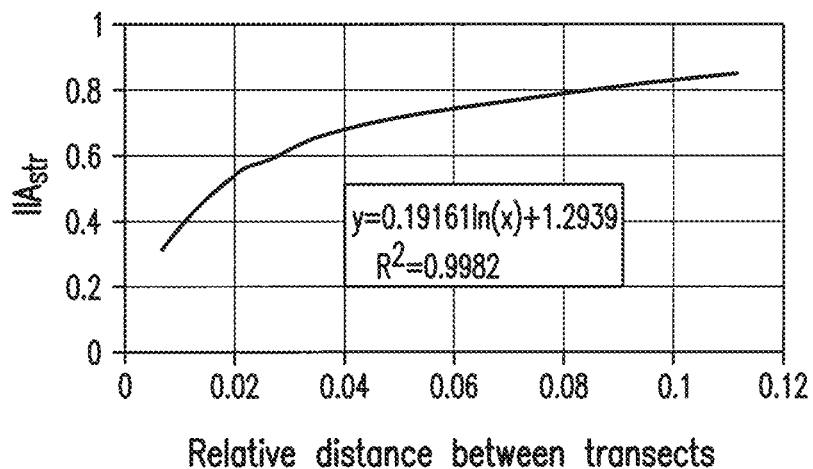

Results of processing of the image 192 of a seismic profile are depicted in FIGS. 21B-21C. A plot for "$IIA_{str}$ vs. Number of transects" shown in FIG. 21B is approximated by the function $y=0.3337 \cdot X^{-0.362}$. Another plot for "$IIA_{str}$ vs. Relative distance between transects," shown in FIG. 21C, is approximated by the function y=0.0.19161 ln(x)+1.2939. These plots have high value of $R^2$ that indicates that the analytical equations describe the $IIA_{str}$ of the seismic image with high accuracy.

Figure 23:
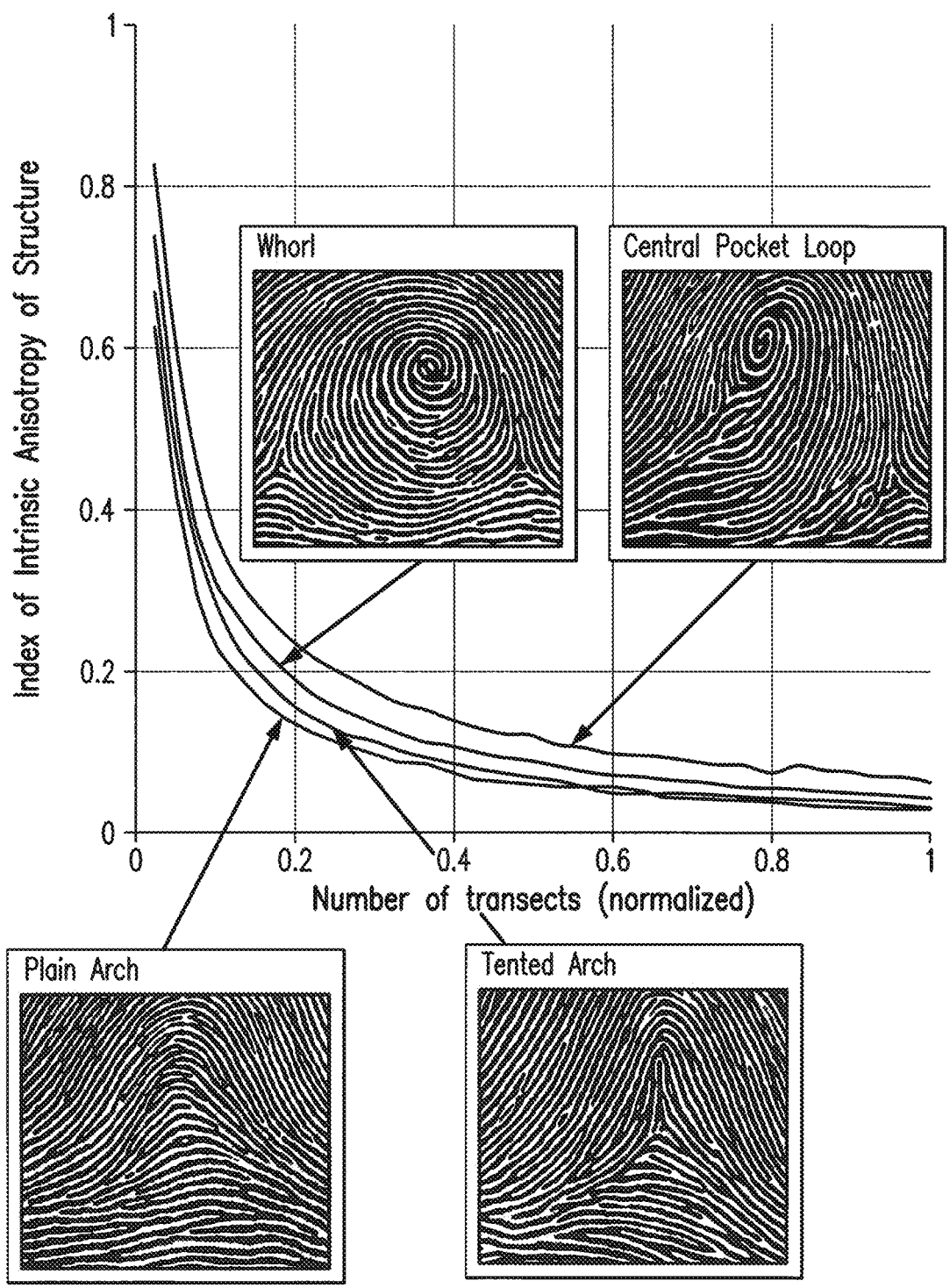
FIG. 23 is representative of an $IIA_{str}$ for four categories of fingerprints.
Figure 24A:
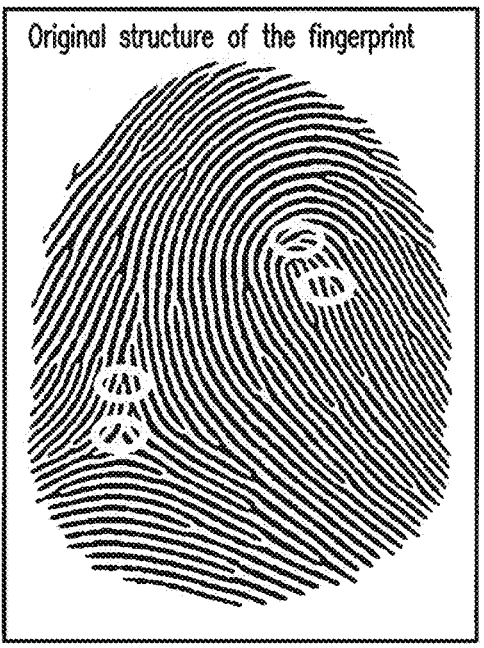
FIGS. 24A-24E are representative of a sensitivity of an Index of Intrinsic Anisotropy of structure of the fingerprints due to minor structural changes, where
Figure 24B:
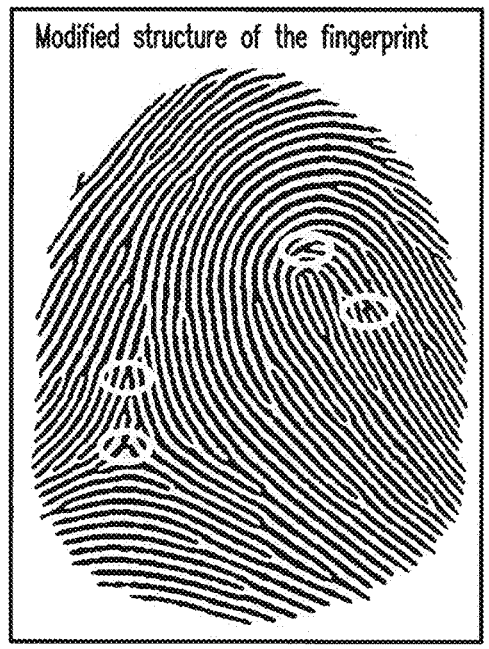

Fingerprints (FIGS. 23 and 24A-24B).

The effectiveness of the parameter $IIA_{str}$ as a quantification characteristic of an image was examined for distinguishing fingerprints with significant difference in ridge structure. FIG. 23 shows fingerprints of four categories of ridges structure and the plot of "$IIA_{str}$ vs. Number of transects (normalized)". It is clear from FIG. 23 that $IIA_{str}$ of four fingerprints differ from each other.

Plain Arch fingerprint has the simplest structure and minimal value of $IIA_{str}$. Central Pocket Loop fingerprint has the most complicated structure and the highest value of $IIA_{str}$. Thus, $IIA_{str}$ could be used for constructing similarity metric of fingerprints. This statement is also supported by the high level of sensitivity of $IIA_{str}$ to minor changes of 2-D image structure and, in particular, the fingerprint structure.

Figure 24C:
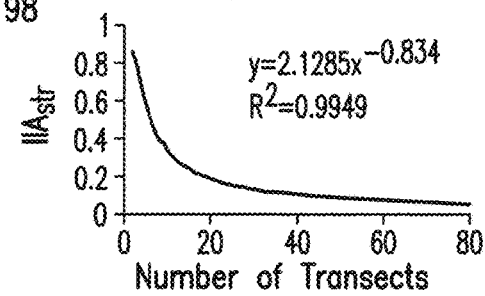
Figure 24D:
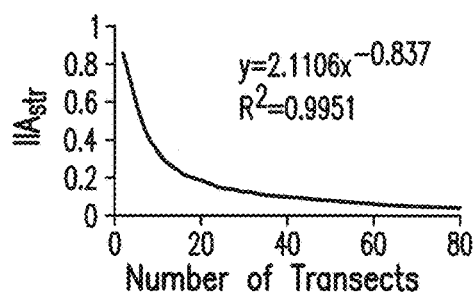
Figure 24E:
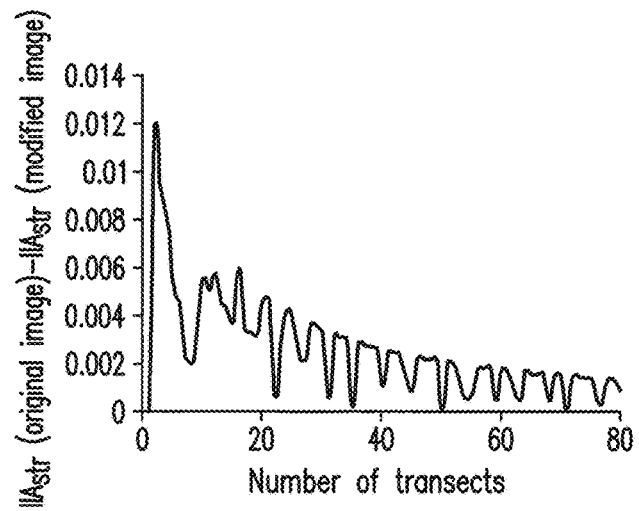

FIGS. 24A-24B depict two fingerprints 198, 200 which have minor changes in structure indicated by ellipses. FIG. 24C shows Plot-1, i.e., the plot for "$IIA_{str}$ vs. Number of transects" for original fingerprint 198, and FIG. 24D shows Plot-2, i.e., the plot for "$IIA_{str}$ vs. Number of transects" for the modified fingerprint 200. Even though Plot-1 looks similar to Plot-2, nevertheless these plots are not identical. FIG. 24E illustrates the chart corresponding to the abs (Plot-1-Plot-2) providing evidence that $IIA_{str}$ is sensitive even to minor changes of fingerprint structure. This feature of the parameter $IIA_{str}$ is essential for image comparison, because structural minutiae are very important for fingerprint identification.

C. Index of Intrinsic Anisotropy of Structure of 2-D Grayscale Medical Images

Figure 22A:
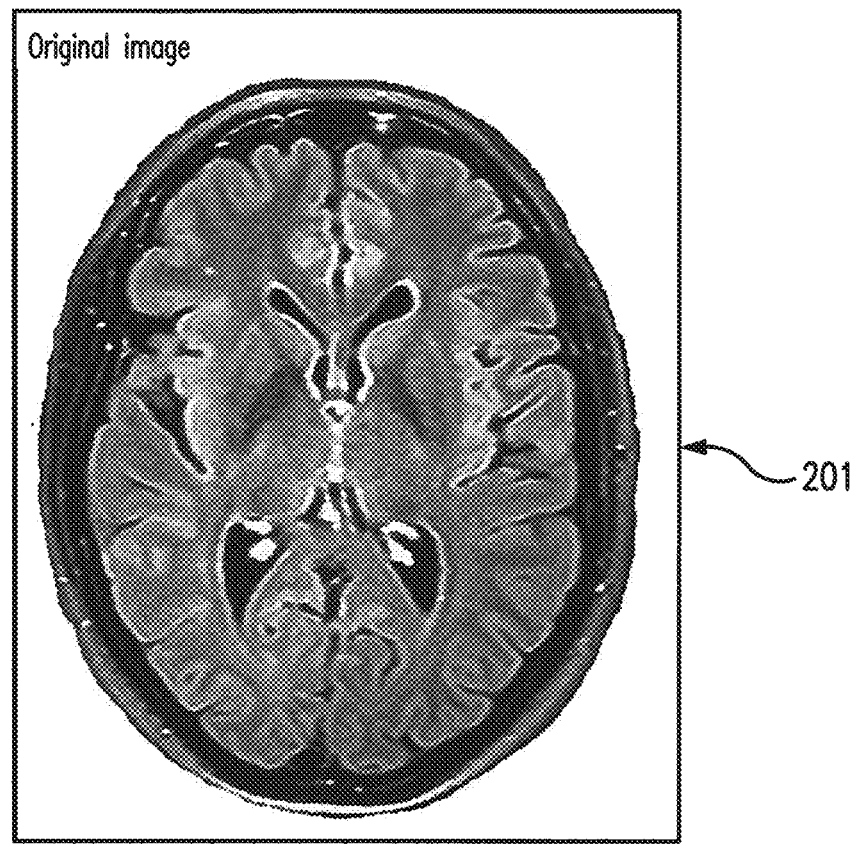
FIGS. 22A-22S are representative of a grayscale MRI image and corresponding Index of Intrinsic Anisotropy of structure, where
Figure 22B:
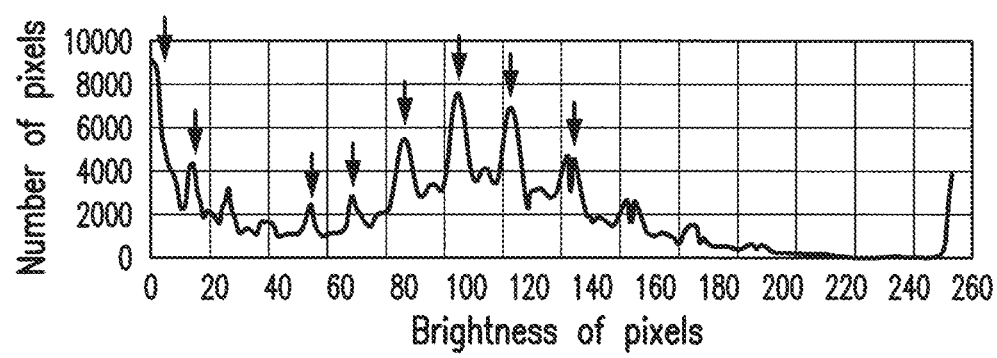
FIG. 22B is a Histogram of the MRI image under study.
Figure 22C:
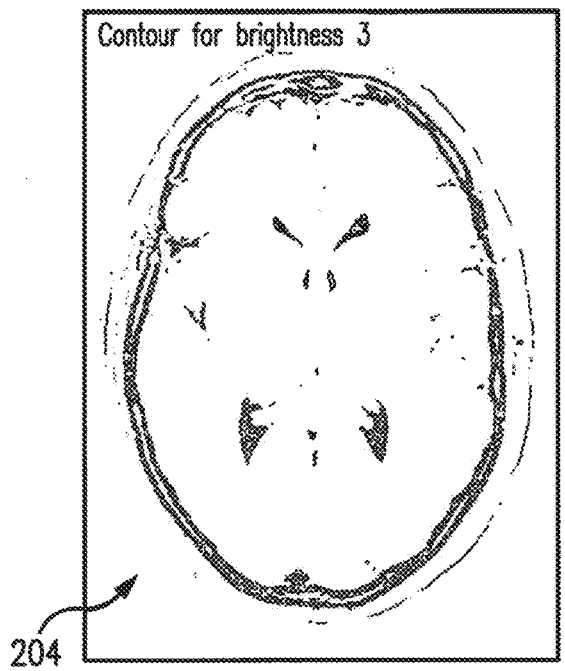
FIG. 22C is the binary MRI image with the contour for brightness 3.
Figure 22D:
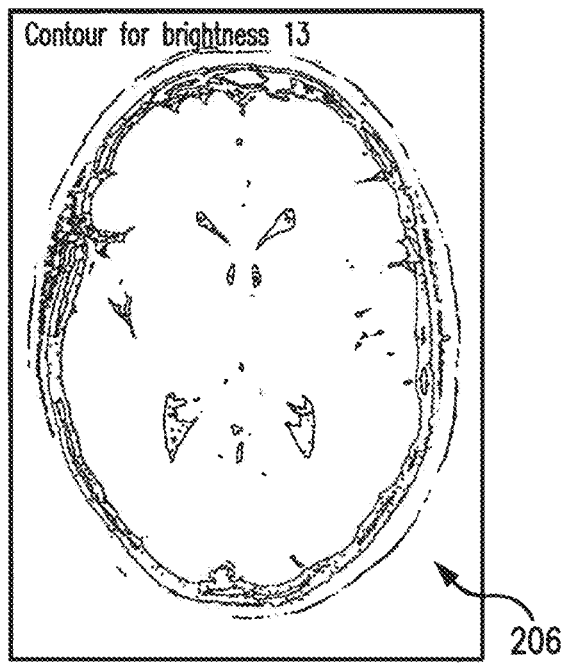
FIG. 22D is the binary MRI image with the contour for brightness 13.
Figure 22E:
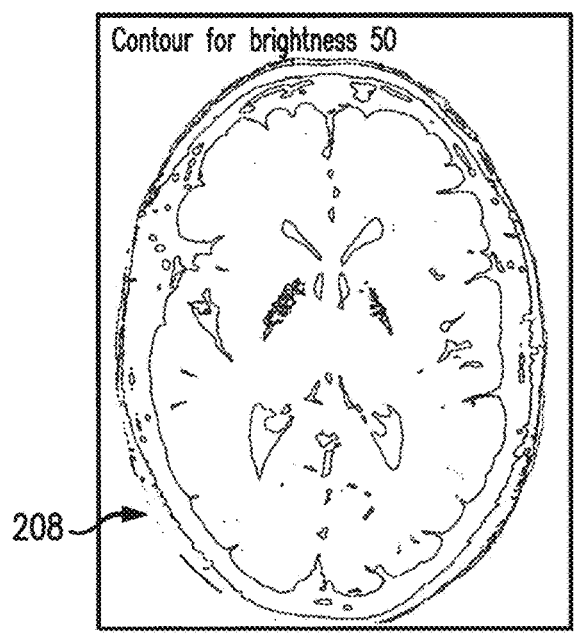
FIG. 22E is the binary MRI image with the contour for brightness 50.
Figure 22F:
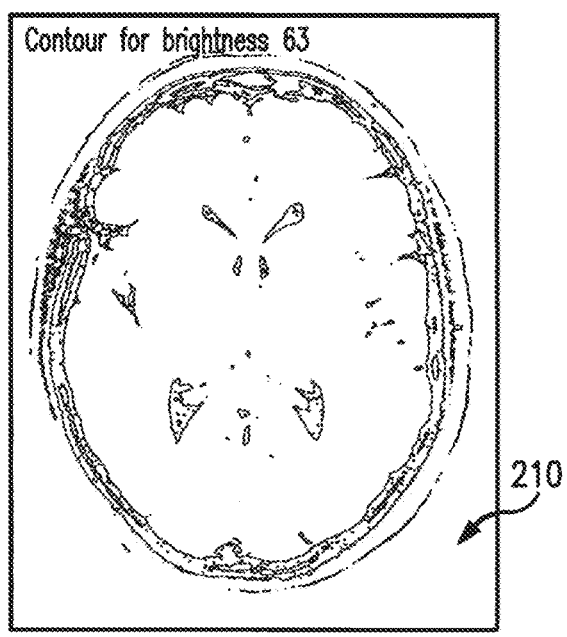
FIG. 22F is the binary MRI image with the contour for brightness 63.
Figure 22G:
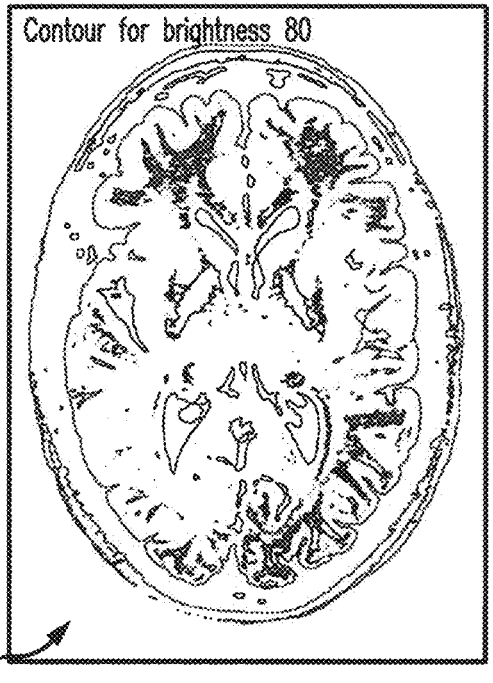
FIG. 22G is the binary MRI image with the contour for brightness 80.
Figure 22H:
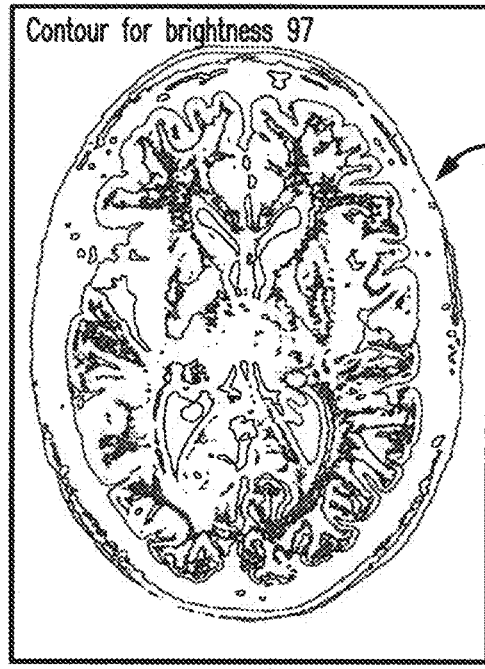
FIG. 22H is the binary MRI image with the contour for brightness 97.
Figure 22I:
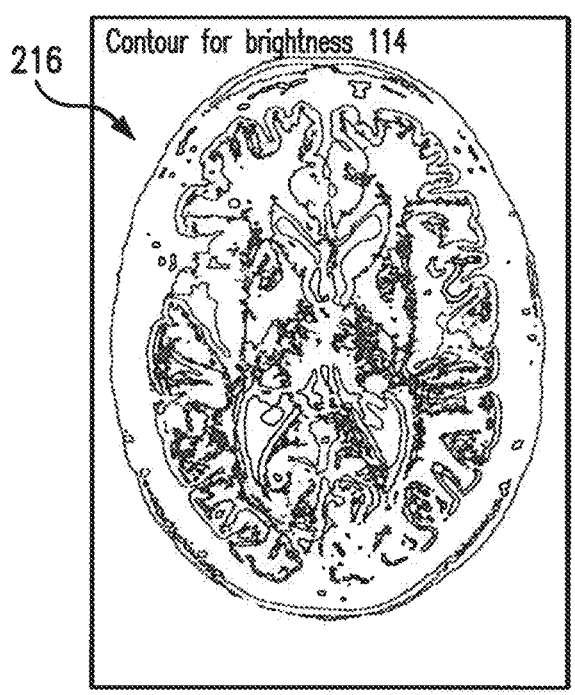
FIG. 22I is the binary MRI image with the contour for brightness 114.
Figure 22J:
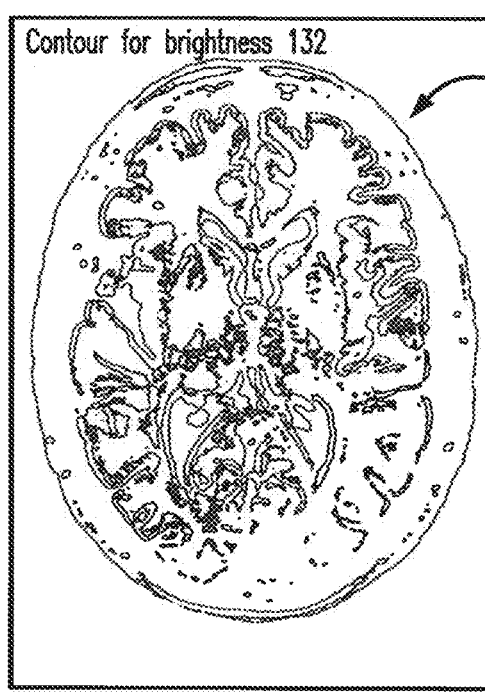
FIG. 22J is the binary MRI image with the contour for brightness 132.
Figure 22K:
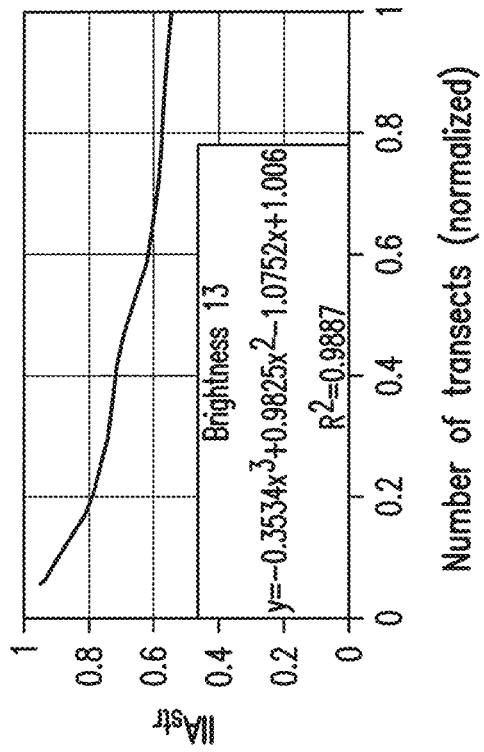
FIGS. 22K-22R are plots for the "$IIA_{str}$ vs Number of transects" for images shown in FIGS. 22C-22J, respectively.
Figure 22L:
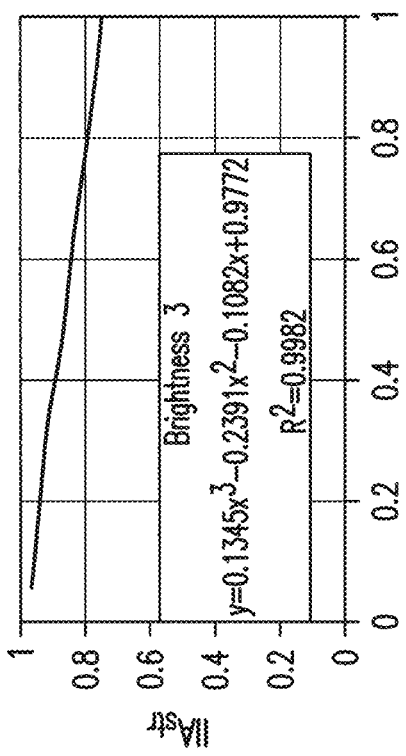
Figure 22M:
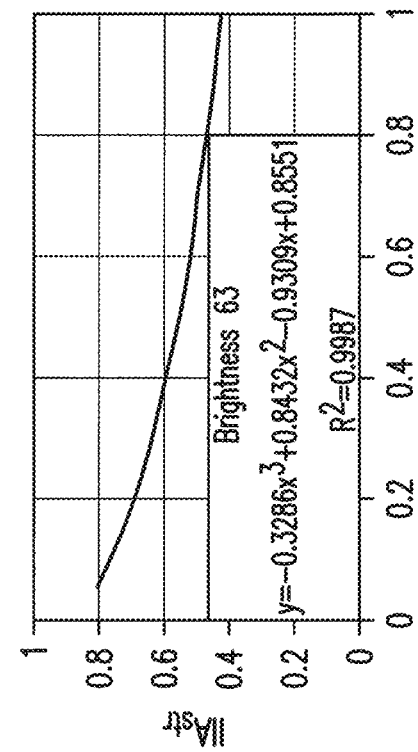
Figure 22N:
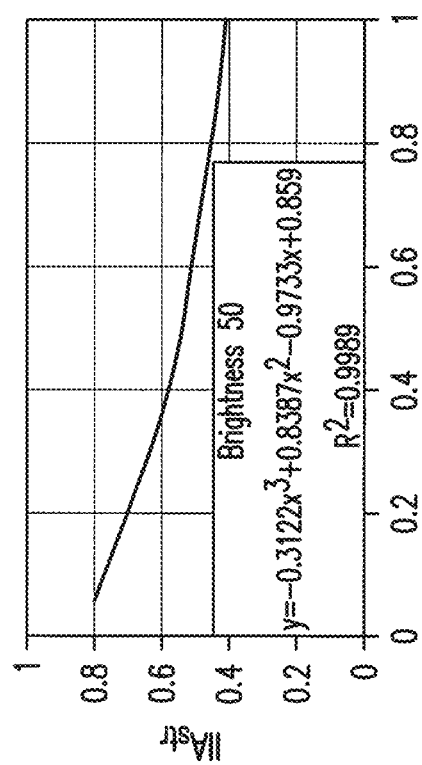
Figure 22O:
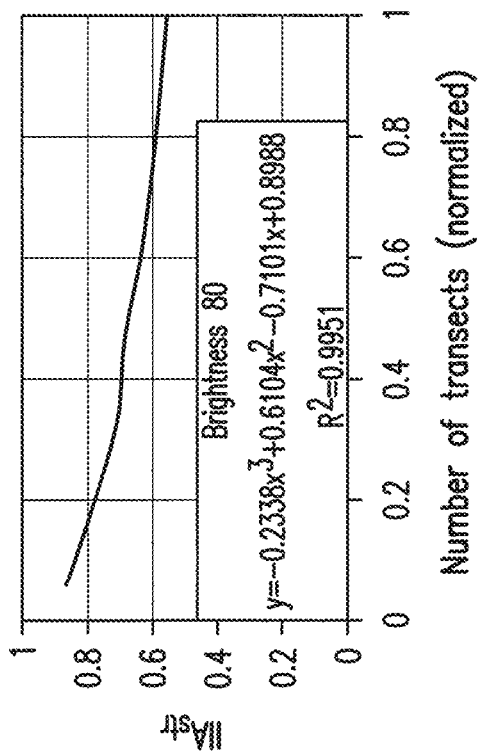
Figure 22P:
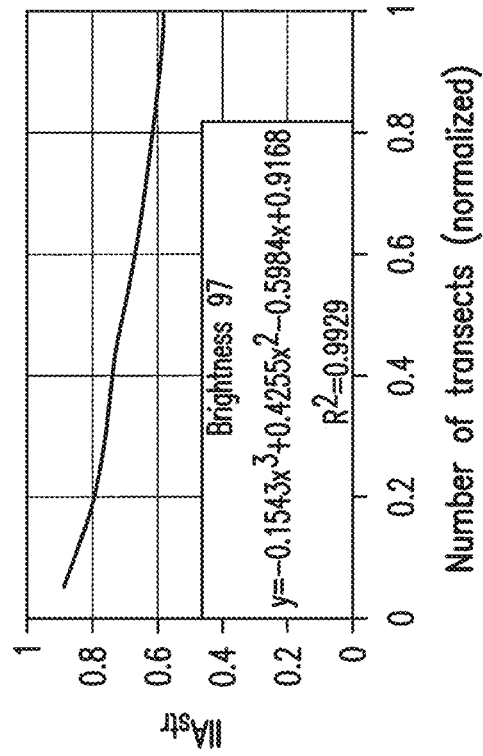
Figure 22Q:
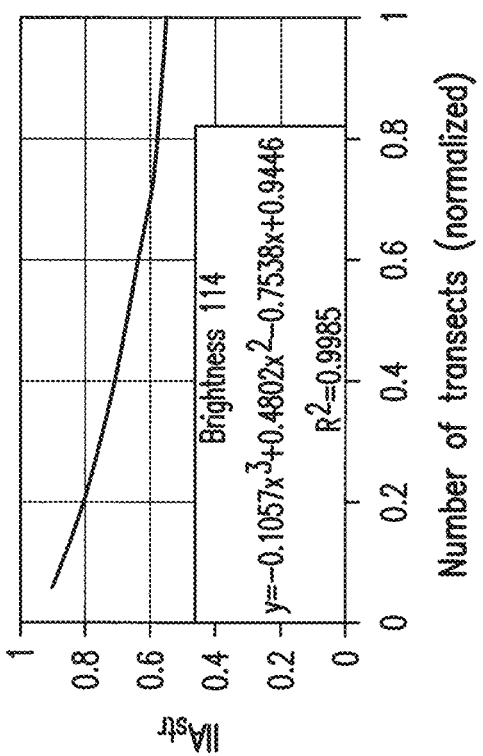
Figure 22R:
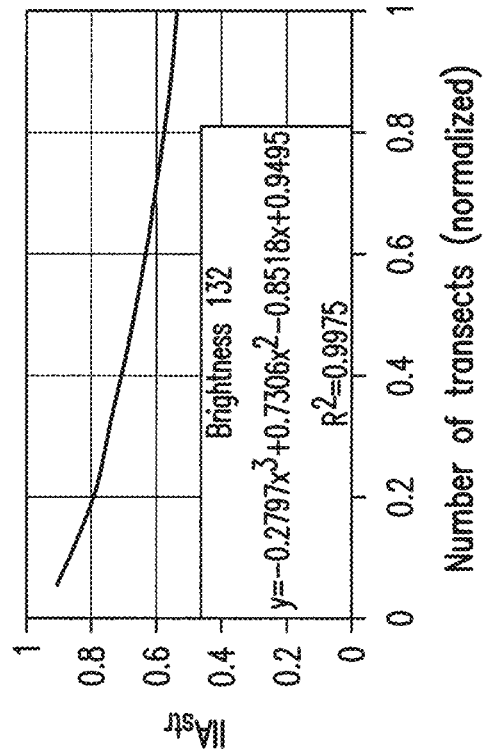

Referring to FIG. 22A, the subject procedure of the quantification of a structure of 2-D arbitrary grayscale images was applied to an MRI image 201. The starting point of the procedure underlying the operation of the processing unit 114 (shown in FIGS. 5-6 and 22T) is an MRI image 201 in the raster format. The procedure is carried out in the processing unit 114 in accordance with the procedure depicted in FIG. 22T through the following steps:

Step 1. Initial grayscale image (ImGr) in the raster format (shown in FIG. 22A) is converted into an ASCII file in the Comma Separate Value (CSV) format in accordance with the technique presented in '578 Patent. The ASCII file includes data on the brightness of pixels in the ImGr image 201. The brightness of a black pixel is 0, the brightness of a white pixel equals 255. The brightness of the pixels in range 1-254 represents different shades of gray.

Step 2. Subsequently, the histogram 202 (shown in FIG. 22B) of a grayscale image ImGr is calculated (in accordance with the technique presented in M. Freeman, "The Digital SLR Handbook", Ilex, 2005, ISBN 1-904705-36-7). The X axis of the histogram 202 represents the variation of the brightness of the pixels. The Y axis of the histogram 202 represents the number of pixels in particular brightness.

Step 3. Subsequently, the initial grayscale image 101 (ImGr) is converted into the set of 256 binary images 204-218, i.e., ImB; ImGr={ImB1, ImB2, . . . , ImBi, . . . , ImB256}. Each binary image 204-218 (ImBi) is displayed as a contour plot of areas of ImGr consisting of pixels with brightness equal i.

Various commercially available programs for example, (MATLAB, Corel Draw), as well as software for processing biomedical images, for instance ImageJ (as presented in K. W. Eliceiri, et al., "Biological Imaging Software Tools", Nature Method 9, 2012, 697-710), may be used for contouring images of different categories.

FIGS. 22C-22J depict results of contouring of areas with brightness equal to 3 (FIG. 22C), 13 (FIG. 22D), 50 (FIG. 22E), 63 (FIG. 22F), 80 (FIG. 22G), 97 (FIG. 22H), 114 (FIG. 22I), and 132 (FIG. 22J), respectively. The contouring values represent local maxima values derived from the histogram 202 of FIG. 22B. The arrows depicted on the histogram 202 indicate the local maxima used for the MRI image contouring.

Step 4. The method of quantification of layered patterns with anisotropic structure (described in '578 Patent) is applied with the purpose of constructing N-partite graphs for different number of transects for each version of the binary image 204-218 (ImB1, ImB2, . . . , ImBi, . . . , ImB256).

Step 5. The plot "$IIA_{str}$ vs. Number of transects (normalized)" (Pli) is constructed for each binary image ImBi, i=1, 256 according to (Eq. 3).

Step 6. The plot Pli, i=1,256 is approximated by the function y=f(X) with the highest value of $R^2$. For binary images shown in FIGS. 22C-22J, the parameter $R^2$ is varied from 0.9887 to 0.9989 for the cubic approximation function $y=A \cdot X^3 + B \cdot X^2 + C \cdot X + D$.

Step 7. Eq. 4 is used to calculate the Index of Intrinsic Anisotropy for each binary image 104-118 (IBi, i=1, . . . , 256).

The $IIA_{str}$ of the grayscale image 101 thus consists of 256 components:

$$IIA_{str}(ImGr)=\{IIA_{str}(ImB1), IIA_{str}(ImB2), \ldots, IIA_{str}(ImBi), \ldots, IIA_{str}(ImB256)\}. \quad \text{(Eq. 28)}$$

Step 8. The $IIA_{str}$ of the 2-D grayscale arbitrary image 101 is calculated by averaging the $IIA_{str}$ (ImBi), i=1, . . . , 256, resulting in $$IIA_{str}(ImGr)=(1/256)*\Sigma(IIA_{str}(ImBi), i=1, \ldots, 256.$$

The results of calculations of $y=Ax^3+Bx^2+Cx+D$, R2, and the Index of Intrinsic Anisotropy of Structure for binary MRI images presented in FIGS. 22C-22J and FIGS. 22K-22R are as follows:

Brightness 3: $y=0.1345 \ x^3-0.2391x^2-0.1082x+0.9772$; $R^2=0.9982$; $IIA_{str}=0.81821$
Brightness 13: $y=-0.3534x^3+0.9825x^2-1.0752x+1.006$; $R^2=0.9887$; $IIA_{str}=0.64868$
Brightness 50: $y=-0.3122x^3+0.8387x^2-0.9733x+0.859$; $R^2=0.9989$; $IIA_{str}=0.52345$
Brightness 63: $y=-0.3286x^3+0.8432x^2-0.9309x+0.8551$; $R^2=0.9987$; $IIA_{str}=0.53855$
Brightness 80: $y=-0.2338x^3+0.6104x^2-0.7101x+0.8988$; $R^2=0.9951$; $IIA_{str}=0.63573$
Brightness 97: $y=-0.1543x^3+0.4255x^2-0.5984x+0.9168$; $R^2=0.9929$; $IIA_{str}=0.66654$
Brightness 114: $y=-0.1057x^3+0.4802x^2-0.7538x+0.9446$; $R^2=0.9985$; $IIA_{str}=0.64563$
Brightness 132: $y=-0.2797x^3+0.7306x^2-0.8518x+0.9495$; $R^2=0.9975$; $IIA_{str}=0.64136$ The Index of Intrinsic Anisotropy of structure for the grayscale MRI image 101 (FIG. 22A) based on 8 grayscale binary images 104-118 (FIGS. 22C-22J) equals:

$$(0.81821+0.64868+0.52345+0.53855+0.63573+ \\ 0.6654+0.64563+0.64136)/8=0.6398 \quad \text{(Eq. 29)}$$

Figure 22S:
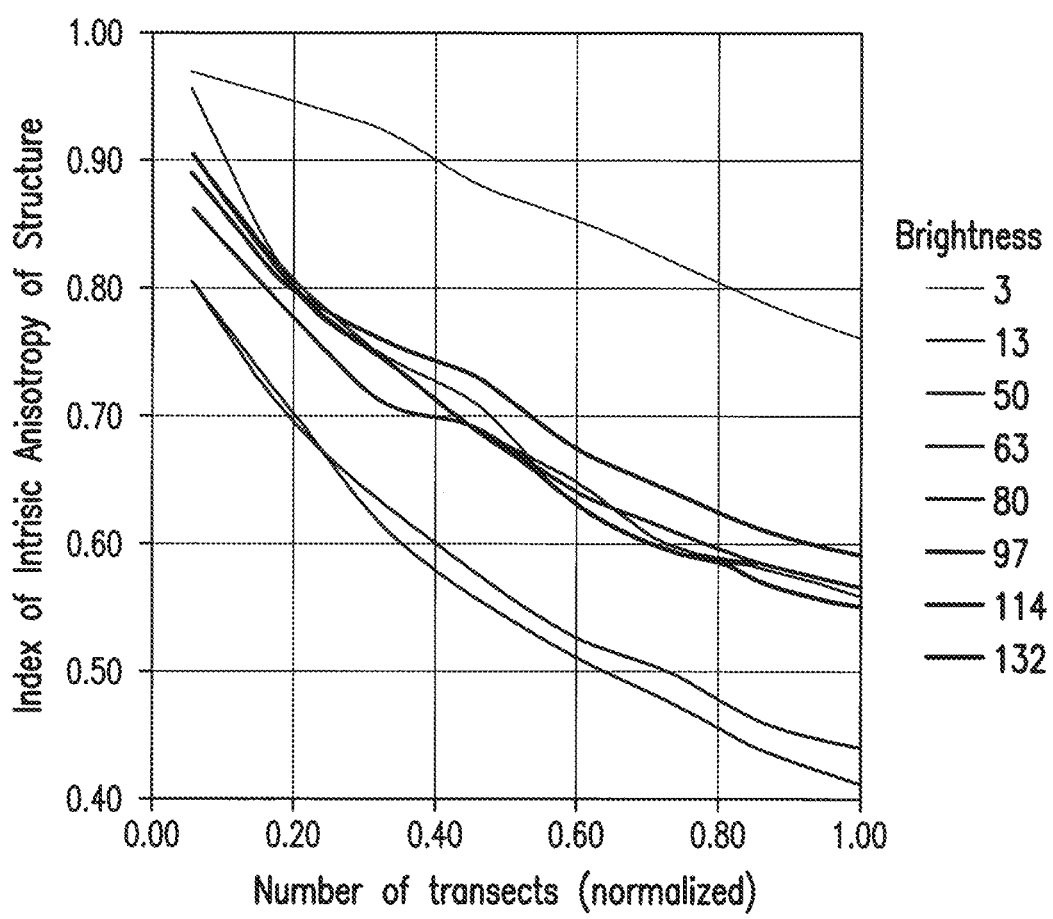
Figure 22T:
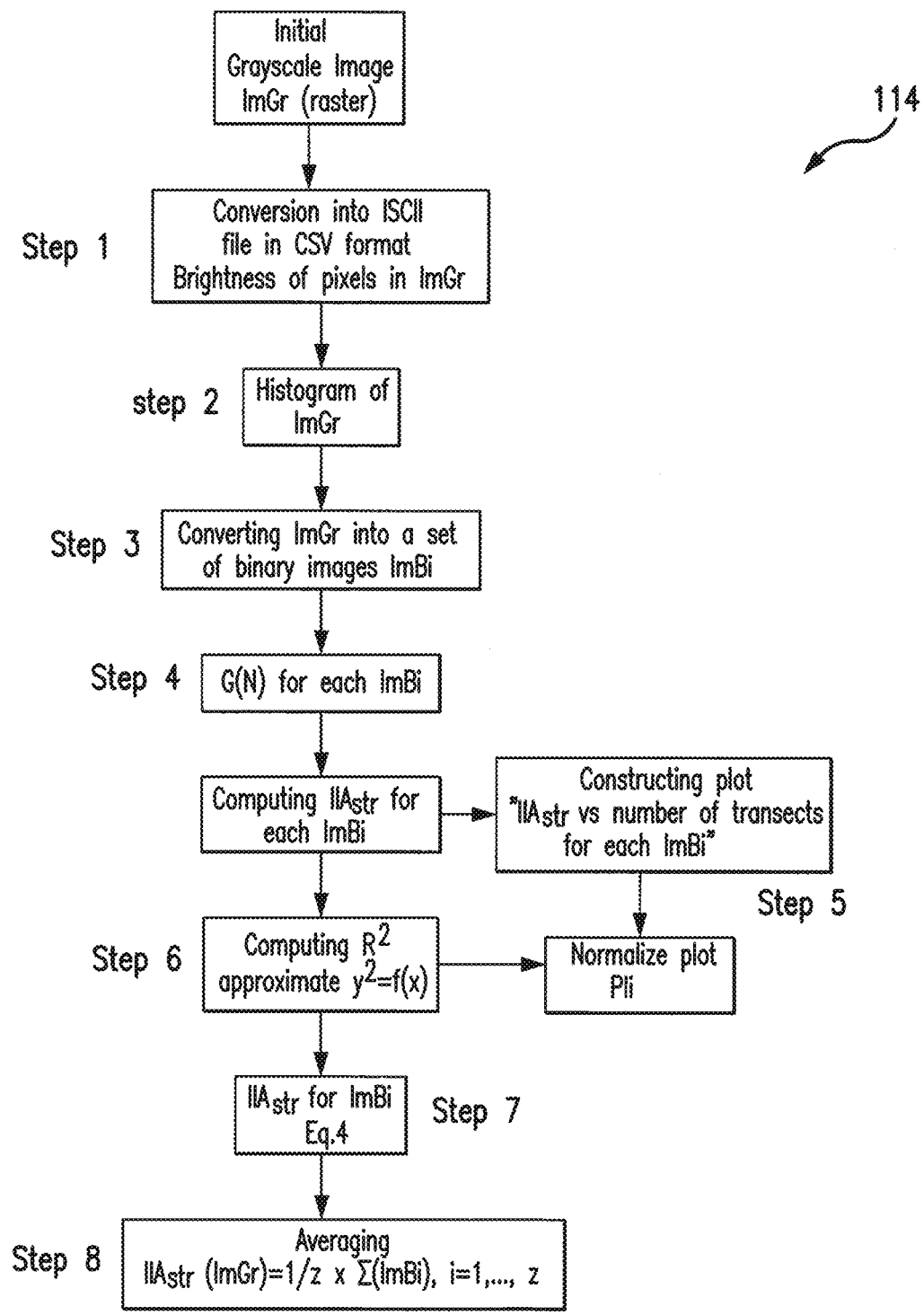
FIG. 22T is a flow chart diagram representative of the procedure for parameterization of the grayscale image of FIG. 22A.

FIG. 22S visualizes structural differences between binary MRI images 204-218 depicted in FIGS. 22C-22J. The structure of these differences is the source of information for the comparison time-series of MRI images.

For instance, it is possible to make the MRI image have more contrast based on the similarity of Indices of Intrinsic Anisotropy of structure of eight binary images (FIG. 22S). Binary images with brightness 50 and 63 have similar $IIA_{str}$, thus all pixels with brightness between 50 and 63 could be substituted with an average brightness (50+63)/2=56. The same approach is applicable for the set of MRI binary images constructed for brightness 80, 97, 114, and 132 (FIGS. 22G-22J).

D. Image Reconstruction of 2-D Binary Layered and Arbitrary Images from their Models A model of an image, for example, of a fingerprint can be presented in the form of N-partite graph G(N) and table F(M,N) (which comprises XY coordinates of points (pixels) of intersection of ridges of fingerprints with transects $T_1, \ldots, T_j, \ldots, T_N$). The procedure (shown in FIG. 25) is supported by the operation of the Reconstruction Unit 118 (shown in FIGS. 5-6) and permits visual examination and quantitative examination of adequacy of the model {G(N), F(M,N)} to structure and size of original image. The reconstruction routine includes the steps of: Step 1. The starting point of the image reconstruction is the N-partite graph G(N) and the table $F_{M,N}$ (comprised of XY coordinates of vertices situated along transects $T_1, \ldots, T_j, \ldots, T_N$, as presented in '578 Patent). Graph G(N) describes the connectivity of a fingerprint edges situated between transects $T_j$ and $T_j+1$, j=1, . . . , N.

Step 2. Vertex $q_f$ located on the transect $T_j$ is connected with vertex $p_k$ located on transect $T_1$, if only two vertices $q_f$ and $p_k$ belong to the same segment of the pattern situated between $T_j$ and $T_{j+1}$. Step 2 is repeated while k<M.

Step 3. Vertex $q_f$ located on the transect $T_j$ is connected with vertex $q_{f+1}$ located on $T_j$ if $q_f$ and $q_{f+1}$ belong to the same segment of the pattern situated between $T_j$ and $T_{j+1}$. Step 3 is repeated while f<M.

Step 4. Vertex $p_k$ located on the transect $T_{j+1}$ is connected with vertex $p_{k+1}$ located on the transect $T_{j+1}$ if $p_k$ and $p_{k+1}$ belong to the same segment of the pattern situated between $T_j$ and $T_{j+1}$. Step 4 is repeated while k<M.

Step 5. Steps 2-4 are repeated for the bi-partite graphs $G(T_1, T_2), \ldots, G(T_j, T_{j+1}), \ldots, G(T_{N-1} T_N)$, while j<N-1 results in the set of binary matrices $BM(T_1, T_2), \ldots, BM(T_j, T_{j+1}), \ldots, BM(T_{N-1}, T_N)$ which described connections of vertices located on $T_j$ and $T_{j+1}$.

Step 6. The model (in Excel) is drawn for visualization of the N-partite graph, i.e. visualization of the pattern which is output to the output system 122. The table $F_{M,N}$ is used to draw vertices and $BM(T_1, T_2), \ldots, BM(T_j, T_{j+1}), \ldots, BM(T_{N-1}, T_N)$ are used to draw edges.

Figure 26A:
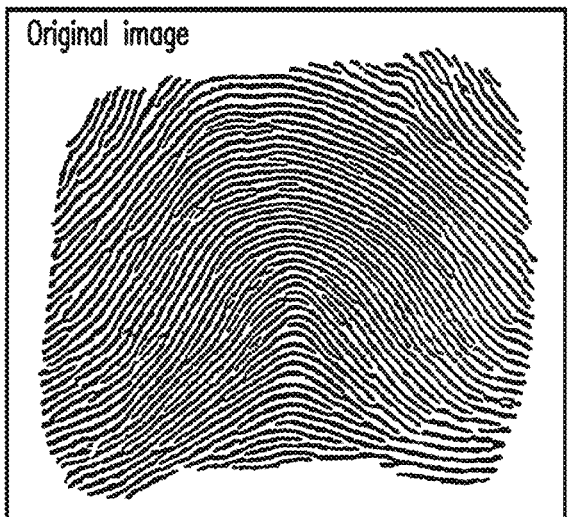
FIGS. 26A-26D are representative of the reconstruction technique of the image of a fingerprint from its model, where
Figure 26B:
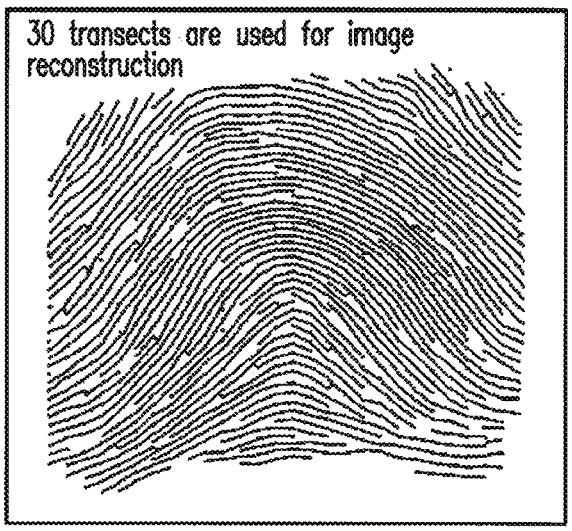
Figure 26C:
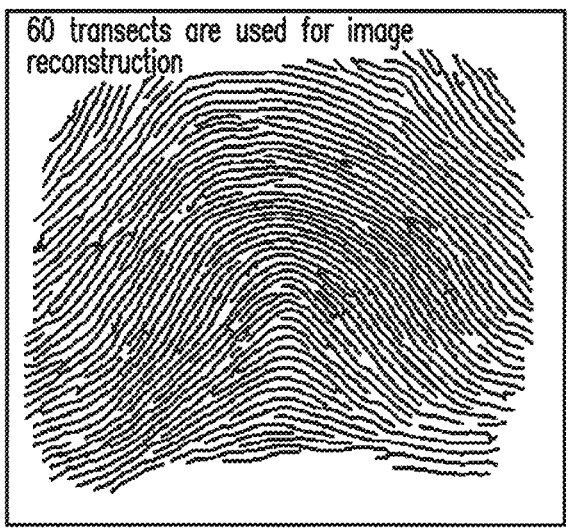
Figure 26D:
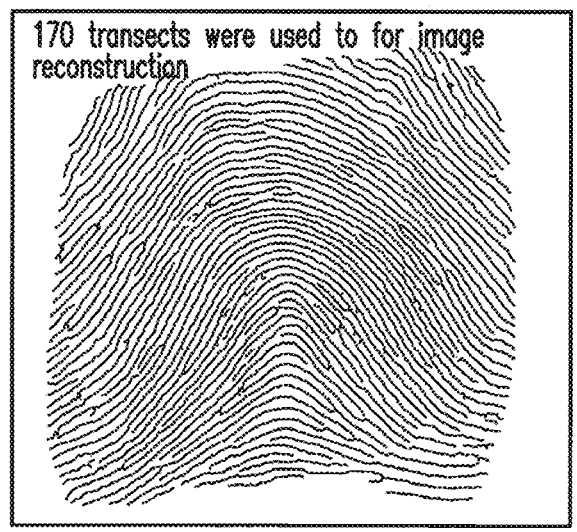

FIG. 26A shows the original image 220 of the fingerprint. The results of the reconstruction of the image 220 for 30, 60 and 170 transects are shown in FIGS. 26A-26C, respectively. The extent to which the model M={G(N), F(M,N)} is representative of the initial pattern depends upon the number (i.e. the sampling density) of transects $T_j$.

Figures 26E, 26F:
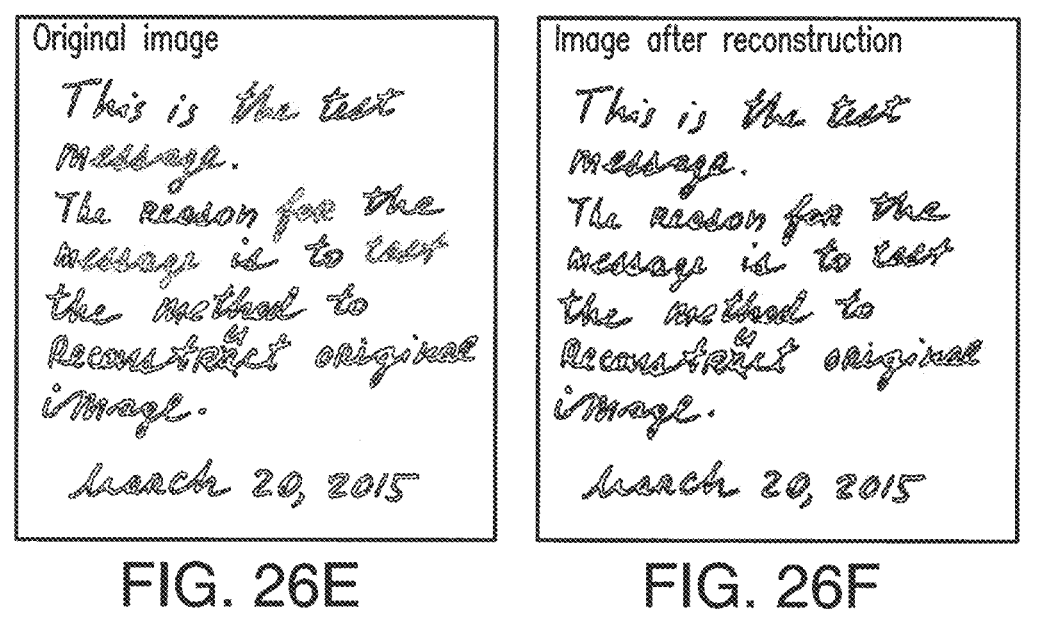

FIG. 26F depicts an example of the reconstructed image of a hand-written sample from the original image shown in FIG. 26E.

With few transects, little processed image detail will be sampled in consideration of the model of the incremental structure. As N→infinity, the model M={G(N), $F_{M,N}$} will become a complete representation of the processed image.

The principles of reconstruction of the images including the steps 1-6 presented supra, are applicable to operation of the image reconstruction unit 118 at the Sender's encryption/decryption sub-system 16 using the G(N), F(M,N) computed by the G(N), F(M,N) computing Unit 100 for the image 20, as well as to the operation of the image Reconstruction unit 119 at the Receiver's encryption/decryption sub-system 18 which uses the G(N) and F(M,N) for the Sender's reconstructed image 34 sent to the Receiver 14 from the Sender 12.

From Grayscale to Binary Fingerprint Via Operation of Graphs Intersection

The subject system and method are designed with the noise reduction in the grayscale fingerprint image capability. The image of the grayscale fingerprint is denoted by Fp(gray).

A threshold Thr is used to convert a grayscale image into a binary image, which means that if the brightness of a pixel is greater or equal than Thr, then the pixel becomes black, i.e. the brightness of the pixel equals 0. If the brightness of a pixel is lower than the Thr, then the pixel becomes white, i.e. the brightness of a pixel is 255.

A sequence of thresholds Thr1, Thr2, . . . , Thrj, . . . , Thrm are used to convert fingerprint Fp(gray) into a set of binary fingerprints Fp1, Fp2, . . . , Fpj, . . . , Fpm.

The structures of Fpj, j=1, . . . , m are described by the N-partite graphs G(Fpj), j=1, . . . , m (as described in '578 Patent).

If the structure of the graph G(Fpj) remains unchanged for different versions of the threshold Trij, then the grayscale image of a fingerprint is robust with respect to conversion of Fp(gray) into binary pattern. Real images of fingerprints contain noise, resulting in sensitivity of the structure of a binary image Fpj to Thrj. In other words, the structure of the graph G(Fpj) is the function of the threshold Thrj. One of the possible way to reduce the noise in the G(Fpj) is to construct graph G (noise reduction) which consists of vertices and edges existing in different versions of graphs G(Fp1), G(Fp2), . . . , G(Fpm).

The tool for the construction of G(noise reduction) is the operation of graphs intersection (F. Harary, "Graph Theory", Addison-Wesley Publishing Co., Inc., 1969, 300 p.). The procedure for graphs G(Fpj) and G(Fpi) intersection resulting in G (noise reduction) is carried out through the steps of:

Step 1. The starting point of the procedure is the sequence of N-partite graphs G(Fp1), G(Fp2), . . . , G(Fpm) (computed in accordance with the method described in '578 Patent).

Step 2. Construction of the intersection of bipartite graphs situated between transect $T_k$ and $T_{k+1}$ in G(Fpj) and G(Fpj+1) is denoted by G[Intersec(k, j)]. The bipartite graph G[Intersec(k, j)] consists of edges which exist in G(Fpj) and G(Fpj+1).

Step 3. Step 2 is repeated for the bipartite graphs situated between the transects Tk and $T_{k+1}$ to result in the bipartite graph G[Intersec(k)] which consists of edges which exist in each graph G(Fpj), j=1, . . . , m.

Step 4. Steps 2 and 3 are repeated m times to result in the graph which consists of edges which exist in G(Fp1), G(Fp2), . . . , G(Fpm).

Index of Intrinsic Anisotropy of 2-D Grayscale Images of Faces

Figure 27D:
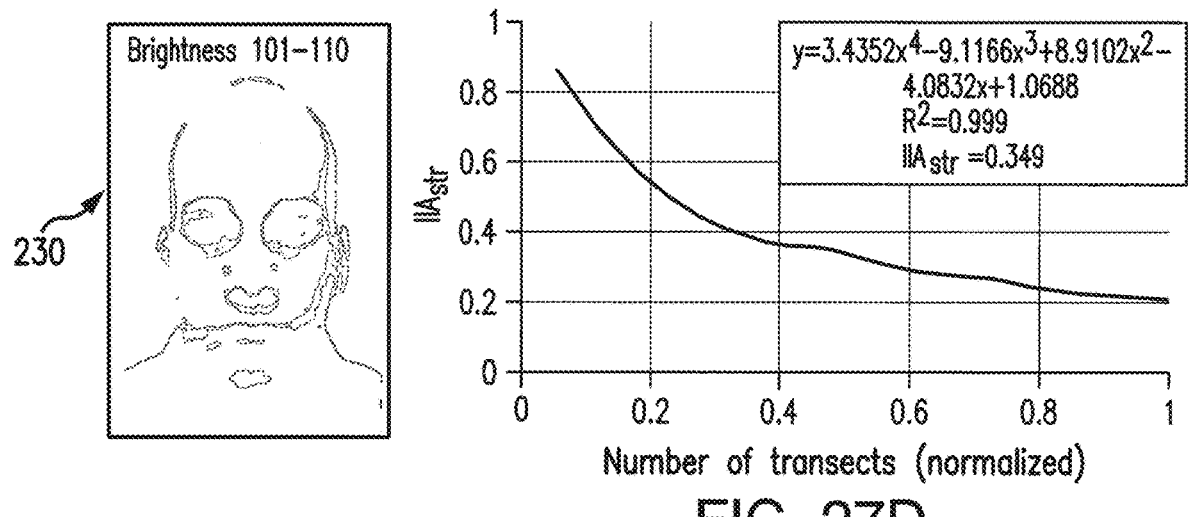

Referring to FIGS. 27A-27D, the subject method is presented with regard to calculation of the $IIA_{str}$ of a grayscale image 224 of a face shown in FIG. 27A. The general procedure of the calculation of the $IIA_{str}$ of a face is similar to processing MRI images, and is performed in the processing Unit 114 shown in FIG. 5.

The differences between processing of MRI and face images resides in the conversion of a grayscale image 224 of the face into the set of binary images 226-230. In case of MRI, a grayscale MRI image 201 {ImGr(MRI)} (shown in FIG. 15A) is converted into the set of binary images ImBi: ImGr(MRI)={ImB1, . . . , ImBi, . . . , ImB256}. Each binary image ImBi is displayed as a contour plot of areas of ImGr which consists of pixels only with the same brightness.

In the procedure for quantification for the grayscale images of a face, the initial grayscale image 224 of the face {ImGr(face)} is converted into a set of binary images 226-230 {ImBBmin(i), . . . , Bmax(i)}. The image ImGr (face) comprises a set of binary images $$ImGr(\text{face}) = \{ImB\min(1), B\max(1), \ldots, ImB\min(i), \ldots, B\max(i), \ldots, ImB\min(n), \ldots, B\max(n)\},$$

where ImBmin(i), . . . , Bmax(i) is the binary image consisting of pixels with the brightness varying from Bmin (i) to Bmax(i).

FIG. 27B shows a contour of binary image $ImB_{81}, \ldots, _{90}$ composed of the pixels with the brightness ranging from 81 to 90. The $IIA_{str}$ of the binary image $ImB_{81, \ldots, 90}$ equals 0.538.

FIGS. 27C-27D illustrate the binary images $ImB_{91 \ldots, 100}$ and $ImB_{101, \ldots, 110}$ for the brightness intervals 91-100 and 101-110, respectively.

A notion of a Structural Code (SC) for a 2-D grayscale arbitrary image and a notion of a Structural Code for a 2-D binary arbitrary image are used in the following description. The Structural Code of a binary image SC(ImB) is the combination of parameters describing the structure of ImB:

parameter #1—equation y=f(x);
parameter #2—value for $R^2$;
parameter #3—Index of Intrinsic Anisotropy of structure of ImB, i. e., $IIA_{str}$ (ImB)=∫f(x)dx.

Figure 20B:
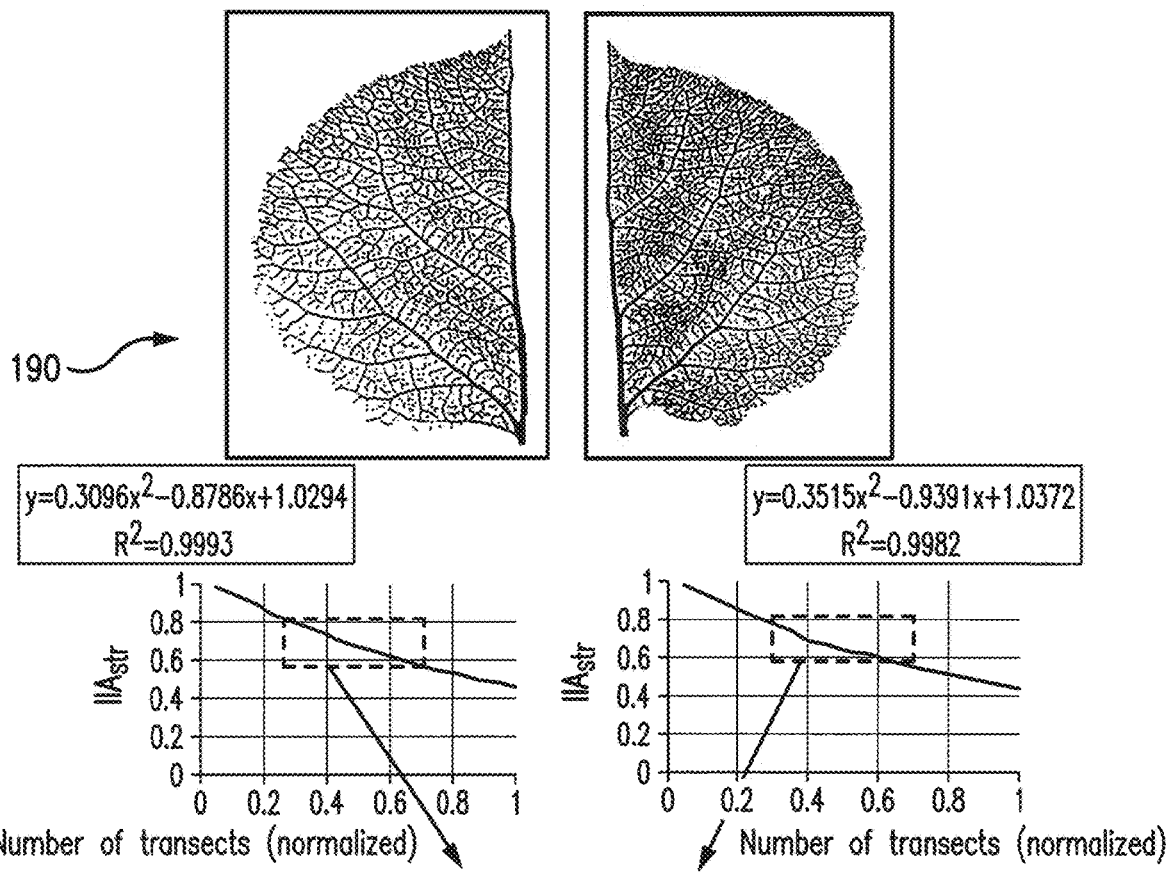
Figure 20C:
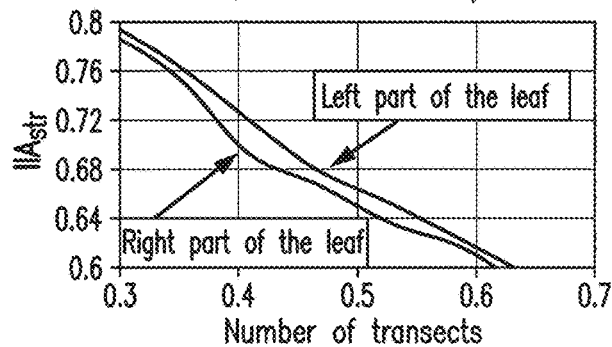

The Structural Code for a binary image depicted in FIG. 20B is:

$$SC(ImB) = \{2.4429x^4 - 6.0237x^3 + 5.4836x^2 - 2.5162x + 1.0428; R^2 = 0.987; IIAstr = 0.538\} \quad \text{(Eq. 30)}$$

The Structural Code of 2-D grayscale images is the combination of Structural Codes of binary images ImB corresponding to the ImGr. Each SC of binary images also accompanied with a parameter #4 which refers to minimal (Bmin) and (Bmax) brightness of pixels in the ImB. In the case of the MRI binary images (FIGS. 22C-22H), the minimal brightness is equal to the maximal brightness (Bmin=Bmax), because each binary image ImBi is comprised of pixels of brightness equal i.

In the case of the 2-D grayscale image of a face, the parameter #4 consists of 2 values, i.e., Bmin and Bmax. For instance, for the image depicted on FIG. 27B, the parameter #4={81, . . . , 90}.

E. Processing of 2-D Binary Layered and Arbitrary Images in the Vector Format

An image 231 in the raster format (shown in FIG. 28A), is the starting point of the construction of N-partite graph G(N), Boolean function and the table $F_{M,N}$ which comprises the size of an image along N transects. Vector format 232 of the image 231 is the starting point of the image conversion into a pure mathematical model. The advantage of using vector format for quantification of indices of anisotropy and complexity of layered and arbitrary images is that the routines of moving, scaling, or rotation of the image do not degrade the quality of the vector format images.

Figure 28A:
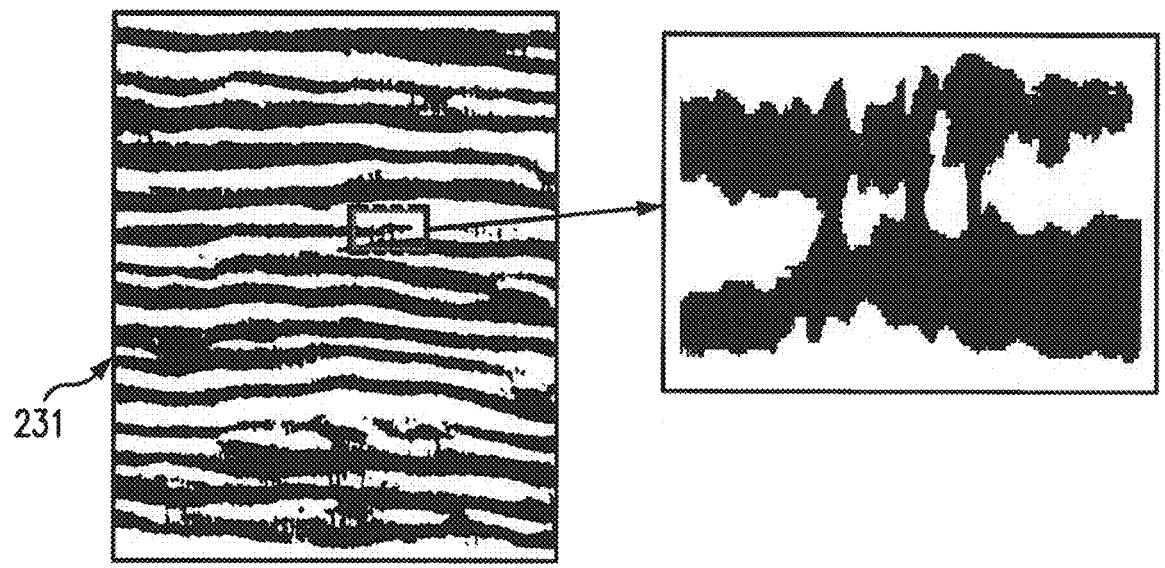
FIGS. 28A-28B are representative of an image in a raster format (FIG. 28A) and in a vector format (FIG. 28B)

Also, images in the vector format include geometrical primitives such as lines, curves, and shapes or polygons which contain substantially less noise (FIG. 28B) than images in the raster format (FIG. 28A).

Figure 8:
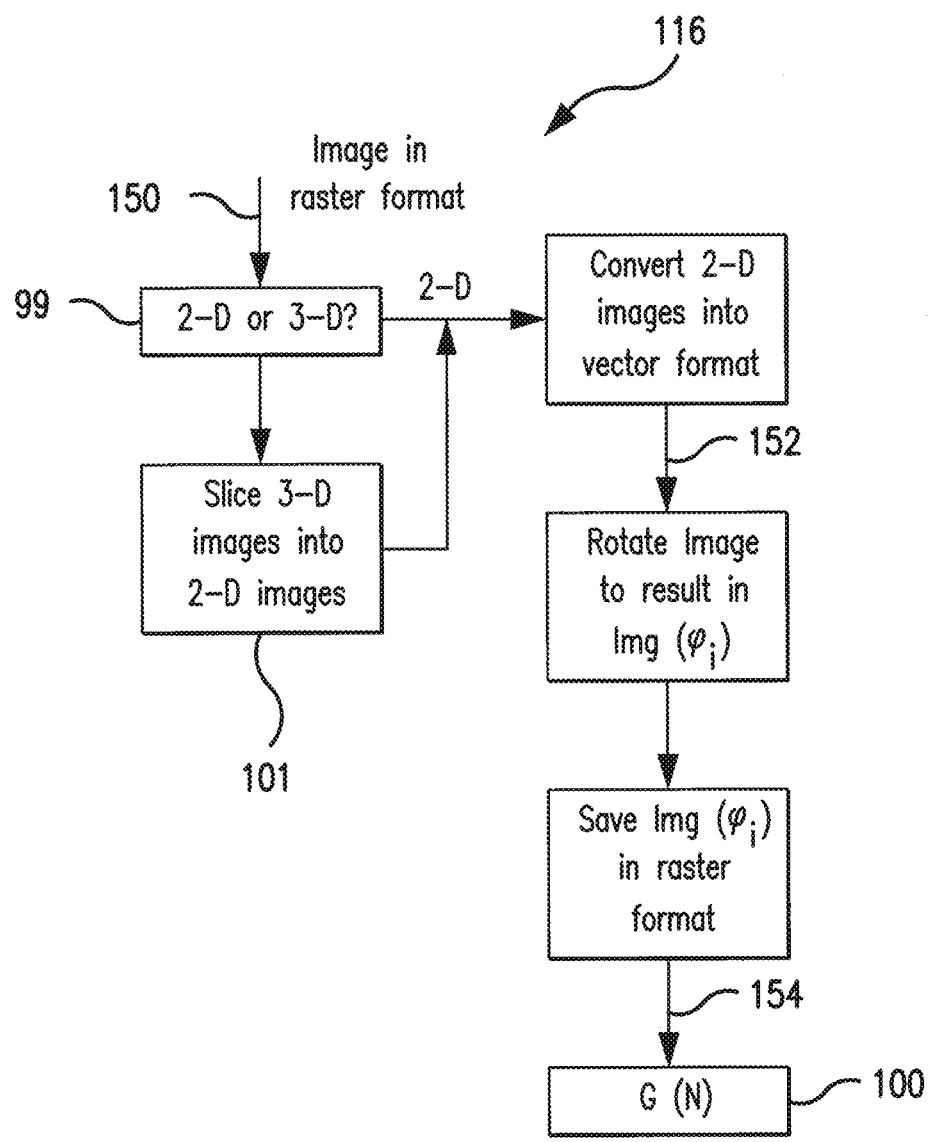
FIG. 8 is a simplified representation of the raster-vector-raster converter unit in the subject system.

The procedure of processing the image in the vector format for the construction of the N-partite graph (G(N) and Boolean function is carried out in the Processing Unit 116, shown in FIGS. 5, 6 and 8 through the steps of:

Step 1. The starting point of the algorithm is 2-D arbitrary or layered binary image in the raster format (231), shown in FIG. 21A.

Figure 28B:
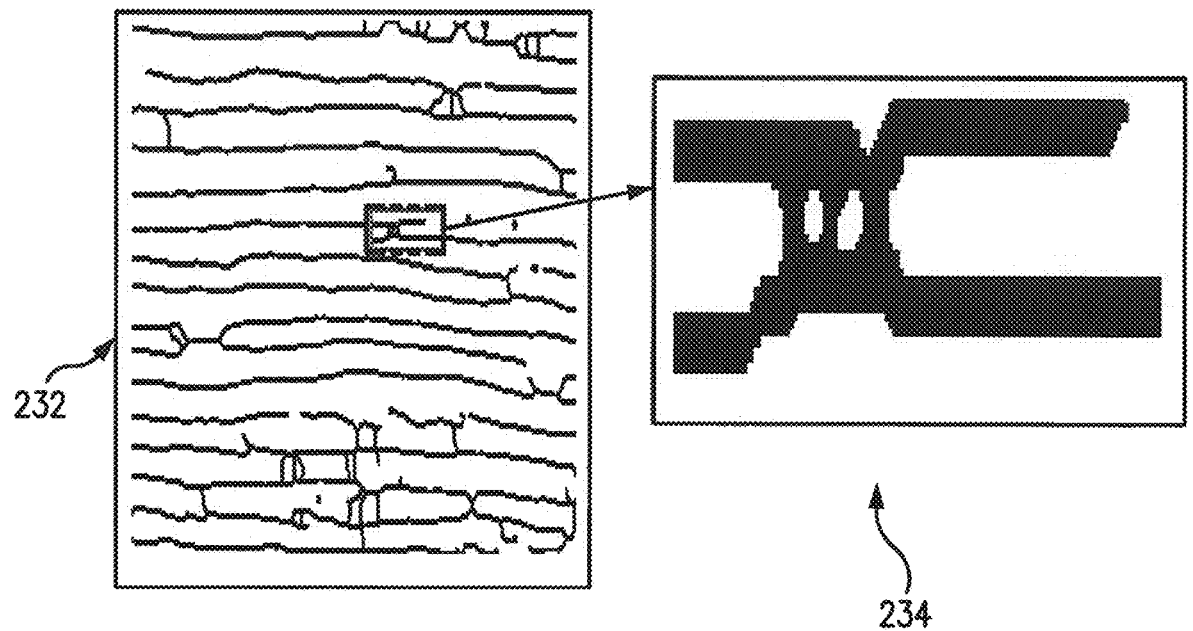

Step 2. The raster format 231 is converted into the vector format 232 (shown in FIG. 28B). Procedures of an image conversion are well documented (A. Arnstson, "Graphic Design Basics", 6$^{th}$ Ed., Cengage Learning, 2011, p. 243) and are available in many commercial (Corel Draw, CAD, Photoshop) and free (ImageJ) software packages. Output of the conversion procedure is the image in the vector format 232 (FIG. 28B).

Step 3. The image in the vector format 232 is subsequently stored (in the memory of the computer 24 or some other memory location) in the raster format 234. The procedures of the formats conversion raster-vector-raster substantially reduces noise in the image processing (as clearly shown in FIG. 28B).

Step 4. Since the output of the Step 3 is an image in the raster format 234, the algorithm presented in '578 Patent is used to construct G(N) and Boolean functions.

F. Method of Measurement of Area, Volume and Structure of 3-D Lesions with Fuzzy Margins Rapid advances in the field of medical imaging have revolutionized medical industry. Various non-invasive medical imaging systems, for instance, computer tomography CT), magnetic resonance imaging (MRI), etc., provide unique information for patient diagnosis, managing diseases, surgical and radiotherapy planning. Physicians rely on medical images, such as MRIs, etc. to diagnose patients and to determine regimens of treatment.

Every day, millions of images are reviewed by tens of thousands of doctors, throughout the United States and throughout the world. However, the method by which doctors analyze and extract patient information from medical images is imprecise. In fact, the size of a lesion that appears on an MRI is presently measured with calipers and rulers, and very small lesions are simply ignored. It is often very difficult to measure a lesion that appears on an MRI because there are no clear margins between the normal tissue and the lesion. Thus, the measurement of the subject lesion can result in some level of uncertainty.

Preciseness of lesions measurements is integral to improving medical treatment, and the course of treatment almost invariably is based on the size of the lesion. Notably, a difference of 10%-20% in the size of a lesion could result in different medical treatment. There is a substantial disproportion between the advanced technology used for imaging of hard and soft tissues of a patient and primitive tools for measuring parameters of lesions.

The subject method and system permits automation of measurements of the area and structure of lesions in 2-D images and the volume and structure of lesions in 3-D images which is performed in the Processing Unit 114 (shown in FIGS. 5-6).

As shown in FIGS. 30A-30D, and 33, the routine for automatic computation of dimensions and structure of a lesion is carried out through the following steps:

Step 1. 2-D or 3-D grayscale medical image 250 is acquired by the Imaging system 70, for example, MRI system, and the area of study 252 on the medical image 250 is outlined by a radiologist. FIG. 30A depicts a tumor on MRI outlined by the rectangle 252. In general, the area of study 252 has to be outlined by a closed contour.

As shown on the enlarged image of the tumor under study (FIG. 30B), the margin between normal tissue and tumor may be fuzzy. Additionally, the structure of the tumor is generally not uniform. The structure of the tumor can serve as the source of valuable information about the status of a disease, and thus the analysis and quantification of the tumor status is an essential part of the diagnosis making.

Step 2. Software packages are available for visualization of results of the image conversion into 3-D. For example, Watershed algorithm [presented in J. Roerdink, "*The Watershed Transform: Definitions, Algorithms and Parallelization Strategies*", Fundamenta Informaticae, 41, (2001, 187-228, IOS Press] can be used to convert the 2-D grayscale image shown in FIG. 30B into the 2-D binary image 254 (shown in FIG. 30C) or the 3-D binary image 256 (shown in FIG. 30D). Color models may be used to emphasize tumor structure in 2-D and 3-D dimensions (FIGS. 30C-30D).

Step 3. Following the conversion into 3-D binary image, shown in FIG. 30D, the procedure passes to Step 3 where the brightness $B(P_i)$ of each pixel $P_i$ in the 3-D binary image 256 is computed using the elevation of a pixel $E(p_i)$ which is in the reverse proportion to its brightness $B(p_i)$, i.e., $E(p_i)=1/B(p_i)$.

Step 4. Subsequently, the logic passes to Step 4, where a set of contour reliefs in the 3-D binary image 256 is computed. FIGS. 31A-31C depict contour reliefs of grayscale tumor. Each contour relief is a line connecting pixels with equal brightness. When a lower difference in the brightness between contour lines is used, more of the details of the tumor structure is available for measurements. For example, the difference in brightness between contour interval for low resolution tumor structure may be equal 30 (FIG. 31A), for medium resolution may be equal 20 (FIG. 31B), and may be 10 for high resolution tumor structure (FIG. 31C). The high resolution contour relief with the smallest difference in brightness shown in FIG. 31C provides the largest amount of details of the tumor structure in comparison with low and medium resolution contours of FIGS. 31A, 31B, respectively.

Step 5. Subsequently, the lesion is divided in p contour intervals $CI_i$. The number of contour intervals $CI_i$ is defined by a medical doctor and depends on a category of disease, imaging technology, state of a patient and many other factors.

Step 6. Each contour interval $CI_i$ is stored in a separate file $F_i$ in the raster format. All pixels within one contour interval are black, i.e., the brightness of these pixels is equal zero.

One contour interval may consist of more than one closed contour, since the area of study may have more than one lesion. FIGS. 32A-32D depict three contour intervals for low resolution tumor structure.

Step 7. File $F_i$ in the raster format is converted into Comma Separate Value (CSV) format (in accordance with the algorithm presented in the '578 Patent).

Step 8. Image segmentation algorithm (presented in the '578 Patent) is used to identify pixels which belong to the same contour interval.

Step 9. The area of each contour interval CI, denoted by Area($CI_i$), is computed in Step 9. The Area ($CI_i$) is equal to the area of a pixel ($p_i$) multiplied by the number of pixels in the contour interval CI.

Each contour interval $CI_i$ is associated with the brightness of pixels B($CI_i$). A higher level of brightness associated with $CI_i$ indicates that more assurance $w_i$ exists that $CI_i$ belongs to a lesion. Parameter $w_i$ is defined empirically in the interval [0,1].

If $w_i=1$, then the contour interval belongs to a lesion. If $w_i=0$, then the contour interval does not belong to the lesion. If the data does not contribute equally in the final result, then the weighted arithmetic mean is used to calculate the average value. Parameter $w_i$ is the measure of the contribution of $CI_i$ to area of 2-D lesion.

Step 10. The area of the 2-D lesion q (denoted by Area($lesion_q$) is calculated as:

$$\text{Area}(\text{lesion}_q)=\{\Sigma[\text{Area}(CI_i)*w_i]\}/(\Sigma w_i), i=1, \ldots, p \quad \text{(Eq. 31)}$$

If the data contributes equally to the final result, then the weighted arithmetic mean is equal to the arithmetic mean.

If a lesion consists of various contour intervals equally contributed to its area, then only one contour interval with maximal area is used to calculate the area of the lesion.

Figure 33:
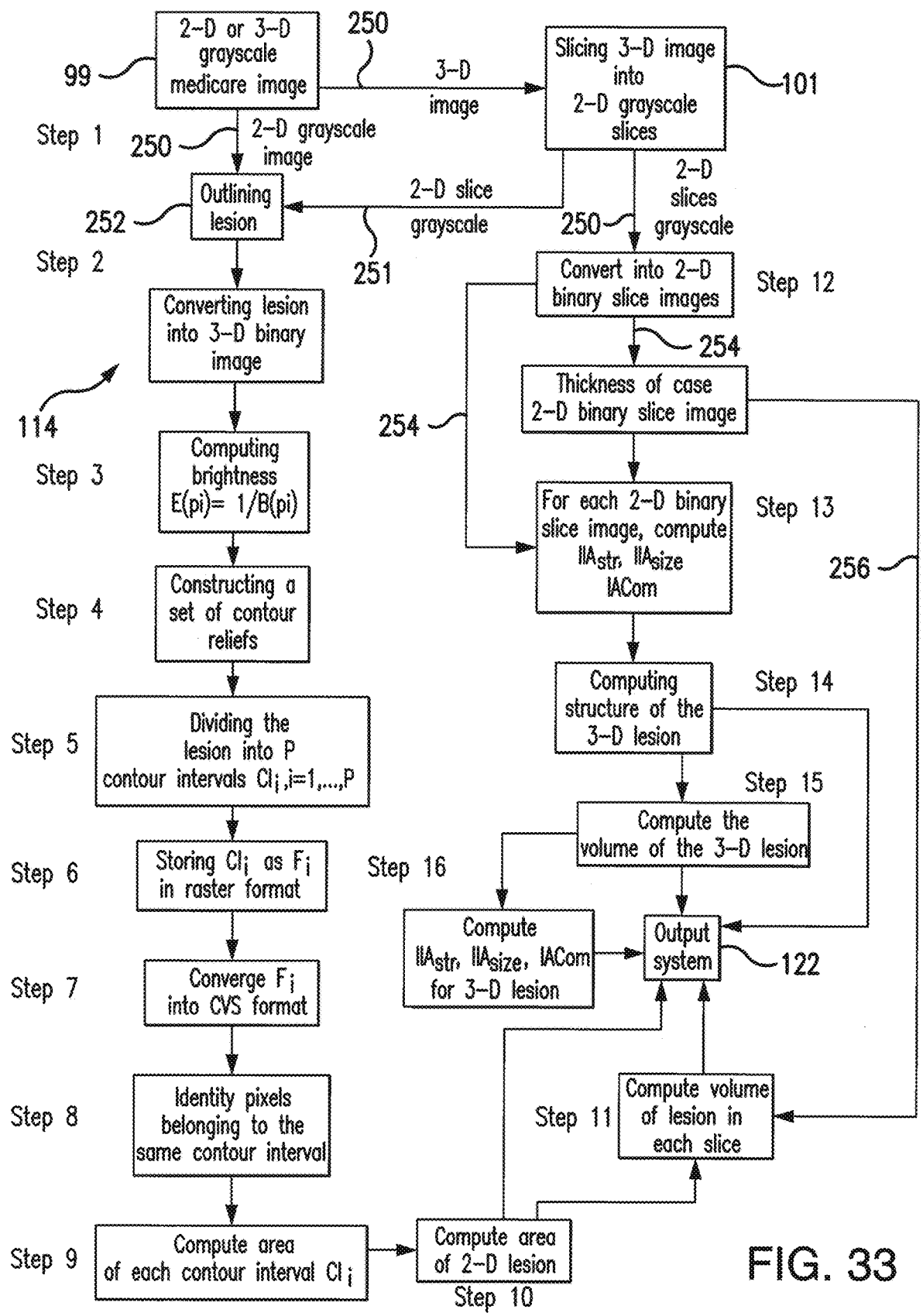
FIG. 33 is a flowchart diagram of the process for computing structure and dimensions of lesions with fuzzy margins found in grayscale images.

Step 11. As depicted in FIG. 33, upon deciding in logic block 99 (shown in FIGS. 6 and 8), that the grayscale medical image 250 is a 3-D image, the logic flows to Slice Computation Unit 101, where the 3-D grayscale image 250 is sliced into a set of 2-D grayscale slice images 251.

Subsequently, the volume of the lesion in each 2-D slice is calculated. The slice thickness is denoted by SliceThickness. Thus the volume of lesion within a slice j is equal:

$$\text{Volume}(\text{lesion}_q, \text{slice}_j) = \text{Area}(\text{lesion}_q, \text{slice}_j) * \text{SliceThickness} \quad \text{(Eq. 32)}$$

Step 12. Each 2-D grayscale slice image 251 is converted into a 2-D binary slice image 254, and the slice thickness 256 is computed, which is provided to the logic operating in Step 11 for the volume of the lesion computation.

Step 13. 2-D lesion binary image of the lesion is composed of all contour intervals as shown in FIG. 32A. For each 2-D binary slice image 254, an Index of Intrinsic Anisotropic of size ($IIA_{size}$), Index of Intrinsic Anisotropy of structure($IIA_{str}$), and Index of Complexity of Image Anisotropy (IACom) are calculated.

Steps 2-13 are repeated for all 2-D binary slice images in the 3-D medical image 250.

Step 14. Subsequently, the structure of a lesion (in 3-D domain) is calculated. Due to the fact that the area of study 252 may contain more than one lesion, it is necessary to set up the correspondence between lesions in the nearby slices. For this purpose, a parameter H is introduced for finding the correspondence between lesions in the nearby 2-D binary slice images. The following assumption is used for the routine of the establishing the correspondence between lesions:

2-D lesions found at nearby slices, i.e., $\text{lesion}_q(\text{slice}_i)$ and $\text{lesion}_k(\text{slice}_{i+1})$, belong to the same 3-D lesion if the distance H between pixels of $\text{lesion}_q(\text{slice}_i)$ and $\text{lesion}_k(\text{slice}_{i+1})$ is equal to the thickness of the slice.

Step 15. Volume of the lesion across all slices is calculated as:

$$\text{Volume}(\text{lesion}_q \text{ in } 3D) = \Sigma \text{Volume}(\text{lesion}_q, \text{slice}_j),$$
$$j=1, \ldots, m \quad \text{(Eq. 33)}$$

where m is the number of slices in the 3-D medical image 150, i.e., in the 3-D $\text{lesion}_q$.

Step 16. Index of Intrinsic Anisotropic of size ($IIA_{size}$), Index of Intrinsic Anisotropy of structure($IIA_{str}$) and Index of Complexity of Image Anisotropy (IACom) is calculated for 3-D $\text{lesion}_q$.

Finally, all computed parameters of the lesion are output into the output system 122 (in any preferred format) for further processing, analysis, transmitting to a receiving party, or for storing in the archives 92, or the database 126, for example, for comparison with quantification results of other images to monitor the treatment progress, or advancement of the disease, etc.

Figure 34:
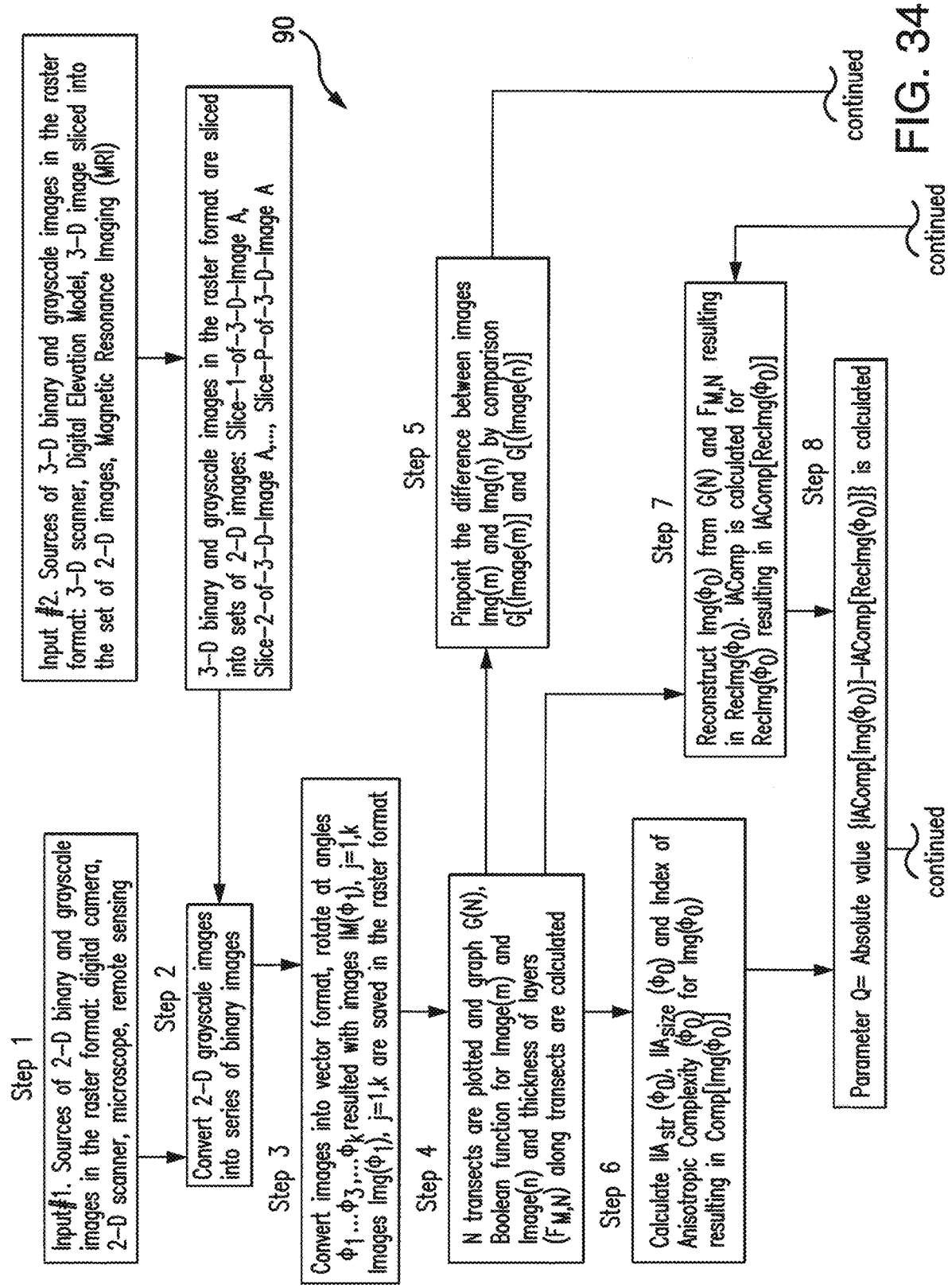
FIG. 34 is a flowchart diagram of the process underlying the operation of the parameterization sub-system for processing 2-D and 3-D images.
Figure 34:
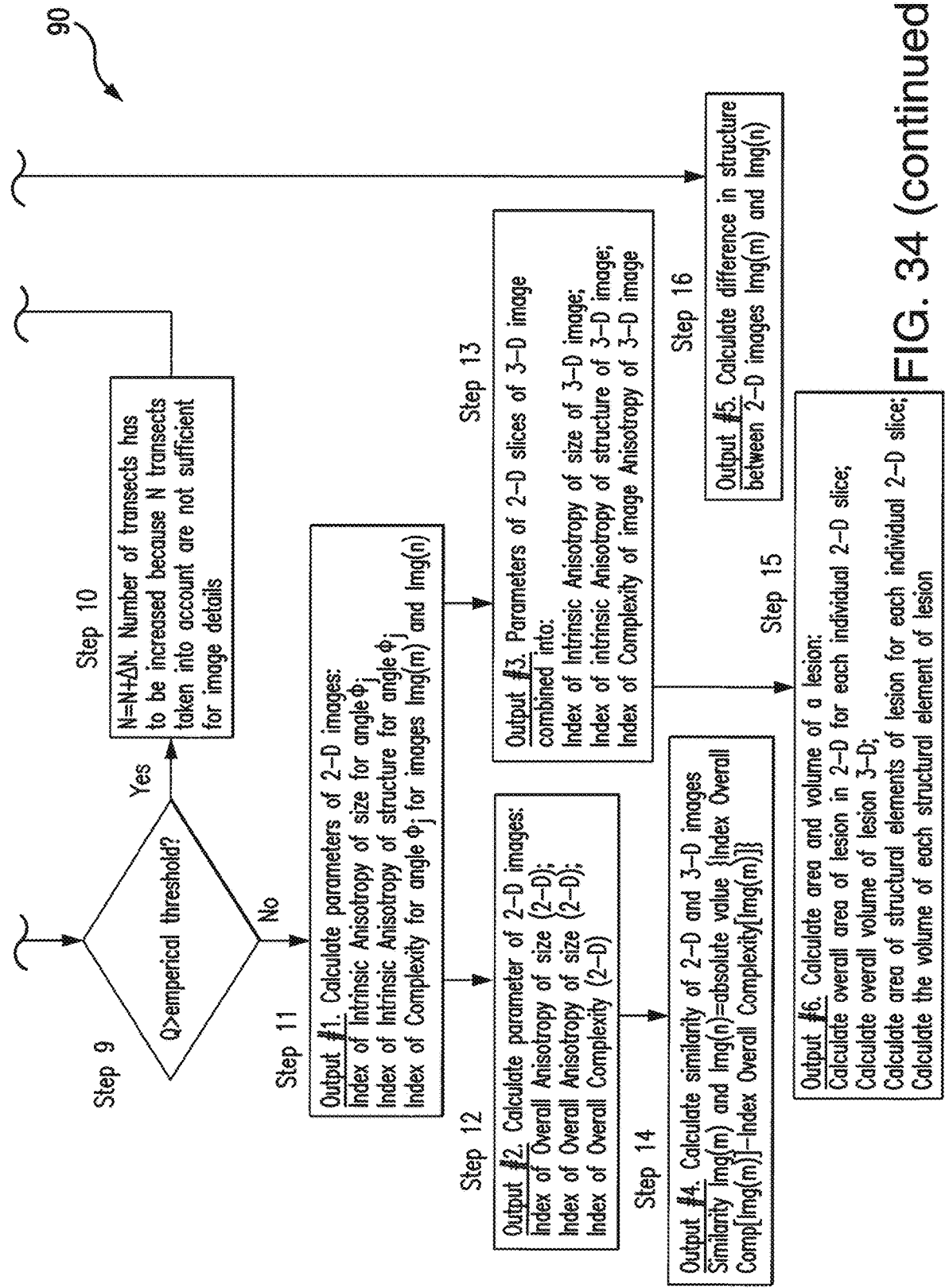

The algorithm 90 underlying operation of the subject system 10 is applicable to parameterization of different types of images including 2-D and 3-D binary and grayscale images, both layered and arbitrary, in the raster and the vector format. FIG. 34 represents the flow chart diagram of the subject algorithm 90 covering parameterization of various images in different formats for different areas of application. FIG. 34 should be considered in conjunction with FIGS. 1-33 discussed in the previous paragraphs.

The procedure begins in Step 1, where 2-D binary and/or grayscale images in the raster format are acquired from the sources under study through operation of digital cameras, 2-D scanners, microscopes, or through remote sensing. Alternatively, in Step 1, 3-D binary and grayscale images in the raster format may be acquired from the sources under study through operation of 3-D scanners, digital elevation models, different medical imaging modalities such as Magnetic Resonance Imaging (MRI), CT scanning, PET scanning, X-rays, etc.

In Step 2, if the 2-D grayscale images are acquired, the 2-D grayscale images (in the raster format) are converted into a series of 2-D binary images. If however, the images are initially acquired as 3-D binary and/or grayscale images, the 3-D binary and grayscale images in the raster format are sliced in Step 2 into sets of 2-D slice images, as detailed in the description corresponding to FIGS. 6, 8, 15D, and 16. If the 2-D slice images are grayscale images, they are converted into sets of binary 2-D images.

From Step 2, the logic follows to the Step 3 where, in order to reduce the noise of processing, the 2-D images (either the 2-D images under study acquired by the imaging system, or 2-D slice images) in raster format are converted into vector format, as detailed in the description corresponding to FIGS. 6 and 8, and rotated at different rotation angles $\varphi_1, \ldots, \varphi_j, \ldots, \varphi_k$ to result in images $IMG(\varphi_j)$, j=1, ..., k, where k is the number of rotation angles used for rotating the vector format image. The images $Img(\varphi_j)$, j=1, ..., k are subsequently saved in the raster format.

From Step 3, the procedure follows to Step 4, where N transects are plotted onto each 2-D image in the raster format, and N-partite graph G(N), Boolean function for image (m) and image (n), as well as the thickness of layers F(M,N) along the transects plotted on the 2-D image, are calculated in accordance with the technique presented in the '578 Patent. The details of the procedure performed in Step 4 of FIG. 34 corresponds to the procedure performed in Computation Unit 100 of FIG. 5, and is not detailed herein as it can be found in the '578 Patent.

From Step 4, the logic passes to Step 5 where the difference between images Img(m) and Img(n) is pinpointed by comparison of the N-partite graph G [(image (m)] to G [(image n)]. The structural differences between images Img (m) and Img(n) are calculated in the Quantification of Similarities Unit 108 (shown in FIG. 6B) as differences between Indexes of Intrinsic Anisotropic of structure ($IIA_{str}$) of the images Img(m) and Img(n) computed in correspondence with Eqs. 1-5 as presented in previous paragraphs. The parameters $IIA_{str}$ of both images are computed in the Indices Quantification Unit 106 (shown in FIGS. 6-7).

The results of calculation of the differences in structure between 2-D images Img(m) and Img(n) are output to the output system 122 (shown in FIGS. 5-7).

Upon completion of Step 4, the logic also proceeds to Step 6 where the Index of Intrinsic Anisotropic of structure ($IIA_{str}$), Index of Intrinsic Anisotropic of size ($IIA_{size}$), and the Index of Complexity of Image Anisotropy (IA Comp [Img($\varphi_0$)] for Img ($\varphi_0$) are calculated.

In addition, upon completion of the routine in Step 4, the logic may advance to Step 7, where the Img ($\varphi_0$) is reconstructed from the N-partite graph G(N) and the Table $F_{M,N}$ resulting in the reconstructed image Rec Img ($\varphi_0$). Subsequently, IA Comp ($\varphi_0$) is calculated for Rec Img ($\varphi_0$) resulting in the IA Comp [Rec Img ($\varphi_0$)].

Upon completion of Step 6 and Step 7, a routine presented in Step 8 is performed where a parameter Q is calculated as the absolute value of the difference between the IAComp for Img ($\varphi_0$) and Rec Img ($\varphi_0$):

$$Q = \text{Absolute Value } \{IA \text{ Comp}[Img(\varphi_0)] - IA \text{ Comp}[Rec\, Img(\varphi_0)]\} \quad \text{(Eq. 33)}$$

Upon completion of the routine in Step 8, the logic moves to Step 9 where the logic decides whether Q exceeds an empirical threshold. If Q exceeds the empirical threshold, the logic performs the routine in Step 10 where the number of transects N is increased to N+ΔN, because the initially applied N transects are not sufficient to provide sufficient image details. From Step 10, the logic loops to Step 7 to reflect the increase in the number of transects.

If in Step 9, the logic decision is made that Q does not exceed the empirical threshold, the logic flows to Step 11 where parameter of 2-D images (Index of Intrinsic Anisotropic of size for angle $\varphi_j$, the Index of Intrinsic Anisotropic of structure for angle $\varphi_j$, and the Index of Complexity of Image Anisotropy for angle $\varphi_j$ for images Img (in) and Img (n) are computed and output to the output system.

The results of computations in Step 11 are used in Step 12 and 13 to calculate parameters of the 2-D image (Index of Intrinsic Anisotropy of size (2-D), Index of Intrinsic Anisotropy of structure (2-D), and Index of Complexity of Image Anisotropy (2-D) for the 2-D images (in Step 12).

In Step 13, the parameters of the 2-D slices computed in Steps 2-11 are combined into the Index of Intrinsic Anisotropy of size of the 3-D image, Index of Intrinsic Anisotropy of structure of the 3-D image, and the Index of Complexity of Image Anisotropy of the 3-D image, and are output to the output system.

Subsequently to the routine performed in Step 12, the logic advances to the routine performed in Step 14 where similarities for 2-D and 3-D images are calculated in the Quantification of Similarities Unit 46 as:

Similarity *Img(m)* and *Img(n)*=absolute value{(Index of Complexity of Image Anisotropy[*Img(m)*]– Index of Complexity of Image Anisotropy[*Img(m)*]}. (Eq. 34)

From Step 13, the logic advances to Step 15 where the computation of the area and volume of a 3-D object, i.e., a lesion, is performed in accordance with the process described in previous paragraphs in conjunction with FIGS. 30A-30D, 31A-31C, 32A-32D, and 33.

Specifically in Step 15, the overall area of the lesion (in 2-D domain) is computed for each individual 2-D slice. Also, the overall volume of the lesion (in 3-D domain) is computed, the area of structural elements of the lesion is computed for each individual 2-D slice, and the volume of each structural element of the lesion (in 2-D and 3-D domain) is calculated. The results of the routine performed in Step 14 and Step 15 are also output to the output system in any format the output system is configured for, including plots, graphs, binary representation, colored and grayscale images, black and white representation, i.e., any format, available for representing the output data.

In Step 16, the results of computations of the structural differences between 2-D images (Img(m) and Img(n) performed in Step 5 are also output to the output system.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A system for encryption/decryption of arbitrary 2-D and 3-D images, comprising:
    an imaging system for acquiring at least one image of an object under study, wherein said at least one image includes features M and a binary image in pixel format (BIPF);
    a first computing sub-system operatively coupled to said imaging system to receive therefrom said at least one image of the object under study, wherein said first computing sub-system includes:
    a first motherboard and a first Central Processor Unit (CPU) operatively coupled thereto,
    a pre-programmed first Read Only Memory (ROM) unit residing on said first motherboard and operatively coupled to said first CPU,
    a Random Number Generator (RNG) operatively coupled to said first CPU and said first ROM unit, and
    a first dynamically changing database-of-transects operatively coupled to said first CPU, said RNG, and said first ROM unit, said first database-of-transects including a plurality of binary images of sets of transects N; and
    a second computing sub-system operatively coupled to said first computing sub-system over a communication channel and built with a second motherboard and a second CPU operatively coupled thereto,
    said second computing sub-system including:
    a pre-programmed second ROM unit residing on said second motherboard and operatively coupled to said second CPU, and
    a second database-of-transects operatively coupled to said second CPU and said second ROM unit, said second database-of-transects including a plurality of binary images of sets of transects N and being substantially identical to said first database-of-transects and dynamically changing in synchronism with said first database-of-transects;
    wherein said first ROM unit in said first computing sub-system includes:
    a first computing unit configured for application to said at least one image of the object under study a respective set of transects from said first database-of-transects selected therefrom in accordance with a random number RN generated for said at least one image of the object under study by said RNG, wherein said K represents an index for the random number RN, said first computing unit computing an N-partite graph $G(N)\_RN_K$ describing an anisotropic structure of said at least one image and including coordinates of points of intersections of the transects N from said respective set thereof with the features M of said at least one image, and constructing a table $F(M,N)\_RN_K$ describing anisotropic size of said at least one image and containing a dimension of each feature M along each said transect N,
    a first reconstruction unit operatively coupled to said first computing unit and configured for reconstruction of said at least one image based on said G(N) and F(M,N) computed in said first computing unit, said first reconstruction unit generating a first reconstructed image $R_{CS}BIPF\_RN_K$ for said at least one image,
    a second computing unit operatively coupled to said first reconstruction unit and configured to compute a reconstruction $R_{CS}G(N)\_RN_K$ of the N-partite graph G(N) for the random number $RN_K$, reconstruction table $R_{CS}F(M,N)\_RN_K$, removing said coordinates from said $R_{CS}G(N)\_RN_K$, and a first group of hash values for said first reconstructed image $R_{CS}BIPF\_RN_K$, wherein said first group of hash values are represented by a first group of anisotropy parameters of said first reconstructed image $R_{CS}BIPF\_RN_K$, said first group of anisotropy parameters of said first reconstructed image including an Index of Anisotropy of the Structure ($IIA_{STR}$) and an Index of Anisotropy of Size ($IIA_{SIZE}$) of said first reconstructed image $R_{CS}BIPF\_RN_K$ generated by said first reconstruction unit, and an output device configured to form a representation of an encrypted said at least one image, said representation including the $R_{CS}G(N)\_RN_K$ devoid of said coordinates, $R_{CS}F(M,N)\_RN_K$ of said first reconstructed image $R_{CS}BIPF\_RN_K$, a one-time secret code SK-A_$RN_K$ corresponding to said respective set of transects selected in accordance with said random number $RN_K$, and said $IIA_{STR}$ and $IIA_{SIZE}$ of said first reconstructed image $R_{CS}BIPF\_RN_K$, said output device transmitting said representation to said second computing sub-system over said communication channel; and wherein said second ROM unit of said second computing sub-system includes:

a second reconstruction unit operatively coupled to said first output device of said first computing sub-system, said second reconstruction unit being configured to retrieve said respective set of transects from said second database-of-transects in accordance with said secret code SK-A_$RN_K$ received thereat from said first computing sub-system and to generate a second reconstructed image based on said $R_{CS}G(N)\_RN_K$ devoid of said coordinates, $R_{CS}F(M,N)\_RN_K$, and SK-A_$RN_K$ received from said first computing sub-system, a third computing unit operatively coupled to said second reconstruction unit and configured for computing a second group of hash values for said second reconstructed image, said second group of hash values for said second reconstructed image being represented by a second group of anisotropy parameters of said second reconstructed image, said second group of anisotropy parameters of said second reconstructed image including $IIA_{STR}$ and $IIA_{SIZE}$ of said second reconstructed image generated by said second reconstruction unit for said first reconstructed image, a fourth computing unit operatively coupled to said third computing unit and said output device of said first computing sub-system and configured for comparison of said first and second groups of hash values computed for said first and second reconstructed images, respectively, wherein said second computing sub-system authenticates said second reconstructed image if the match between said first and second groups of hash values is determined.

2. The system of claim 1, wherein said second computing sub-system is further configured to request said first computing sub-system to send said representation computed for another randomly generated number if the first group of hash values differs from the second group of hash values.

3. The system of claim 1, wherein said imaging system is operatively coupled to an input of said first computing sub-system and is configured for acquiring said at least one image under study selected from a group including 2-D binary layered images in the pixel format, 2-D or 3-D grayscale arbitrary images in the pixel format, 2-D or 3-D binary layered or arbitrary images in the vector format, and combinations thereof.

4. The system of claim 1, wherein said first computing sub-system further includes a first image parameterization system residing on said first motherboard in operative coupling with said first CPU and said first ROM unit, said first image parameterization system including said first computing unit and said first reconstruction unit; and wherein said second computing sub-system further includes a second image parameterization system residing on said second motherboard in operative coupling with said second CPU and said second ROM unit, said second parameterization system including configured with said second reconstruction unit.

5. The system of claim 4, wherein said first image parameterization system further includes:

an image slicing unit configured for applying a slicing procedure to said at least one image under study if said at least one image under study is a 3-D image, resulting in a set of 2-D slice images of said at least one 3-D image under study, and to output a 2-D image including said at least one 2-D image under study or each of 2D slice images of said set thereof;

wherein said first computing unit is operatively coupled to said image slicing unit and is configured to plot a plurality of transects $T_1, T_2, T_j, \ldots T_N, \ldots T_M$ of said respective set thereof selected in accordance with said randomly generated number $RN_K$ onto said each 2-D image, each of said plurality of transects extending from a respective initial point towards the periphery of said 2-D image in crossing relationship with at least one of features found in said 2-D image, and to convert said 2-D image into the N-partite graph G(N) describing an anisotropic structure of said 2-D image, wherein said first computing unit operates to compute a set of bi-partite graphs $G(T_j, T_{j+1})$, wherein j is the number of a transect smaller than N and M, each of bi-partite graphs $G(T_j, T_{j+1})$ of said set of bi-partite graphs being situated between neighboring transects $T_j$, $T_{j+1}$ and $T_{j+1}$, $T_{j+2}$ respectively, and to merge said neighboring bi-partite graphs $G(T_j, T_{j+1})$ into said N-partite graph G(N) based on the common vertex along said transects $T_{j+1}$ situated between each pair of neighboring bi-partite graphs of said 2-D image;

wherein said second computing unit is configured for computing said first Index of Intrinsic Anisotropy of structure ($IIA_{str}$) and said first Index of Intrinsic Anisotropy of size ($IIA_{size}$) of said 2-D image for each said bi-partite graphs $G(T_j, T_{j+1})$ input in said second computing unit from said first computing unit;

wherein said first Index of Intrinsic Anisotropy of structure $IIA_{str}(X_i, X_{i+1})$ for each said bi-partite graph $G(T_j, T_{j+1})$ of said set thereof is computed in said second computing unit as:

$$IIA_{str}(X_i, X_{i+1}) = [VT(X_i, X_{i+1}) - VI(X_i, X_{i+1})]/VT(X_i, X_{i+1}),$$

where $X_i$ and $X_{i+1}$ correspond to transects $T_j$ and $T_{j+1}$ transecting said 2-D image, $VT(X_i, X_{i+1})$ is the total number of vertices in the $G(X_i, X_{i+1})$, and $VI(X_i, X_{i+1})$ is the total number of vertices in the $G(X_i, X_{i+1})$ forming isotropic edges; and wherein said first Index of Intrinsic Anisotropy of structure $IIA_{str}(X_1, X_N)$ is computed in said second computing unit for a predetermined number N of transects, $N = N_{min+1}, \ldots, N_{max}$ as:

$$IIA_{str}(X_1, X_N) = 1/(N-1) * [\Sigma IIA_{str}(X_i, X_{i+1})], i=1, \ldots, N-1.$$

6. The system of claim 5, wherein said second computing unit is further configured to construct a first plot for "$IIA_{str}$ vs. Number of transects" for said 2-D image, to compute a plurality of approximating functions y=f(x) for said first plot, and a coefficient of determination $R^2$ for each of said plurality of approximating functions, wherein y is a function used for approximation of the Index of Intrinsic Anisotropy of Structure ($IIA_{str}$) as a function of the number x of transects, to choose, from said plurality of approximating functions y, a preferred approximating function having the largest coefficient of determination $R^2$, to compute the first Index of Intrinsic Anisotropy of structure $IIA_{str}$ (2-D image) for said 2-image using said preferred approximating function as:

($IIA_{str}$ (2-D image)=$\int f(x)*dx$, said $IIA_{str}$ (2-D image) being a structural quantification of said 2-D image;

to apply to said 2-D image a routine of rotation said 2-D image for a number of rotation angles $\varphi_i$, i=0, 1, ..., q, to compute said first $IIA_{str}$ (2-D image) for each rotation angle $\varphi_i$ of said number thereof to construct a sequence of $IIA_{str}$ ($\varphi_0$), $IIA_{str}$ ($\varphi_1$), ..., $IIA_{str}$ ($\varphi_q$), and to compute a first Index of Complexity of Image Anisotropic structure ($CI_{str}$) as a structural characteristic of said each 2-D image invariant to the image alignment, where $CI_{str}=(1/q)*\Sigma IIA_{str}(i), i=1, ..., q$, where q is a number of image rotations applied to said 2-D image.

7. The system of claim 6, wherein said feature M is a layer, and wherein said dimension of the feature M is a thickness of the layer, wherein said first Index of Intrinsic Anisotropy of Size ($IIA_{size}$) for said each 2-D image is computed in said second computing unit across said N transects positioned across a sampling area of said 2-D image by:

plotting N transects across the sampling area of said 2-D image;

computing a thickness of a layer in said each 2-D image situated across each transect $T_j$, j=1, ..., N;

constructing a table W ($w_{i,j}$), where $w_{i,j}$ is a thickness of a layer i passing across the transect $T_j$;

normalizing the thickness w as:

$$w(\text{normalized for } T_j)=[w_i-\min(w_i)]/[\max(w_i)-\min(w_i)];$$

wherein $\min(w_i)$ is the minimal value of $w_i$ and $\max(w_i)$ is the maximal value of $w_i$;

calculating a deviation $D_j$ of a thickness $w_i$ of the layer i along the transect $T_j$ as:

$$D_j=(1/n_j)*\{\Sigma[w(\text{normalized for } T_j)_i-w(\text{average normalized})_i]^2\}^{1/2}$$

where $n_j$ is the number of layers situated along the transect $T_j$, and w (average normalized) is the average normalized thickness of the layer along the transect $T_j$;

repeating said normalization routine for the thickness $w_{i,j}$ and calculation of the deviation $D_j$ for the transects $T_1$, $T_2$, ..., $T_N$, resulting in a set of deviations $D_1$, $D_2$, ..., $D_N$ of thicknesses of the layers in said each 2-D image;

calculating the first $IIA_{size}$ for N transects as:

$$IIA_{size}(\text{for } N \text{ transects})=(1/N)*\Sigma(D_k), k=1, ..., N;$$

computing the $IIA_{size}$ for a number of transects N+1, N+2, ..., N+M, and computing the $IIA_{size}$ (2-D image) for said 2-D image as:

$$IIA_{size}(\text{2-D layered image})=(1/M)*\Sigma[IIA_{size}(\text{for } N+k \text{ transects})], k=1, ..., M.$$

8. The system of claim 7, wherein said second computing unit further includes a rotation unit configured to apply to said 2-D image a routine of rotation of said 2-D image for a number of rotational angles $\varphi_0$, $\varphi_1$, ..., $\varphi_i$, i=0, 1, ..., q, to compute said first $IIA_{size}$ (2-D image) for each rotation angle $\varphi_i$ of said number q thereof to construct a sequence of $IIA_{size}$ ($\varphi_0$), $IIA_{size}$ ($\varphi_1$), ..., $IIA_{str}$ ($\varphi_q$), and to compute a first Index of Complexity of Image Anisotropic size ($CI_{size}$) as:

$$CI_{size}=(1/q)*\Sigma IIA_{size}(\varphi_i), i=0, 1, ..., q$$

wherein said $CI_{size}$ is a characteristic of anisotropy of size for said 2-D image invariant to image alignment.

9. The system of claim 8, further configured to receive from said imaging system at least a first and a second images under study, wherein said first parameterization system is further configured to compute in said second computing unit, a first said $IIA_{str}$ (2-D image) for said first 2-D image, to compute in said second computing unit a second said $IIA_{str}$ (2-D image) for said second 2-D image, to construct said first plot for "$IIA_{str}$ vs. Number of transects", and to compute said preferred approximating functions for each of said first and second 2-D images, respectively, to compare said first plots of said first and second 2-D images, to identify structural differences between said first and second 2-D images as a deviation between said first plots thereof, to quantify said identified structural difference based on said preferred approximating functions of said first and second 2-D images, and to apply a routine of localization of structural difference between said first and second 2-D images.

10. A method for encryption/decryption of arbitrary 2-D and 3-D images, comprising:

establishing an imaging system and acquiring, by said imaging system, at least one image of an object under study, said at least one image including features M;

operatively coupling a first computing sub-system to said imaging system to receive therefrom said at least one image of the object under study, configuring said first computing sub-system with a first motherboard and first Central Processor Unit (CPU) operatively coupled thereto, coupling a pre-programmed first Read Only Memory (ROM) unit to said first motherboard and said first CPU, operatively coupling a Random Number Generator (RNG) to said first CPU and said first ROM unit, and operatively coupling a first database-of-transects to said first CPU, said RNG, and said first ROM unit, and configuring said first database-of-transects with a plurality of binary images of sets of transects N; and operatively coupling a second computing sub-system to said first computing sub-system over a communication channel, and configuring said second computing sub-system with a second motherboard and second CPU operatively coupled thereto, operatively coupling a pre-programmed second ROM unit to said second motherboard and said second CPU, and configuring said second ROM unit of said second computing sub-system with a second reconstruction unit operatively coupled to an output of said first computing sub-system, operatively coupling a second database-of-transects operatively coupled to said second CPU and said second ROM unit, and configuring said second database-of-transects with a plurality of binary images of sets of transects N, said second database-of-transects being substantially identical to said first database-of-transects;

configuring said first ROM unit in said first computing sub-system with:

a first computing unit, a first reconstruction unit coupled to said first computing unit, and a second computing unit coupled to said first reconstruction unit, generating by said RNG a random number $RN_K$ for said at least one image of the object under study, wherein said K represents an index for the random number RN, selecting, from said first database-of-transects a respective set of transects N corresponding to said random number $RN_K$, applying, by said first computing unit, said respective set of transects N from said first database-of-transects, to said image of the object under study, and computing, in said first computing unit, an N-partite graph $G(N)\_RN_K$ describing an anisotropic structure of said at least one image and including coordinates of points of intersections of the transects N of said respective set of transects with the features M in said at least one image, and a table $F(M,N)\_RN_K$ describing an anisotropic size of said image and containing a thickness of each said feature M along each of said transect N, reconstructing, in said first reconstruction unit, said at least one image based on said G(N) and F(M,N) computed in said first computing unit, thus producing a first reconstructed image, computing, in said second computing unit, a construction $R_{cs}G(N)\_RNK$ of the N-partite graph for the random number $RN_K$, a reconstruction $R_{cs}F(M,N)\_RN_K$ of the table $F(M,N)\_RN_K$ for the random number $RN_K$, and a first group of hash values for said first reconstructed image, said first group of hash values being representative by a first group of anisotropy parameters of said first reconstructed image $R_{CS}BIPF\_RN_K$, said first anisotropy parameters comprising an index of Anisotropy of the Structure ($IIA_{STR}$) and an Index of Anisotropy of Size ($IIA_{SIZE}$) of said first reconstructed image produced by first reconstruction unit, removing, in said second computing unit, said coordinates of points for said $R_{CS}G(N)\_RN_K$, and forming a representation of an encoded said at least one image including said $R_{CS}G(N)\_RN_K$ with said coordinates removed, $R_{CS}F(M,N)\_RN_K$ of said first reconstructed image, a one-time secret code $SK\text{-}A\_RN_K$ representative of said respective set of transects corresponding to said random number $RN_K$, and said $IIA_{STR}$ and $IIA_{SIZE}$ of said first reconstructed image, and transmitting said representation to said second computing sub-system over said communication channel; and retrieving, at said second reconstruction unit in said second cooperating sub-system, said respective set of transects from said second database-of-transects in accordance with said one-time secret code $SK\text{-}A\_RN_K$ received from said first computing sub-system, and producing a second reconstructed image based on said $R_{CS}G(N)\_RN_K$ with said coordinates removed, $R_{CS}F(M,N)\_RN_K$, and $SK\text{-}A\_RN_K$ received from said first computing sub-system;

operatively coupling a third computing unit to said second reconstruction unit, and computing, in said third computing unit, a second group of hash values for said second reconstructed image, said second group of hash values for said second reconstructed image being represented by a second group of anisotropy parameters comprising $IIA_{STR}$ and $IIA_{SIZE}$ of said second reconstructed image $IIA_{STR}$ and $IIA_{SIZE}$, and comparing said first and second groups of hash values computed for said first and second reconstructed images, respectively, and authenticating said second reconstructed image if the match between said first and second group of hash values is determined.

11. The method of claim 10, further comprising the steps of:

(a) configuring said first computing sub-system with a parameterization system adapted to perform parameterization of said at least one image of the object under study, wherein said parameterization sub-system includes a slicing sub-system configured for applying a predetermined slicing procedure to said at least one image under study if said image under study is a 3-D image, (b) processing, in said slicing sub-system of said first parameterization system, said at least one image of the object under study to identify said at least one image tinder study as a 2-D image under study or a 3-D image under study, and, if said at least one image under study is a 3-D image under study, slicing said 3-D image under study into a set of 2-D slice images of said at least one 3-D image under study;

(c) supplying a 2-D image, including said at least one 2-D image of the object under study or each of 2-D slice images of said set thereof, to said first computing unit, and plotting, in said first computing unit, a plurality of transects $(T_1, T_2, \ldots, T_j, T_N, \ldots, T_M)$ selected in accordance with said random number $RN_K$ from said first database of transects onto said 2-D image, each of said plurality of transects extending from a respective initial point towards the periphery of said 2-D image in crossing relationship with at least one of features found in said 2-D image, and to convert said 2-D image into said N-partite graph G(N) describing an anisotropic structure of said 2-D image, (d) computing, in said first computing unit, a set of bi-partite graphs $G(T_j, T_{j+1})$, wherein i is the number of a transect smaller than N and M, each of bi-partite graphs $G(T_j, T_{j+1})$ of said set of bi-partite graphs being situated between neighboring transects $T_j$, $T_{j+1}$ and $T_{j+1}$, $T_{j+2}$, respectively, and merging said neighboring bi-partite graphs $G(T_j, T_{j+1})$ into said N-partite graph G(N) based on the common vertex along said transects $T_{j+1}$ situated between each pair of neighboring bi-partite graphs of said 2-D image, (e) inputting said set of neighboring bi-partite graphs $G(T_j, T_{j+1})$ into said second computing unit, (f) computing, in said second computing unit of said first computing sub-system, an Index of Intrinsic Anisotropy of structure $IIA_{str}(X_i, X_{i+1})$ for each said bi-partite graph $G(T_j, T_{j+1})$ in said set thereof as:

$$IIA_{str}(X_i,X_{i+1})=[VT(X_i,X_{i+1})-VI(X_i,X_{i+1})]/VT(X_i,X_{i+1}),$$

where X and $X_{i+1}$ correspond to transects $T_j$ and $T_{j+1}$ transecting said 2-D image, $VT(X_i, X_{i+1})$ is the total number of vertices in the $G(X_i, X_{i+1})$, and $VI(X_i, X_{i+1})$ is the total number of vertices in the $G(X_i, X_{i+1})$ forming isotropic edges; and (g) computing said Index of Intrinsic Anisotropy of structure $IIA_{str}(X_1, X_N)$ for a predetermined number N of transects, $N=N_{min+1}, \ldots, N_{max}$ as:

$$IIA_{str}(X_1,X_N)=1/(N-1)*[\Sigma IIA_{str}(X_i,X_{i+1})], i=1,\ldots,N-1.$$

12. The method of claim 11, further comprising the steps of:
- operatively coupling a rotational unit to said parameterization system, and
- after said step (f), applying to said 2-D image a routine of rotation said first reconstructed image for a number of rotation angles $\varphi_i$, i=0, 1, . . . , q,
- computing said $IIA_{str}$ (2-D image) for each rotation angle $\varphi_i$ of said number thereof to construct a sequence of $IIA_{str}(\varphi_0)$, $IIA_{str}(\varphi_1)$, . . . , $IIA_{str}(\varphi_q)$, and
- computing an Index of Complexity of Image Anisotropic structure ($CI_{str}$) as a structural characteristic of said 2-D image invariant to the image alignment,
- where $CI_{str}=(1/q)*\Sigma IIA_{str}(\varphi_i)$, i=1, . . . , q, where q is a number of image rotations applied to said 2-D image.

13. The method of claim 11, wherein said feature M is a layer M, further comprising the steps of:
- in said step (e), computing, in said second computing unit, an Index of Intrinsic Anisotropy of size ($IIA_{size}$) for said first reconstructed image across said N transects positioned across a sampling area of said first reconstructed image through the steps of:
  - plotting N transects across the sampling area of said reconstructed image;
  - computing a thickness of a layer in said first reconstructed image situated across each transect $T_j$, j=1, . . . , N;
  - constructing a table $W(w_{i,j})$, where $w_{i,j}$ is a thickness of a layer i passing across the transect $T_j$;
  - normalizing the thickness $w_{i,j}$ as:

$$w(\text{normalized for } T_j)=[w_i-\min(w_i)]/[\max(w_i)-\min(w_i)];$$

where $\min(w_i)$ is the minimal value of $w_i$ and $\max(w_i)$ is the maximal value of $w_i$;
- calculating a deviation $D_j$ of a thickness $w_i$ of the layer i along the transect $T_j$ as:

$$D_j=(1/n_j)*\{\Sigma[w(\text{normalized for } T_j)_i-w(\text{average normalized})_i]^2\}^{1/2}$$

where $n_j$ is the number of the layers situated along the transect $T_j$, and w (average normalized) is the average normalized thickness of the layer along the transect $T_j$;
- repeating said normalization routine for the thickness $w_{i,j}$ and calculation of the deviation $D_j$ for the transects $T_1$, $T_2$, . . . , $T_N$, resulting in a set of deviations $D_1$, $D_2$, . . . , $D_N$ of thicknesses of the features M in said 2-D image;
- calculating the $IIA_{size}$ for N transects as:

$$IIA_{size}(\text{for } N \text{ transects})=(1/N)*\Sigma(D_k), k=1, \ldots, N;$$

- computing the $IIA_{size}$ for a number of transects N+1, N+2, . . . , N+M, and
- computing the $IIA_{size}$ (reconstructed image) for said first reconstructed image as:

$$IIA_{size}(\text{reconstructed image})=(1/M)*\Sigma[IIA_{size}(\text{for } N+k \text{ transects})], k=1, \ldots, M.$$

14. The method of claim 13, further comprising the steps of:
- in said step (e), applying to said first reconstructed image a routine of rotation of said 2-D image for a number of rotational angles $\varphi_0$, $\varphi_1$, . . . , $\varphi_i$, i=0, 1, . . . , q,
- computing said $IIA_{size}$ (2-D image) for each rotation angle $\varphi_i$ of said number q thereof to construct a sequence of $IIA_{size}(\varphi_0)$, $IIA_{size}(\varphi_1)$, . . . , $IIA_{str}(\varphi_q)$, and computing an Index of Complexity of Image Anisotropic size ($CI_{size}$) as:

$$CI_{size}=(1/q)*\Sigma IIA_{size}(\varphi_i), i=0,1, \ldots, q$$

wherein said $CI_{size}$ is a characteristic of anisotropy of size for said first reconstructed image invariant to image alignment.

15. The method of claim 14, further comprising:
- processing, in said step (c), a first reconstructed image and an additional reconstructed image,
- computing a first said $IIA_{str}$ (2-D image) for said first reconstructed image,
- computing a second said $IIA_{str}$ (2-D image) for said additional reconstructed image,
- constructing, in said step (f), said first plot for "$IIA_{str}$ vs. Number of transects", and computing said preferred approximating functions for each of said first and additional reconstructed images, respectively,
- comparing said first plots of said first and additional reconstructed images,
- identifying structural differences between said first and additional reconstructed images as a deviation between said first plots thereof, and
- quantifying said identified structural difference based on said preferred approximating functions of said first and additional reconstructed images.

16. The method of claim 15, further comprising the steps of:
- for a first and second 2-D images, each of said images including transects N transecting with the layers M,
- applying a routine of localization of structural difference between said first and second 2-D images through the steps of:
  - in said step (e), computing N-partite graphs $G_1$ (N) and $G_2$ (N) of said first and second 2-D images, respectively,
  - constructing tables $F_1$ (M,N) and $F_2$ (M,N) for each of said first and second 2-D images, each of said tables $F_1$ (M,N) and $F_2$ (M,N) including coordinates of points of intersections of the transects N transecting the 2-D image with the layers M therein, wherein each vertex in said N-partite graphs $G_1$ (N) and $G_2$ (N) has a coordinate X, Y stored in said $F_1$ (M,N) and $F_2$ (M,N), respectively,
  - comparing the coordinates X, Y of vertices located along the transect $T_j$ in said N-partite graphs $G_1$ (N) and $G_2$ (N), and along the transect $T_{j+1}$ in said N-partite graphs $G_1$ (N) and $G_2$ (N), resulting in a set of equal vertices $EV_j$ coinciding in said $G_1$ (N) and $G_1$ (N) and equal edges corresponding thereto, resulting in comparison of areas of said first and second 2-D images situated between said transects $T_j$ and $T_{j+1}$, and
  - pinpointing an area of structured difference between said first and second 2-D images by removing from said $G_1$ (N) the edges equal to edges in said $G_2$ (N), and removing said vertices connected by said edges.

17. The method of claim 14, further comprising:
- in said step (b), inputting in said slicing sub-system unit, a 3-D image A in the raster format,
- slicing said 3-D image A into the first set of 2-D slice images, wherein 3-D image A={slice 1 (2-D image A), slice 2 (2-D image A), . . . , slice Q (2-D image A)},
- in said step (f), computing said parameters $IIA_{str}$ and $IIA_{size}$ for each 2-D slice image from said first set of 2-D slice images, resulting in a second set including $IIA_{str}$(slice1), $IIA_{str}$ (slice 2), . . . , $IIA_{str}$ (slice Q), and a third set including $IIA_{size}$ (slice 1), $IIA_{size}$ (slice 2), . . . , $IIA_{size}$ (slice Q),
- constructing a second plot for "$IIA_{str}$ vs. slice number", and a third plot for "$IIA_{size}$ vs. slice number", averaging said parameters $IIA_{str}$ and $IIA_{size}$ of the 2-D slice images in said second and third sets thereof, respectively, resulting in parameters $IIA_{str}$ (3-D image) and $IIA_{size}$ (3-D image) for said 3-D image A under study, where $$IIA_{str}(\text{3-D image})=1/Q^*[IIA_{str}(\text{Slice1})+IIA_{str}(\text{Slice 2})+\ldots+IIA_{str}(\text{Slice}Q)],$$

$$IIA_{size}(\text{3-D image})=1/Q^*[IIA_{size}(\text{Slice1})+IIA_{size}(\text{Slice2})+\ldots+IIA_{size}(\text{Slice}Q)], \text{ and}$$

computing the Index of Complexity of Image Anisotropy (IACom) for said 3-D image under study as:

$$IACom(\text{3-D image})=[IIA_{size}(\text{3-D image})^2+IIA_{size}(\text{3-D image})^2]^{1/2}, \text{ and}$$

in said step (g), outputting said $IIA_V$ (3-D image), $IIA_{size}$ (3-D image), IACom (3-D image) and said second and third plots into said output system.

18. The method of claim 16, further comprising:

in said step (c), computing in said first computing unit, a model of said 2-D image represented by the N-partite graph G (N) and a Table $F_{M,N}$ comprising XY coordinates of points of intersection of the layers M in said 2-D image with transects $T_i, \ldots, T_j, T_{j+1}, \ldots T_N$, where $j=1, \ldots, N$, inputting said G (N) and the Table F(M,N) into said first Reconstruction Unit, for performing a reconstruction routine by:

(h) connecting a vertex $q_f$ located on the transect $T_j$ with a vertex $p_k$ located on the transect $T_{j+1}$, if the vertexes $q_f$ and $p_k$ belong to the same layer M of said 2-D image situated between $T_j$ and $T_{j+1}$ for k<M until k=M, wherein f and k are indexes assigned to the vertexes, located on transects $T_j$ and $T_{j+1}$ respectively;

(i) connecting the vertex $q_f$ located on the transect $T_j$ with a vertex $q_{f+1}$ located on the transect $T_j$, if the vertex $q_f$ and the vertex $q_{f+1}$ belong to the same layer M of said 2-D image situated between the transects $T_j$ and $T_{j+1}$ for f<M until f=M;

(j) connecting the vertex $p_k$ located on the transect $T_{j+1}$ with a vertex $p_{k+1}$ located on the transect $T_{j+1}$, if $p_k$ and $p_{k+1}$ belong to the same layer M of said 2-D image situated between said transects $T_j$ and $T_{j+1}$ for k<M until k=M;

(k) repeating steps (h)-(j) for bi-partite graphs $G(T_1, T_2), \ldots, G(T_j, T_{j+1}), \ldots, G(T_{N-1}, T_N)$ while j<N-1, resulting in a set of binary matrices BM $(T_1, T_2), \ldots, BM(T_j, T_{j+1}), \ldots, BM(T_{N-1}, T_N)$ describing connections between vertices located on the transects $T_j$ and $T_{j+1}$;

(l) constructing the N-partite graph G (N) of said 2-D image in visual format by placing vertices on said 2-D image in correspondence to said Table F(M,N) and drawing edges on said 2-D image based on said set of binary matrices BM $(T_j, T_{j+1})$, thereby forming a reconstructed image for said 2-D image; and (m) outputting said first reconstructed image.

19. The method of claim 16, further comprising:

in said step (a), incorporating a raster-vector-raster converting unit in said first computing sub-system in operative coupling to an input of said slicing subsystem;

in said step (c), supplying said 2-D image in the raster format to said raster-vector-raster converting unit, converting said 2-D image into the vector format, thereby forming a first 2-D image, rotating said first 2-D image to form image Img ($\varphi_i$), where $\varphi_i$ is the angle of rotation of said first 2-D image, $i=0, 1, \ldots, q$, subsequently storing said image Img ($\varphi$i) in the raster format, thereby forming a second 2-D image, and supplying said second 2-D image in the raster format to said first computing unit.

20. The method of claim 11, wherein in said step (a), said at least one image under study is an initial 2-D grayscale image ImGr in the raster format, further comprising:

(n) converting said initial 2-D grayscale image ImGr into ASCII file in the Comma Separate Value (CVS) format, said ASCII file containing brightness of each pixel in said initial 2-D grayscale image ImGr, (o) constructing a histogram of the initial 2-D grayscale image ImGr, where the X-axis of the histogram represents brightness of the pixels in said ImGr, and the Y-axis represents the number of pixels in said ImGr of a particular brightness, (p) converting said initial 2-D grayscale image ImGr into a set of binary images $ImB_i$, wherein $$ImGr=\{ImB_1, ImB_2, \ldots, ImB_i, ImB_z\},$$

where z is a predetermined number of the binary images $ImB_i$ in said set thereof, and where each $ImB_i$ represents a contour plot of areas in said initial 2-D grayscale image ImGr consisting of pixels having a brightness=i;

(q) in said step (c), constructing the N-partite graphs G (N) for different numbers of transects $T_j$ for each said binary image $ImB_i$ in said set thereof, (r) in said step (f), computing said $IIA_{str}$ and constructing said first plot for "$IIA_{str}$ vs. Number of transects", and (s) constructing a normalized plot $Pl_i$ for "$IIA_{str}$ vs. Number of transects" for each said $ImB_i$ as:

$$IIA_{str}(X_1, X_N)=1/(N-1)^*[\Sigma IIA_{str}(X_j, X_{j+1})], j=1, \ldots, N-1,$$

where $X_j$ corresponds to a transect j plotted on said 2-D image;

(t) approximating said normalized plot $Pl_i$ by a function $y=f(x)$ having the larger coefficient of determination $R^2$, (u) computing the Index of Intrinsic Anisotropy of structure $IIA_{str}$ for each said $ImB_i$ as:

$$IIA_{str}(X_1, X_N)=\int_q^1 f(X)^* dX,$$

where $IIA_{str}$ (ImGr)=$IIA_{str}$ ($ImB_1$)+$IIA_{str}$ ($ImB_2$)+ $\ldots$ $IIA_{str}$ ($ImB_i$)+ $\ldots$ $IIA_{str}$ ($ImB_z$), q=1/(maximal number of transects) and (v) averaging $IIA_{str}$ ($ImB_i$), i=1, $\ldots$, z, to result in $IIA_{str}$ for said initial 2-D grayscale image ImGr $$IIA_{str}(ImGr)=1/z^*\Sigma(ImB_i), i=1, \ldots, z.$$

* * * * *